(12) United States Patent
Herman

(10) Patent No.: US 11,375,108 B1
(45) Date of Patent: Jun. 28, 2022

(54) METHOD AND APPARATUS FOR A COMPUTER VISION CAMERA UNIT

(71) Applicant: Edge Robotics Inc., Pittsburgh, PA (US)

(72) Inventor: Herman Herman, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 16/865,753

(22) Filed: May 4, 2020

Related U.S. Application Data

(63) Continuation of application No. 15/960,540, filed on Apr. 23, 2018, now Pat. No. 10,645,277, which is a continuation-in-part of application No. 15/462,707, filed on Mar. 17, 2017, now Pat. No. 10,484,666.

(60) Provisional application No. 62/309,677, filed on Mar. 17, 2016.

(51) Int. Cl.
| | |
|---|---|
| *H04N 5/232* | (2006.01) |
| *G06T 7/80* | (2017.01) |
| *G06T 1/20* | (2006.01) |
| *G06F 3/00* | (2006.01) |

(52) U.S. Cl.
CPC ......... *H04N 5/23225* (2013.01); *G06F 3/005* (2013.01); *G06T 1/20* (2013.01); *G06T 7/80* (2017.01)

(58) Field of Classification Search
None
See application file for complete search history.

(56) References Cited

U.S. PATENT DOCUMENTS

| | | | |
|---|---|---|---|
| 6,392,688 B1 | 5/2002 | Barman | |
| 7,667,198 B2 | 2/2010 | Strandemar | |
| 9,589,384 B1 | 3/2017 | Waggoner | |
| 10,484,666 B1* | 11/2019 | Herman | ............... H04N 13/246 |
| 10,645,277 B1* | 5/2020 | Herman | .................... G06T 7/85 |
| 2014/0118257 A1 | 5/2014 | Baldwin | |
| 2014/0139642 A1 | 5/2014 | Ni | |
| 2014/0330078 A1 | 11/2014 | Hwang | |
| 2015/0312445 A1 | 10/2015 | Cha et al. | |
| 2015/0350542 A1 | 12/2015 | Steuart | |
| 2016/0100154 A1 | 4/2016 | Ghyme | |
| 2016/0198146 A1 | 7/2016 | Hayasaka et al. | |

(Continued)

*Primary Examiner* — Clayton E. La Balle
*Assistant Examiner* — Diana Hancock
(74) *Attorney, Agent, or Firm* — Kaplan IP Law, PLLC; Jonathan T. Kaplan

(57) ABSTRACT

A computer vision camera unit comprising first and second pairs, of image capture assemblies, both of which have an approximately same orientation to a first axis. The first and second pairs are optically focused to capture first and second fields of view that, at least, overlap each other. Providing the first and second pairs with imager chips of differing light sensitivity permits high dynamic range to be realized. Having the second field of view within the first field of view permits specialization, between the first and second pairs, similar to the roles of peripheral and foveal vision, found in biological stereo vision systems. The image capture assemblies can be organized in a rectangular configuration that implies third and fourth pairs, orthogonal to the first and second pairs. The orthogonal but interlocking nature, of the first and second pairs in relation to the third and fourth pairs, enables an autocalibration technique.

12 Claims, 81 Drawing Sheets

(56) References Cited

U.S. PATENT DOCUMENTS

| | | |
|---|---|---|
| 2016/0205380 A1* | 7/2016 | Inoue .................. H04N 13/243 |
| | | 348/46 |
| 2016/0239978 A1 | 8/2016 | Cole et al. |
| 2017/0064282 A1 | 3/2017 | Lo |
| 2017/0134713 A1 | 5/2017 | Lin |
| 2017/0171465 A1 | 6/2017 | Chen |
| 2017/0178379 A1 | 6/2017 | Fu et al. |
| 2017/0223340 A1 | 8/2017 | Salvagnini et al. |

* cited by examiner

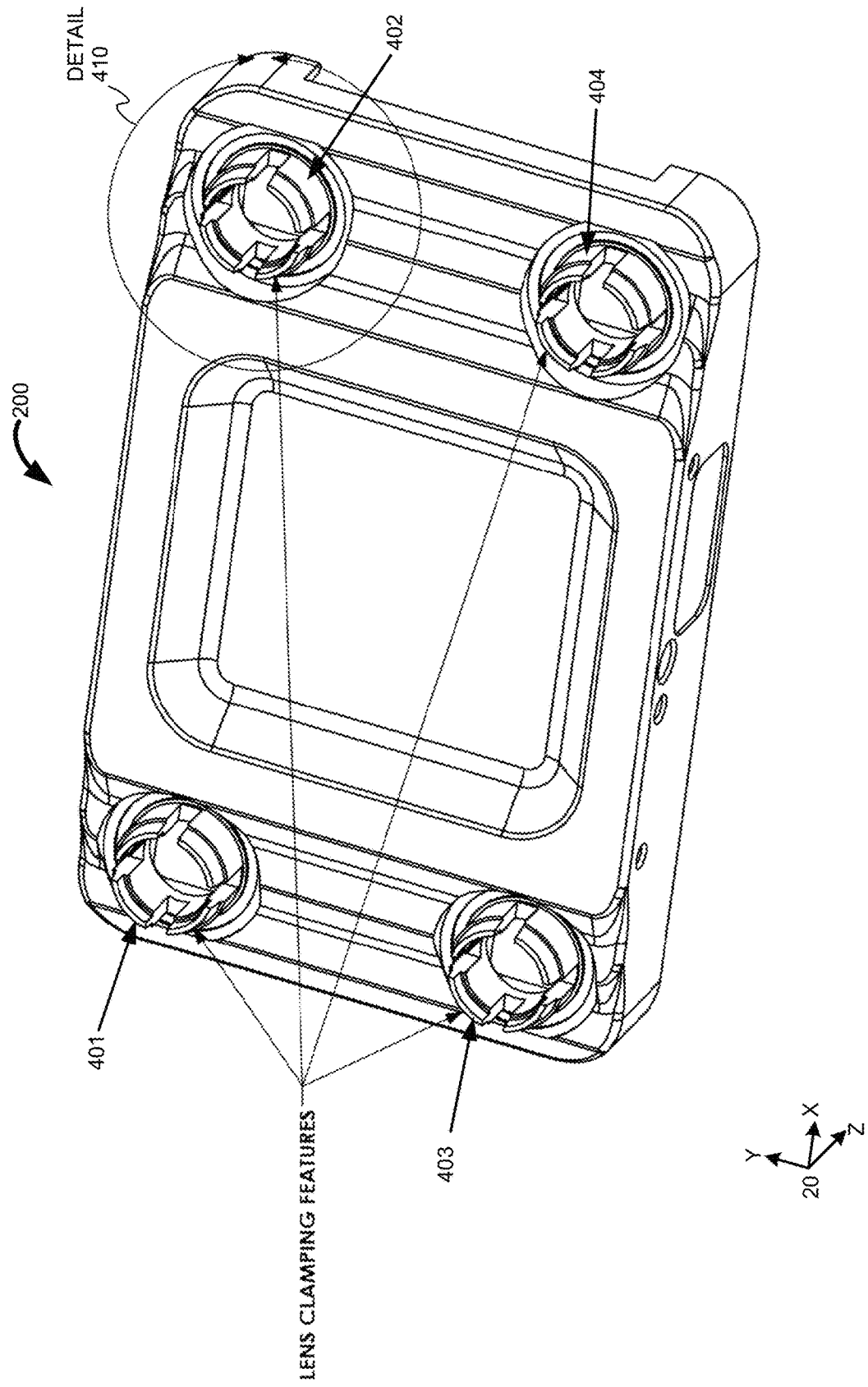

CLAMPING NUT

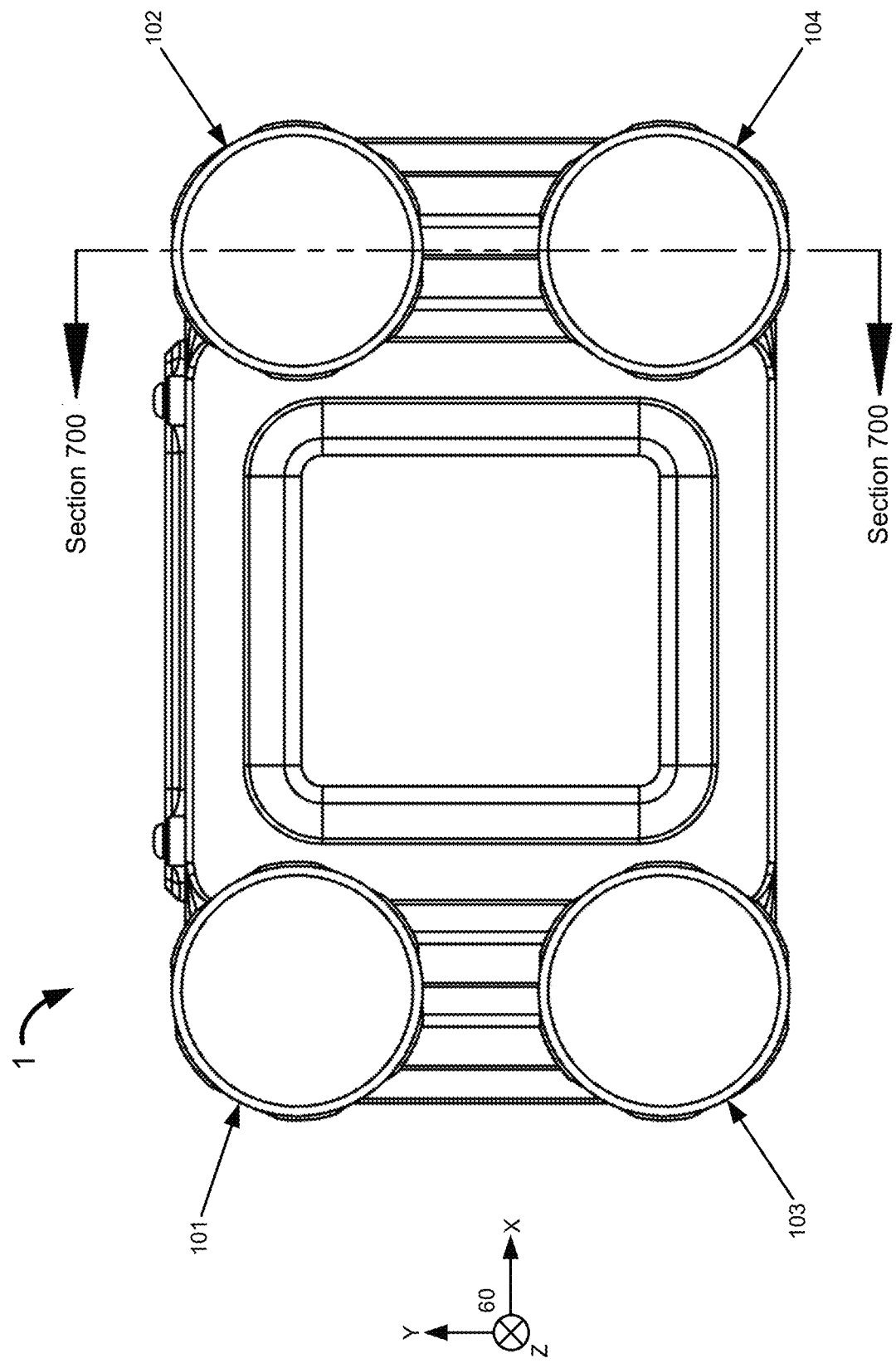

Detail 710

Section 700

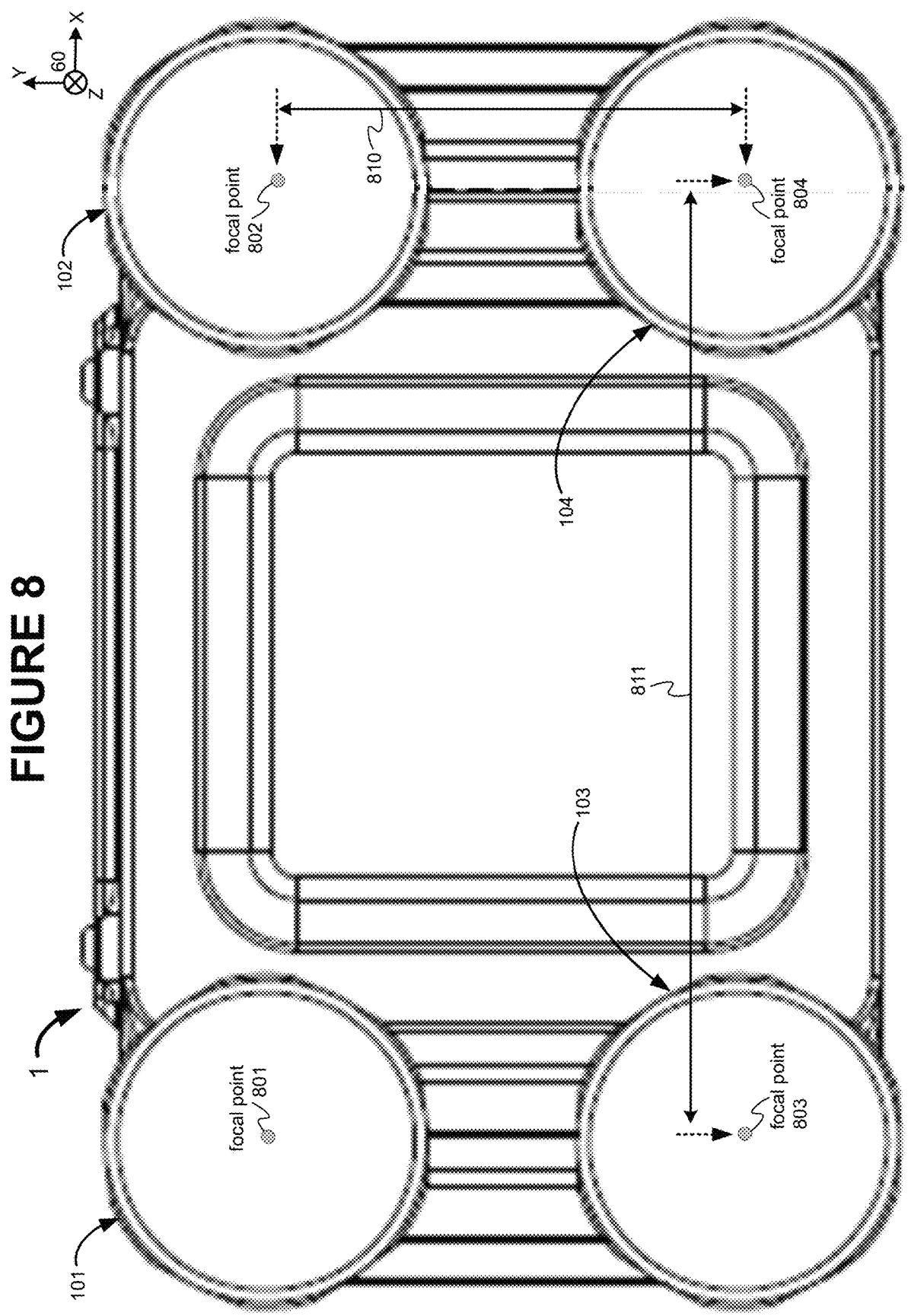

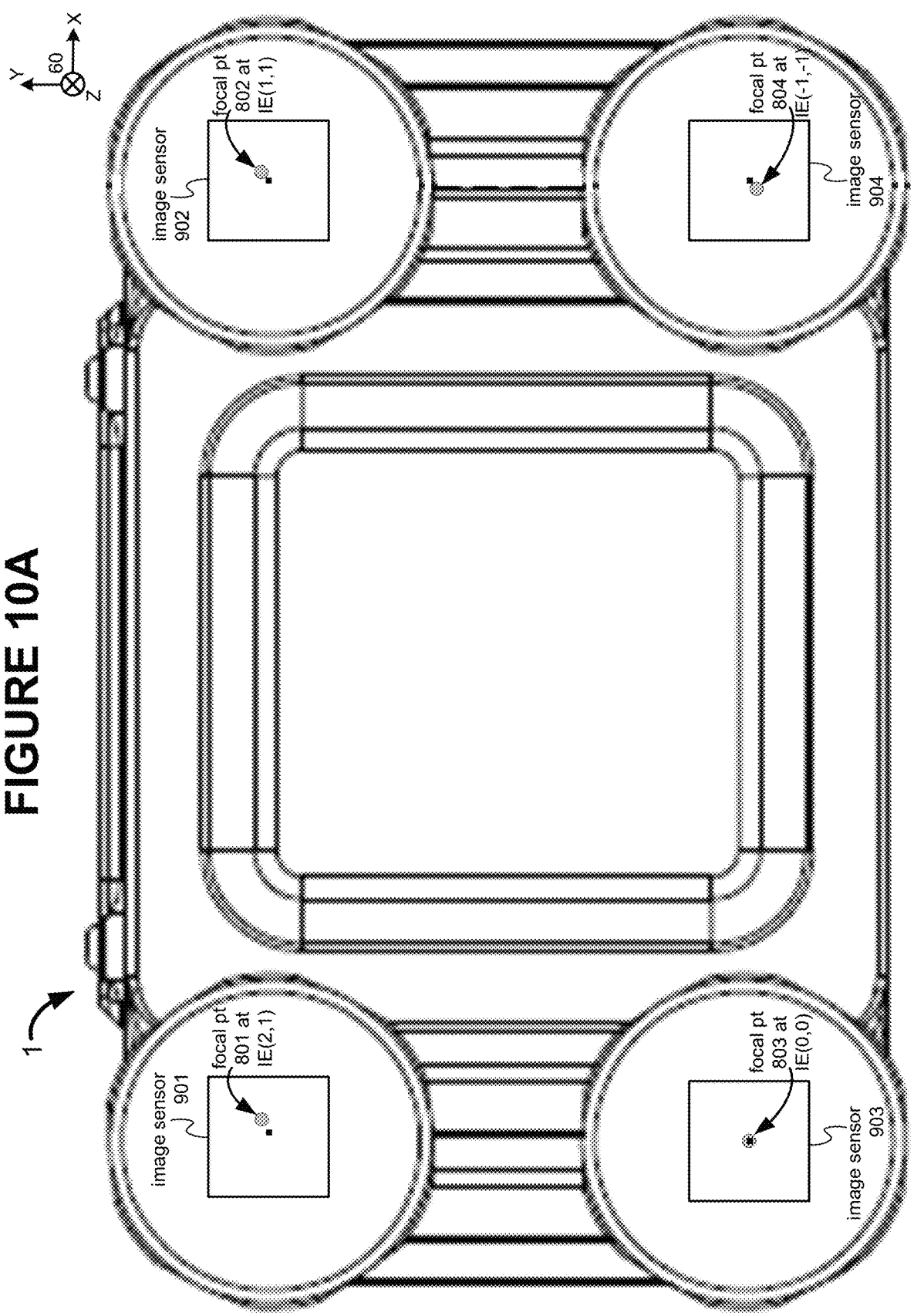

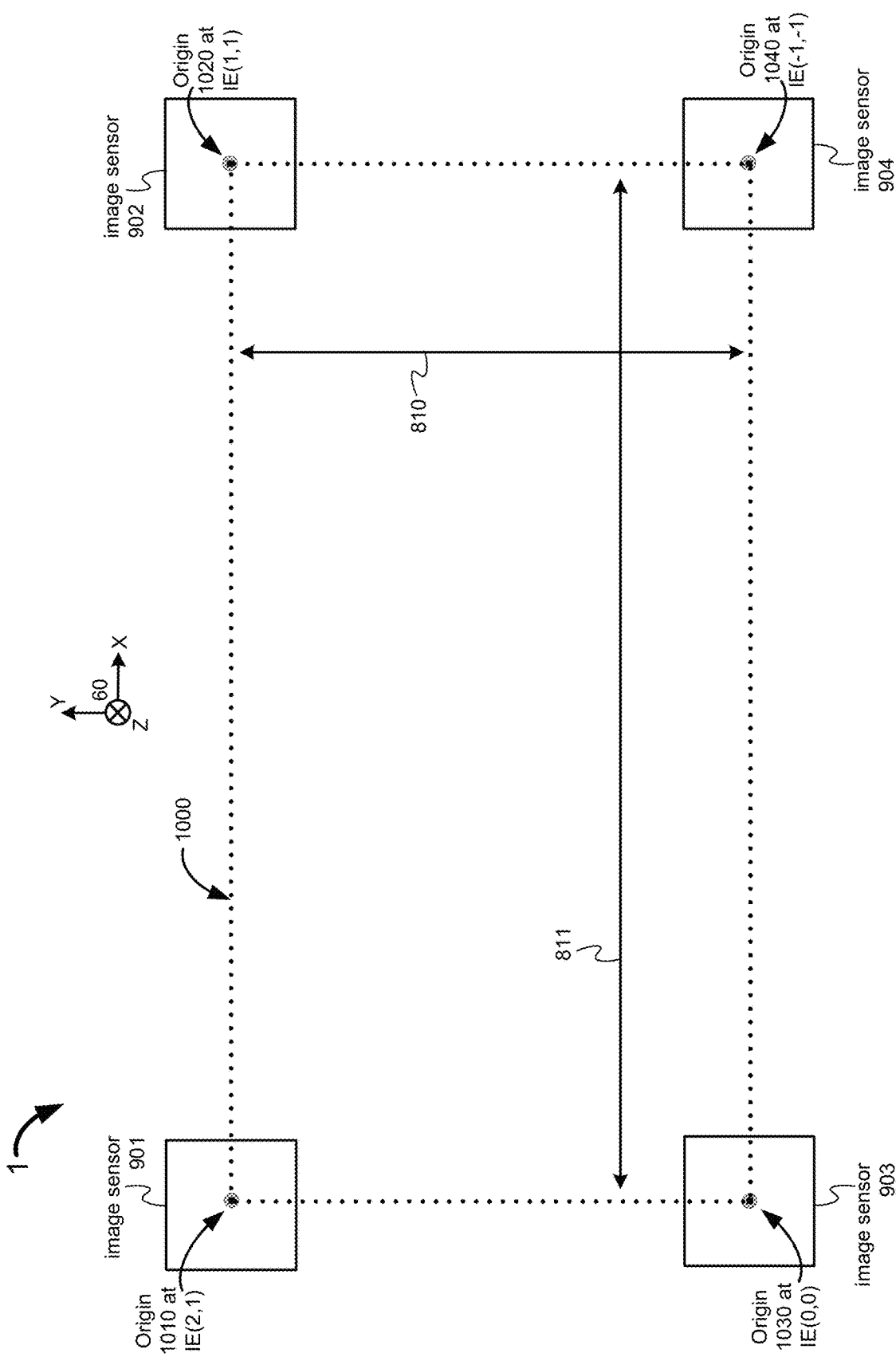

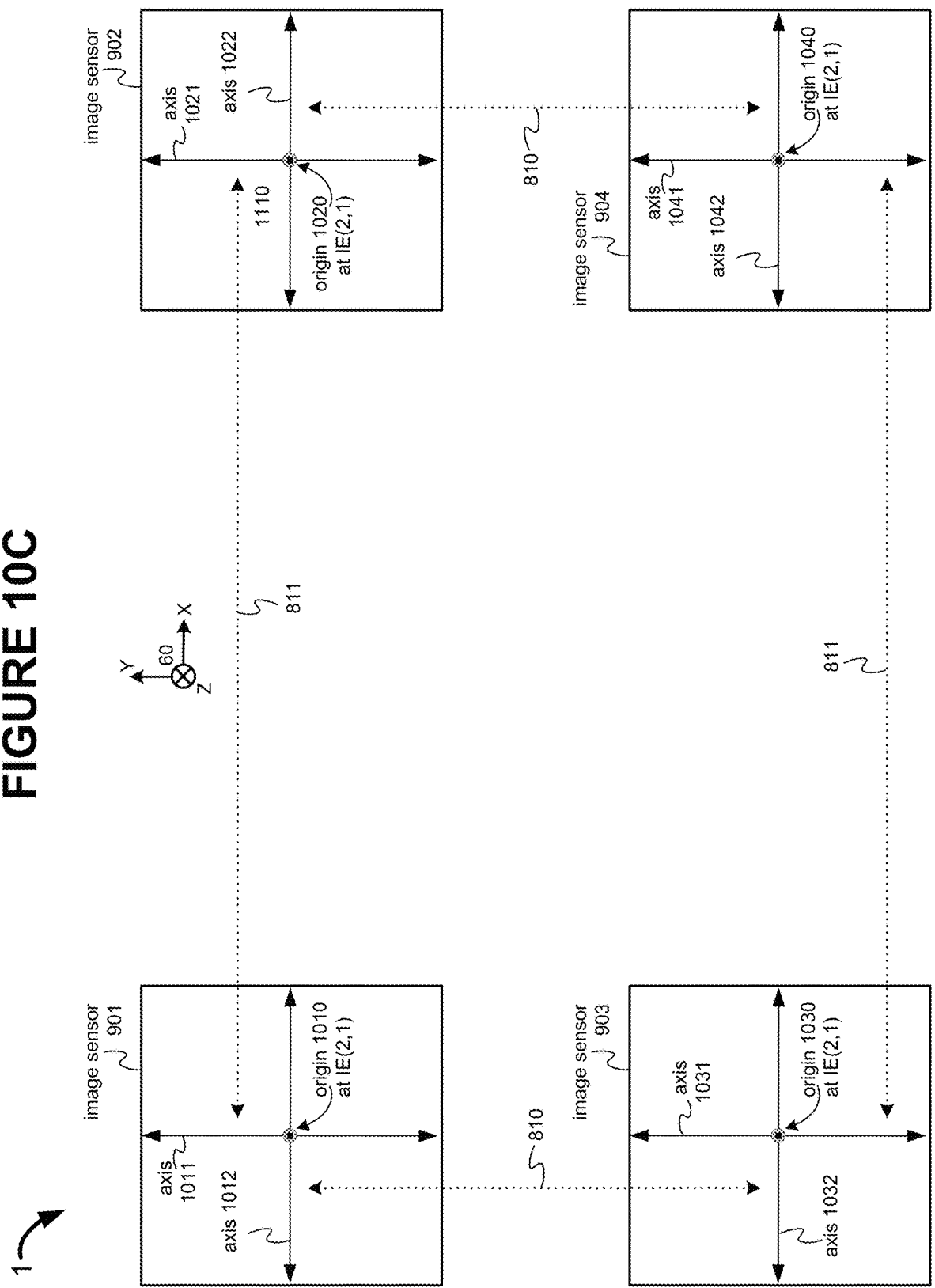

SIDE VIEW

TOP VIEW

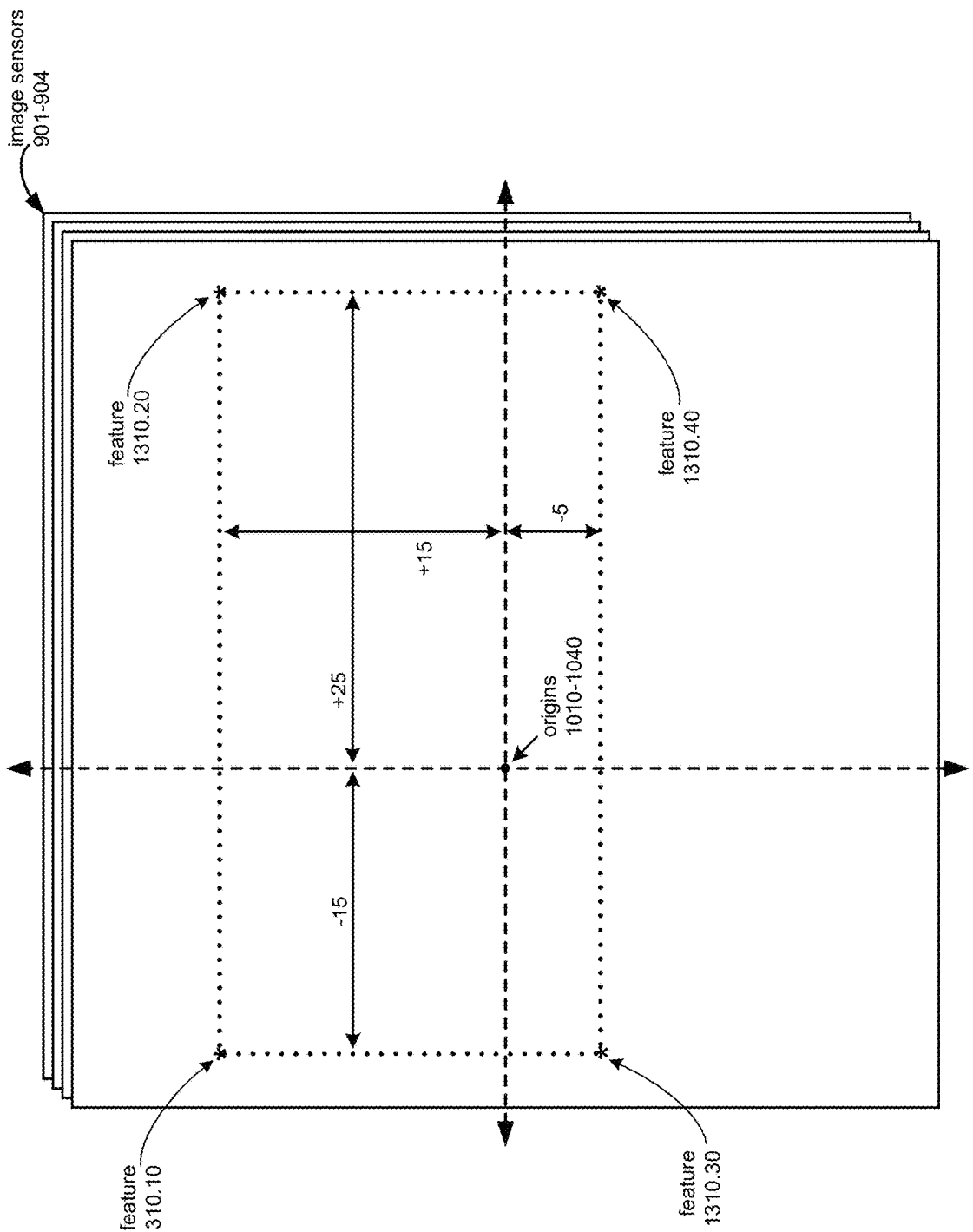
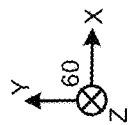

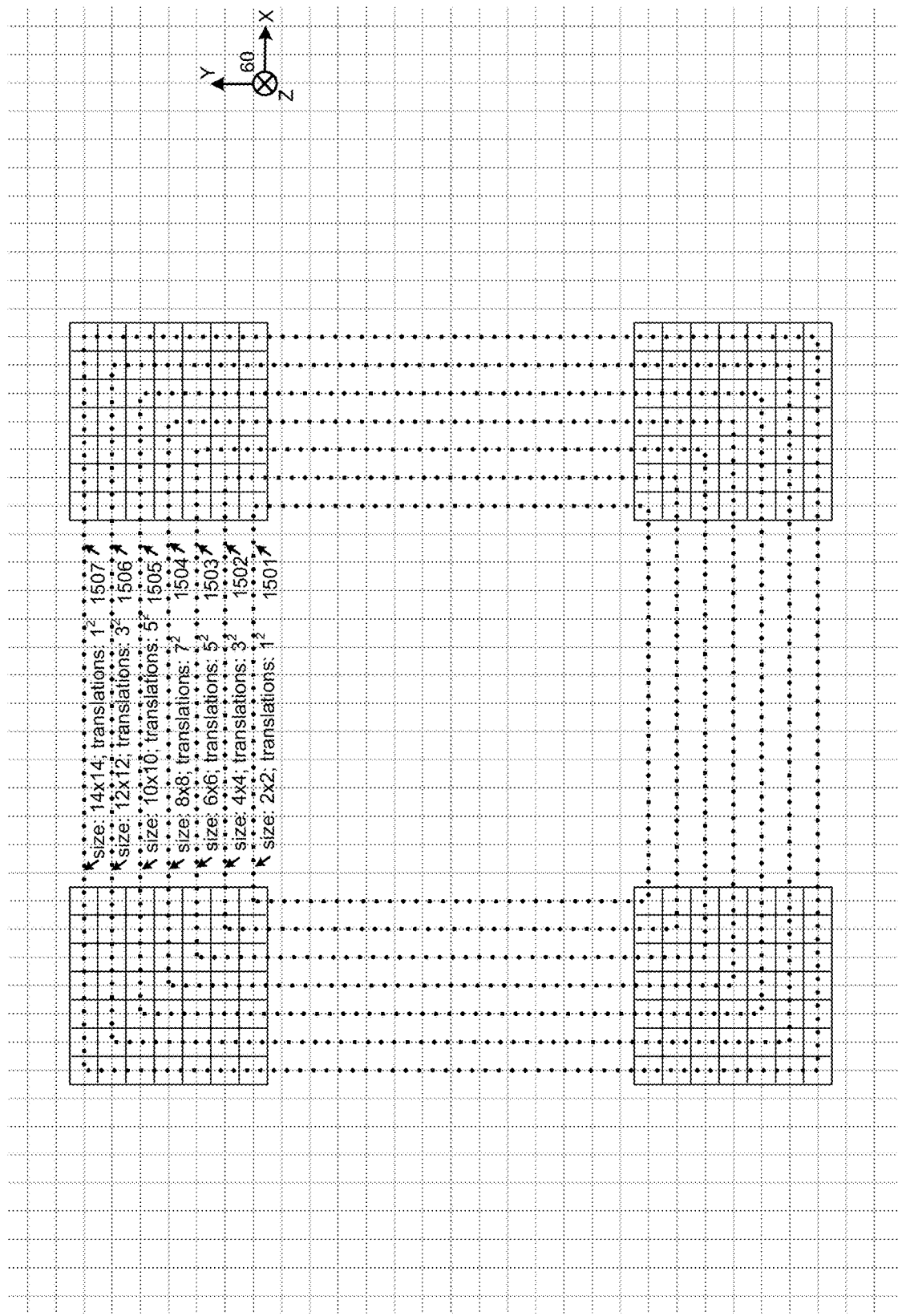

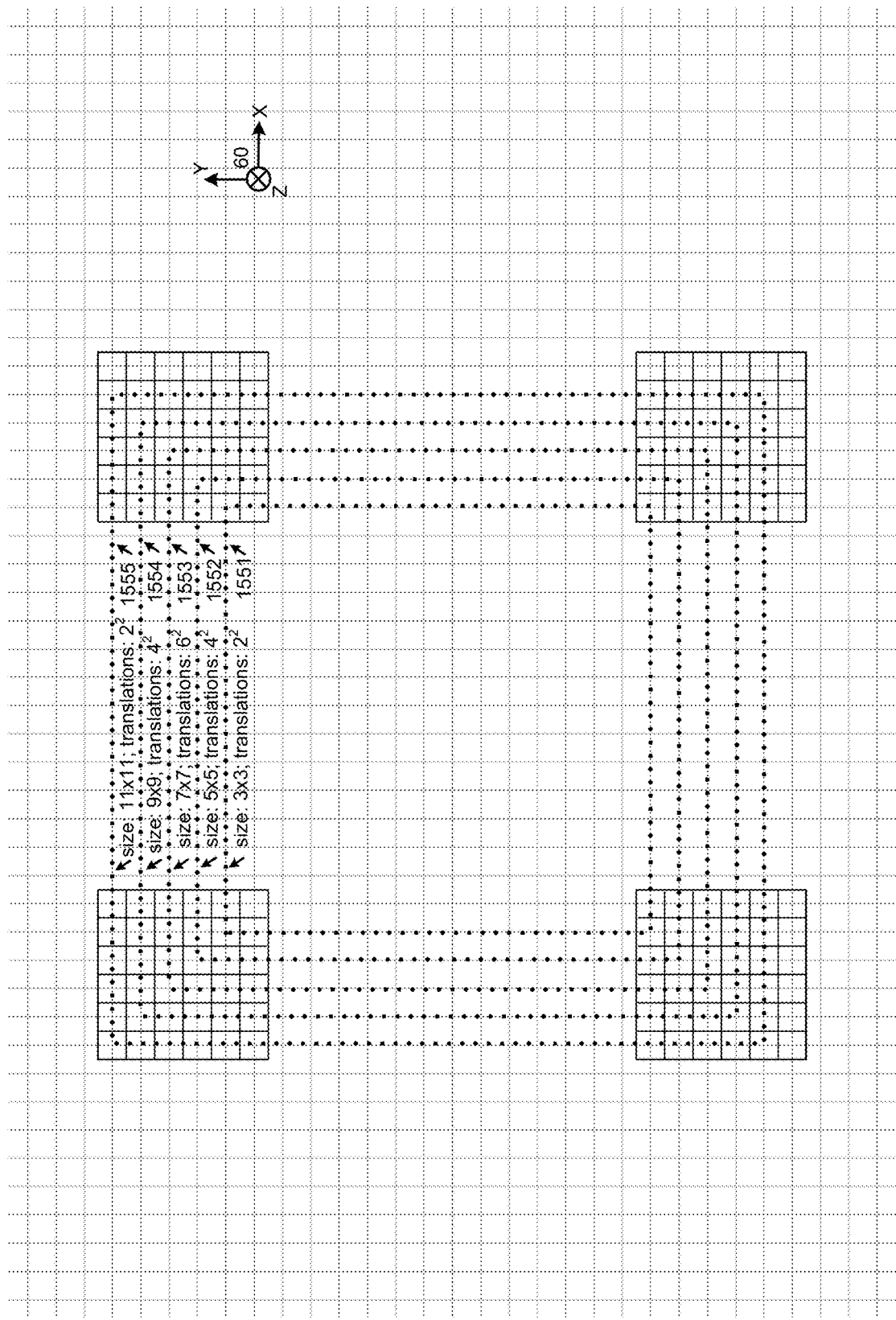

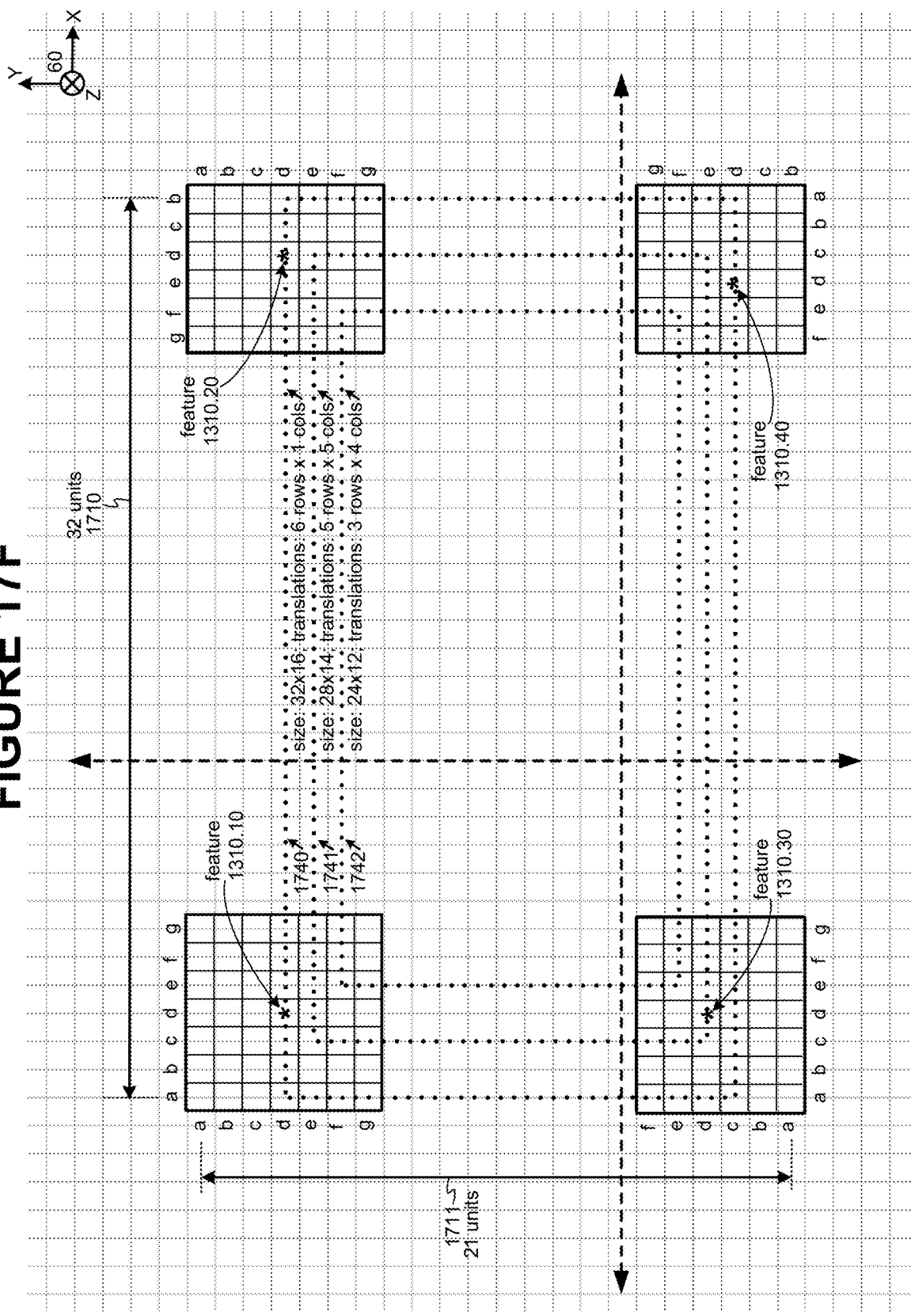

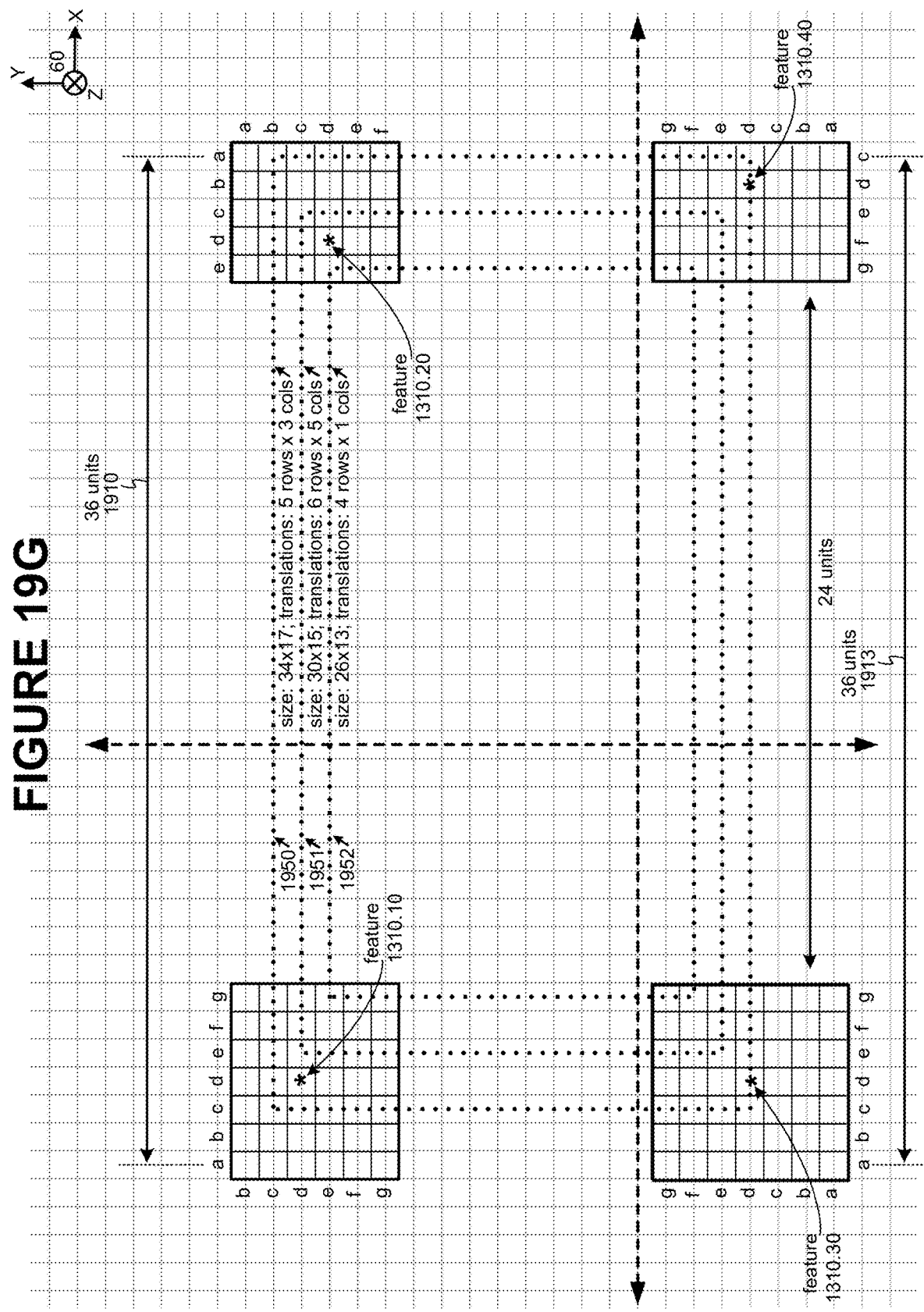

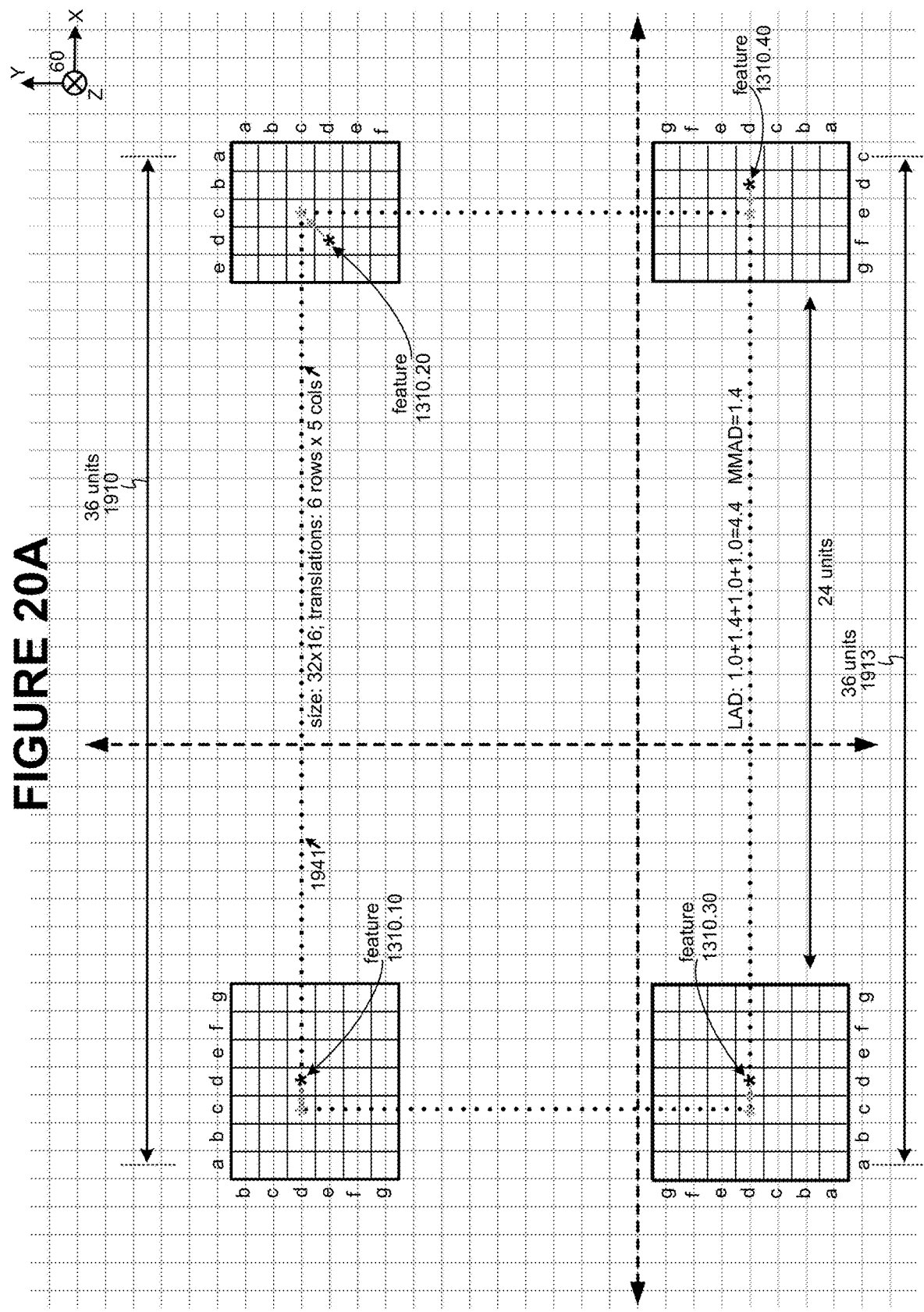

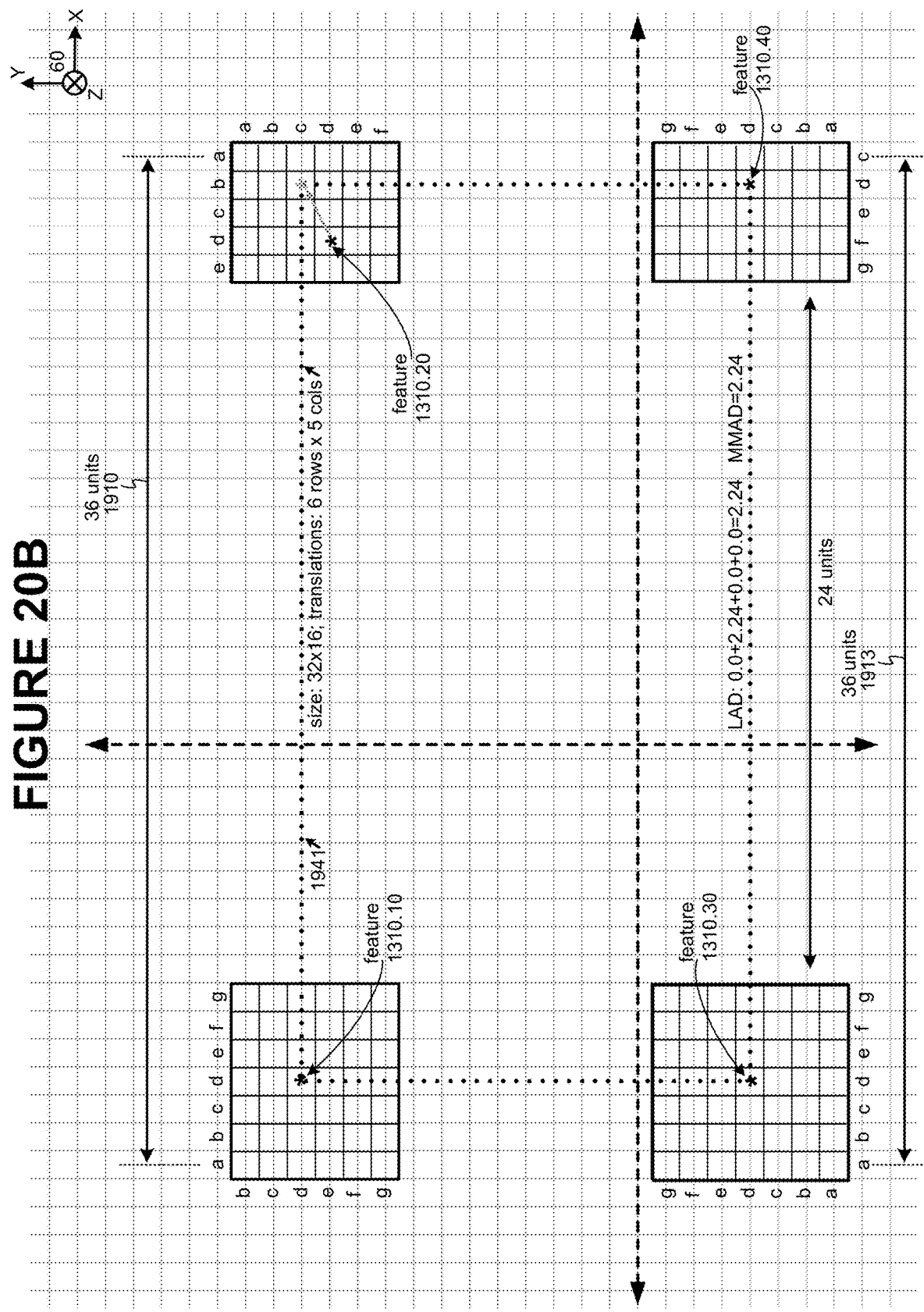

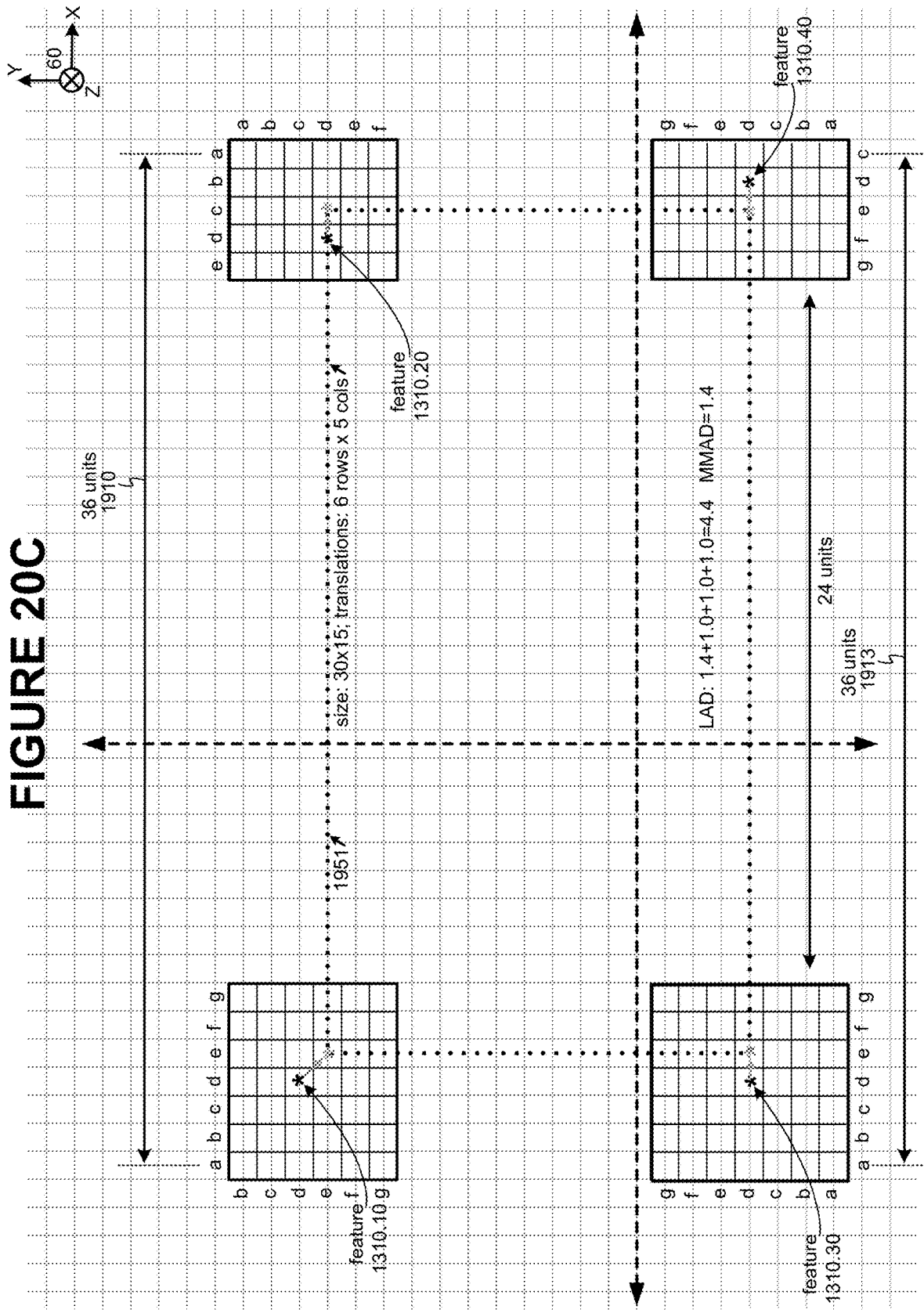

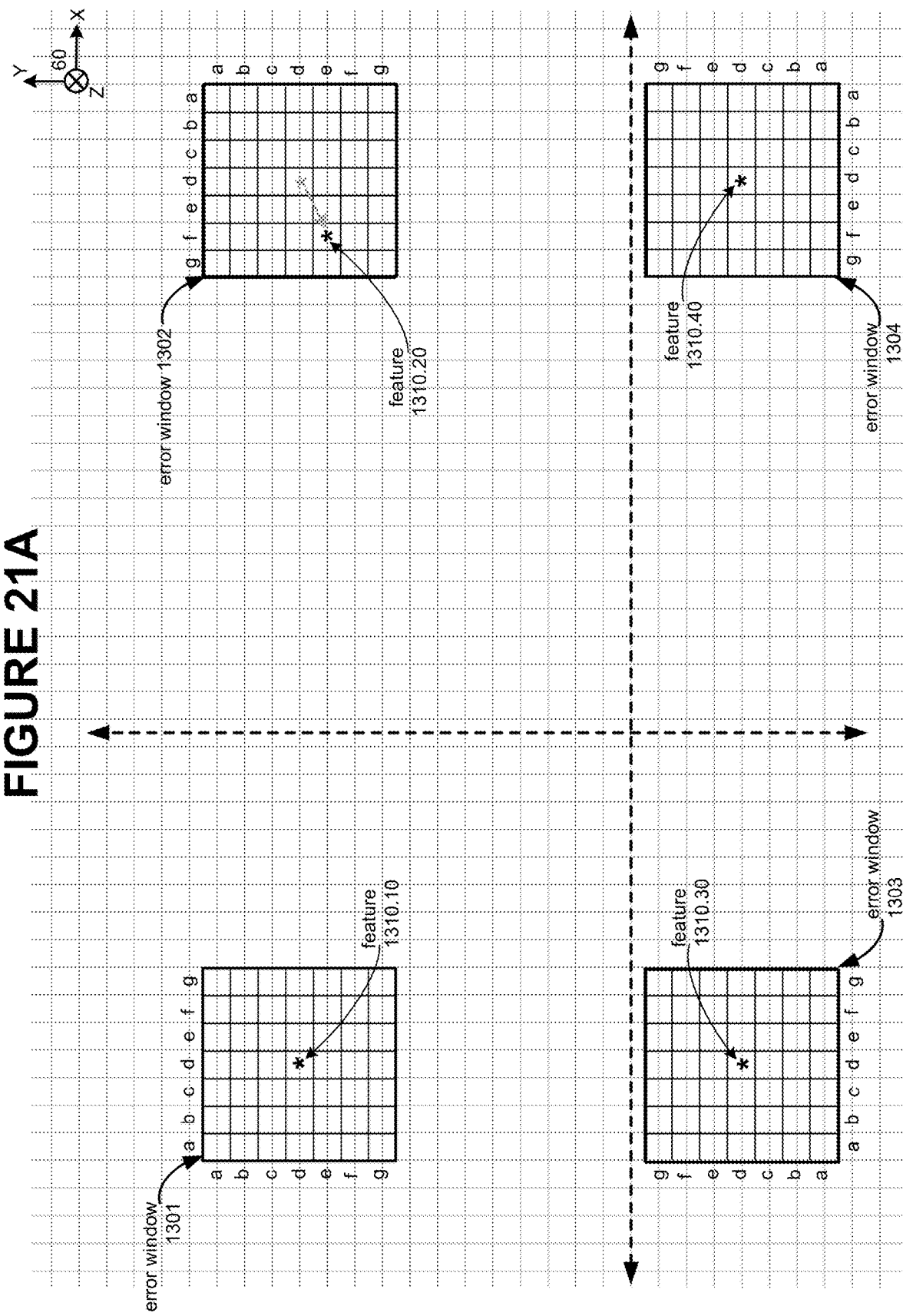

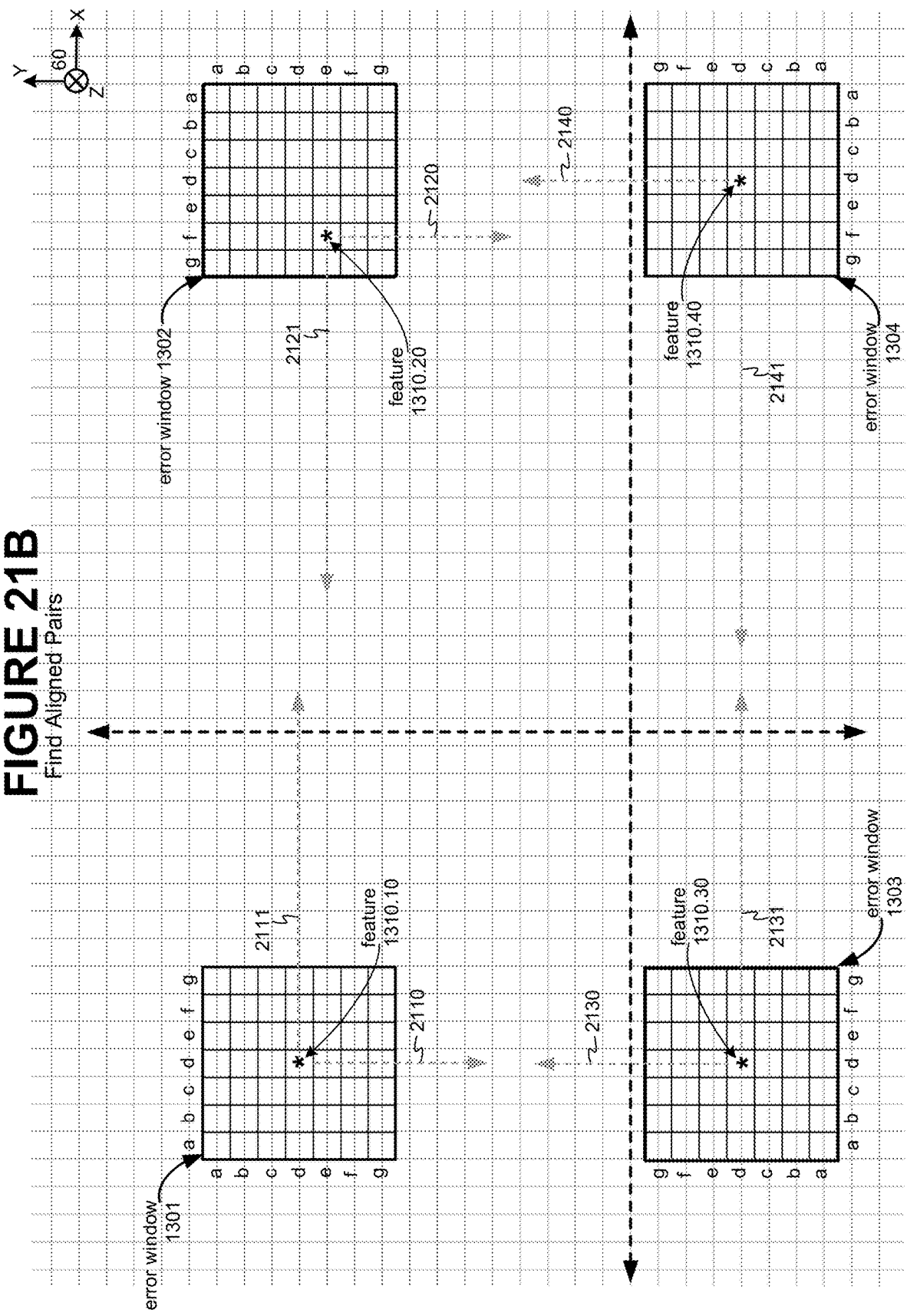

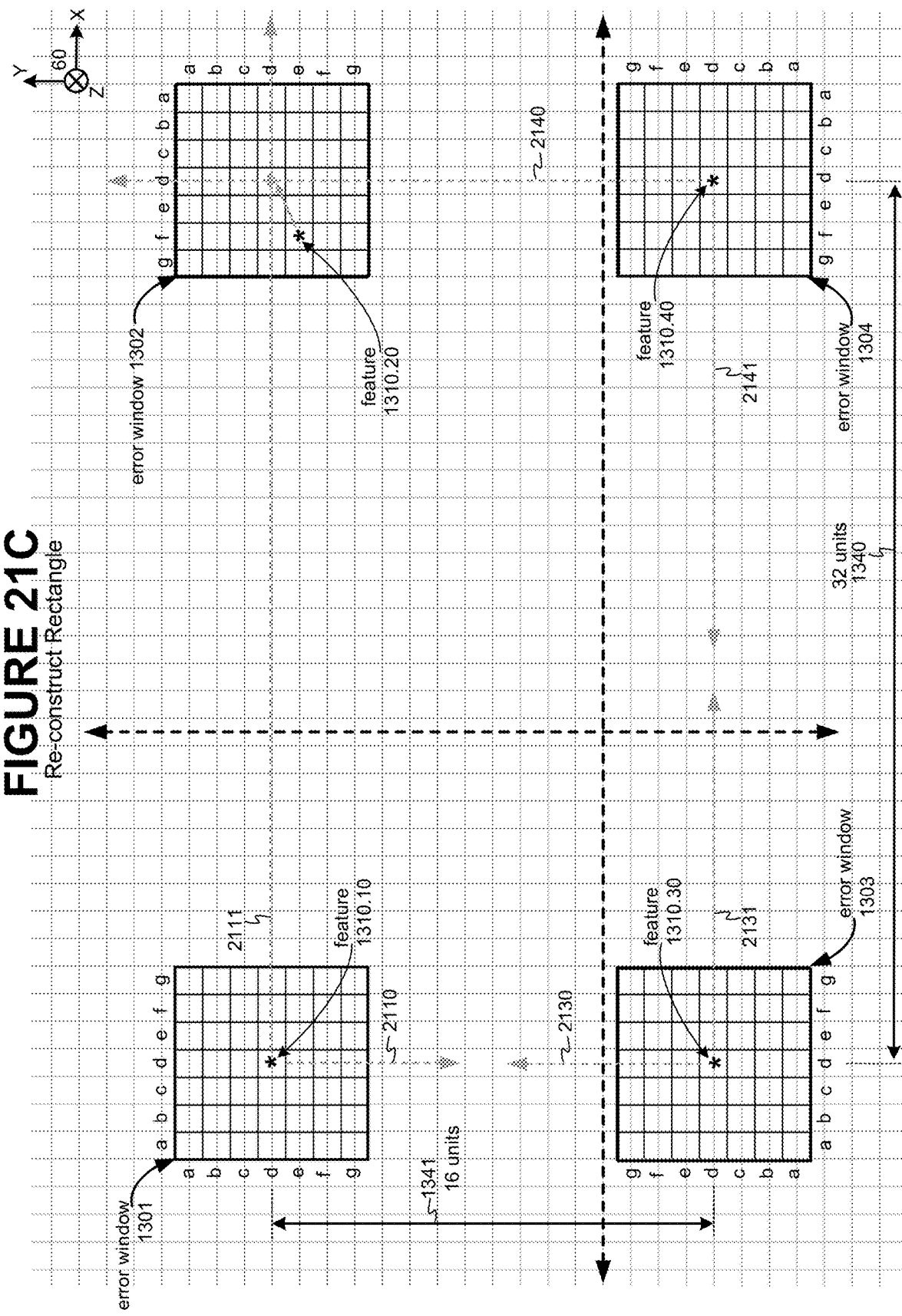

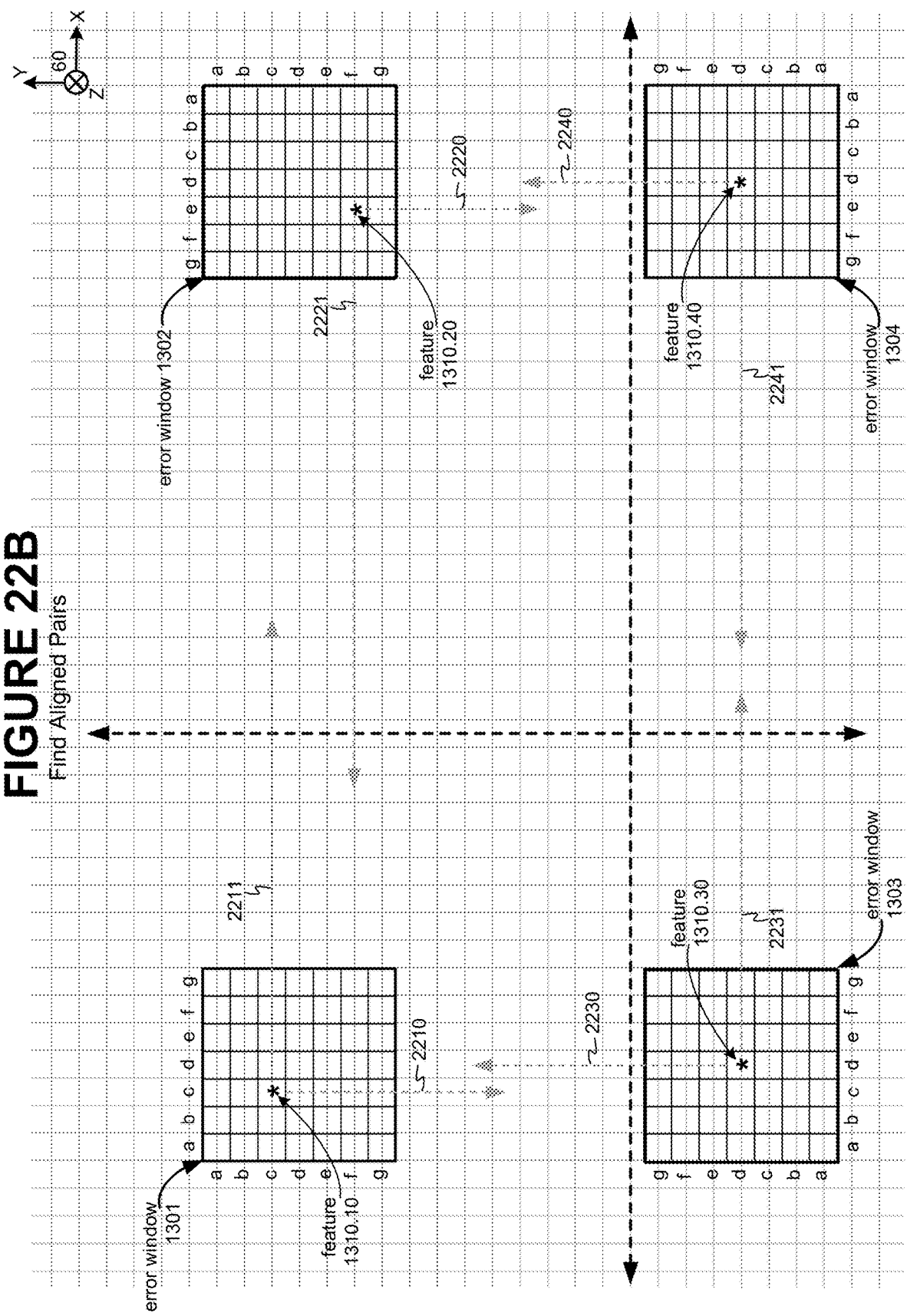

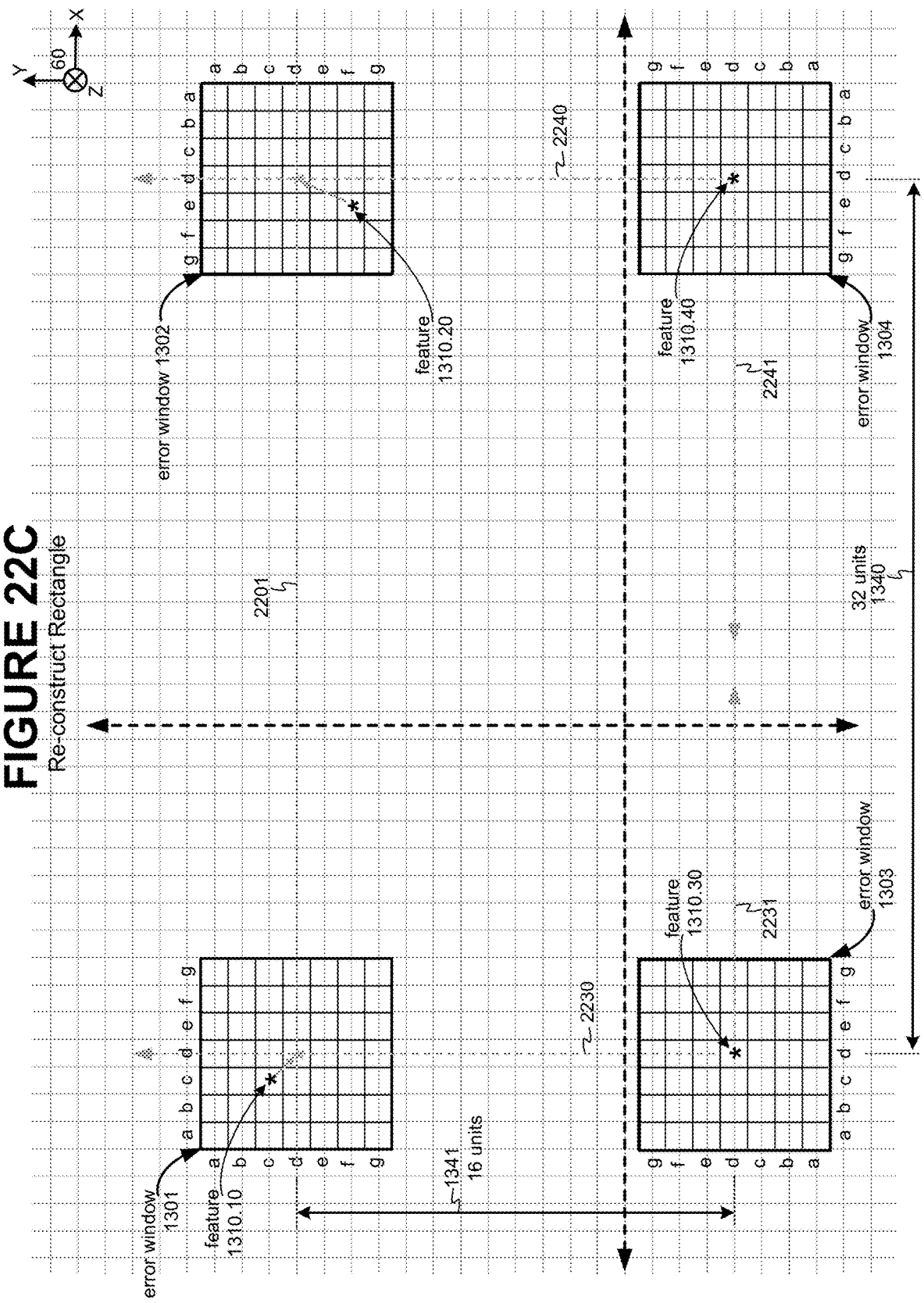

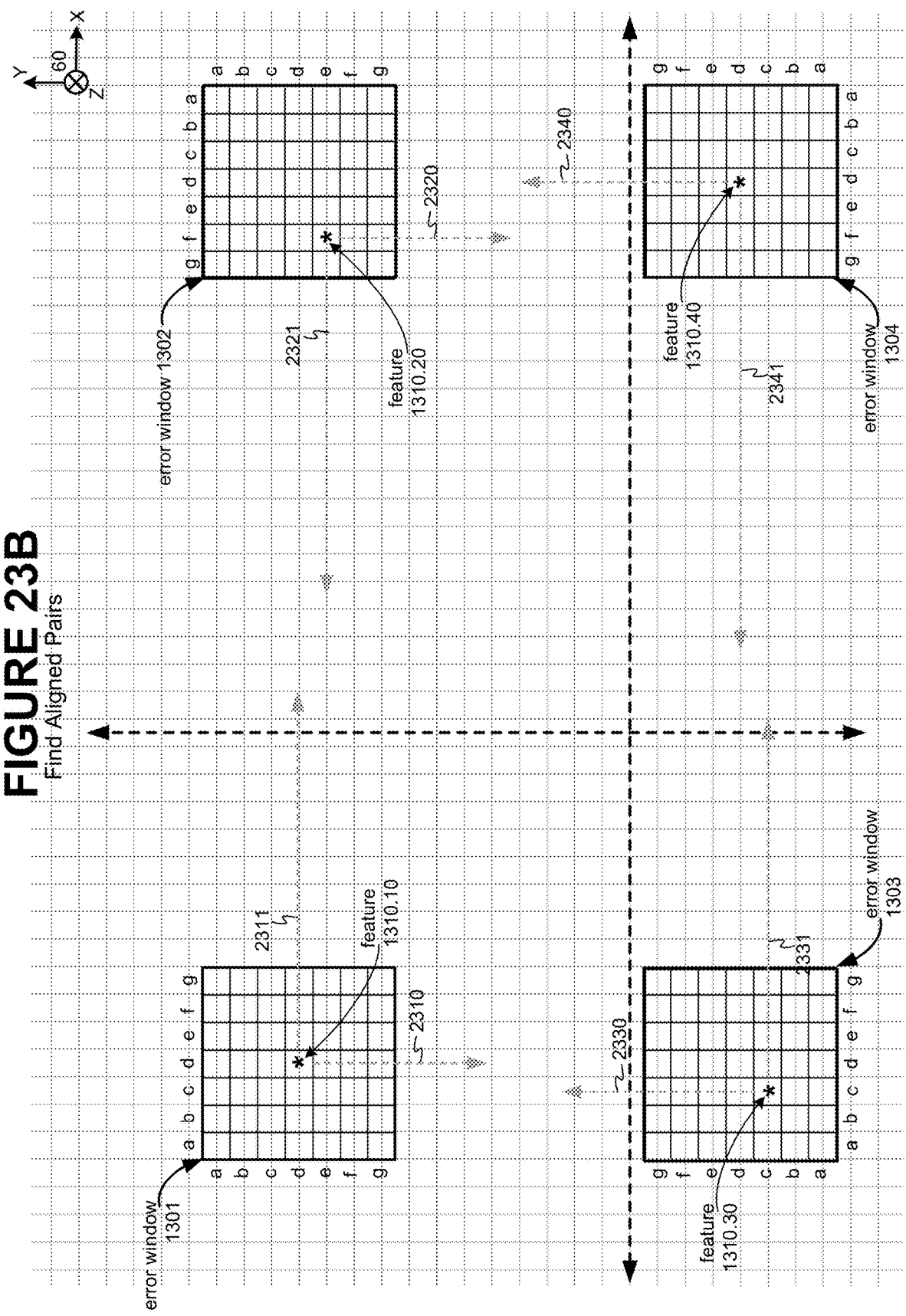

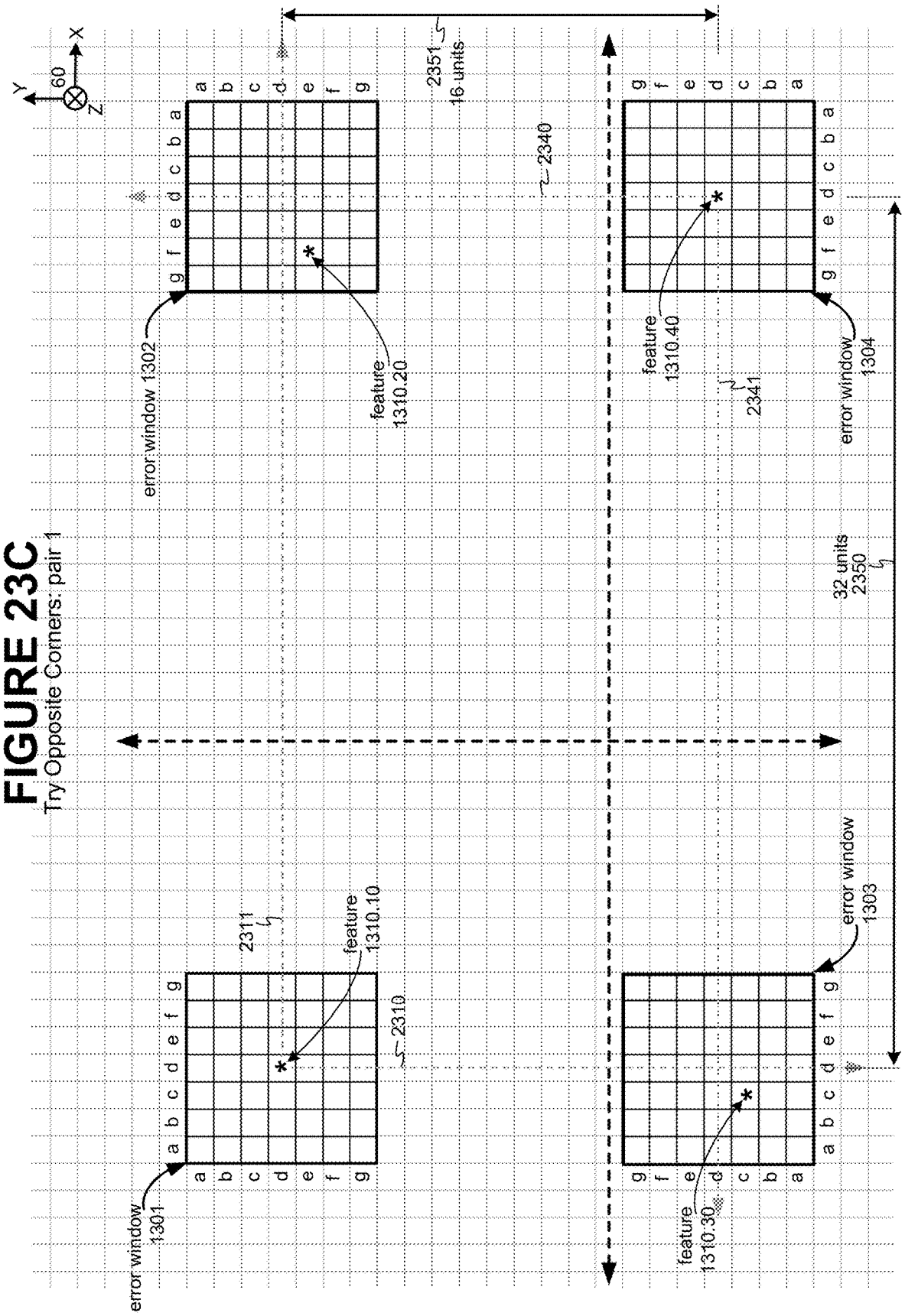

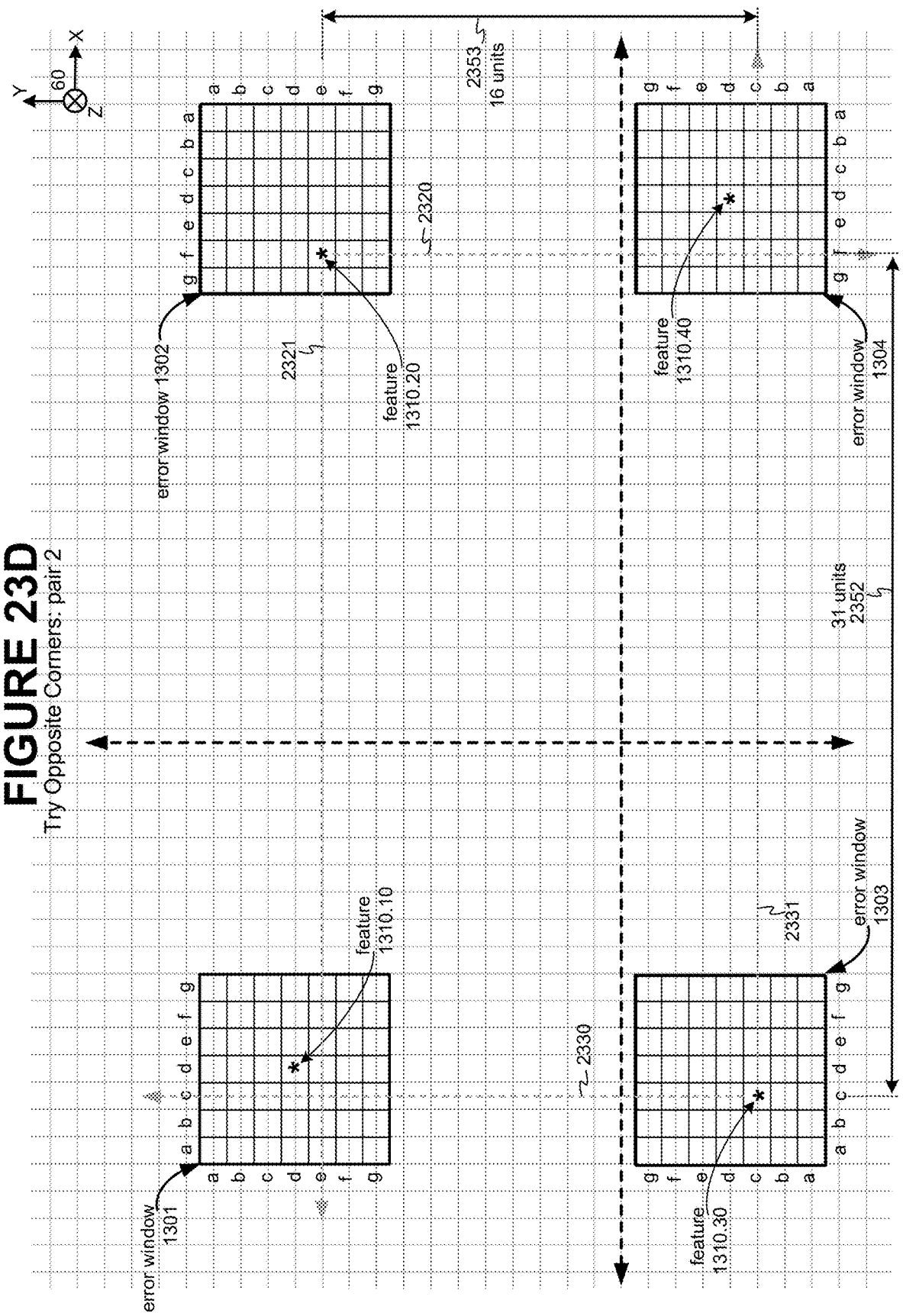

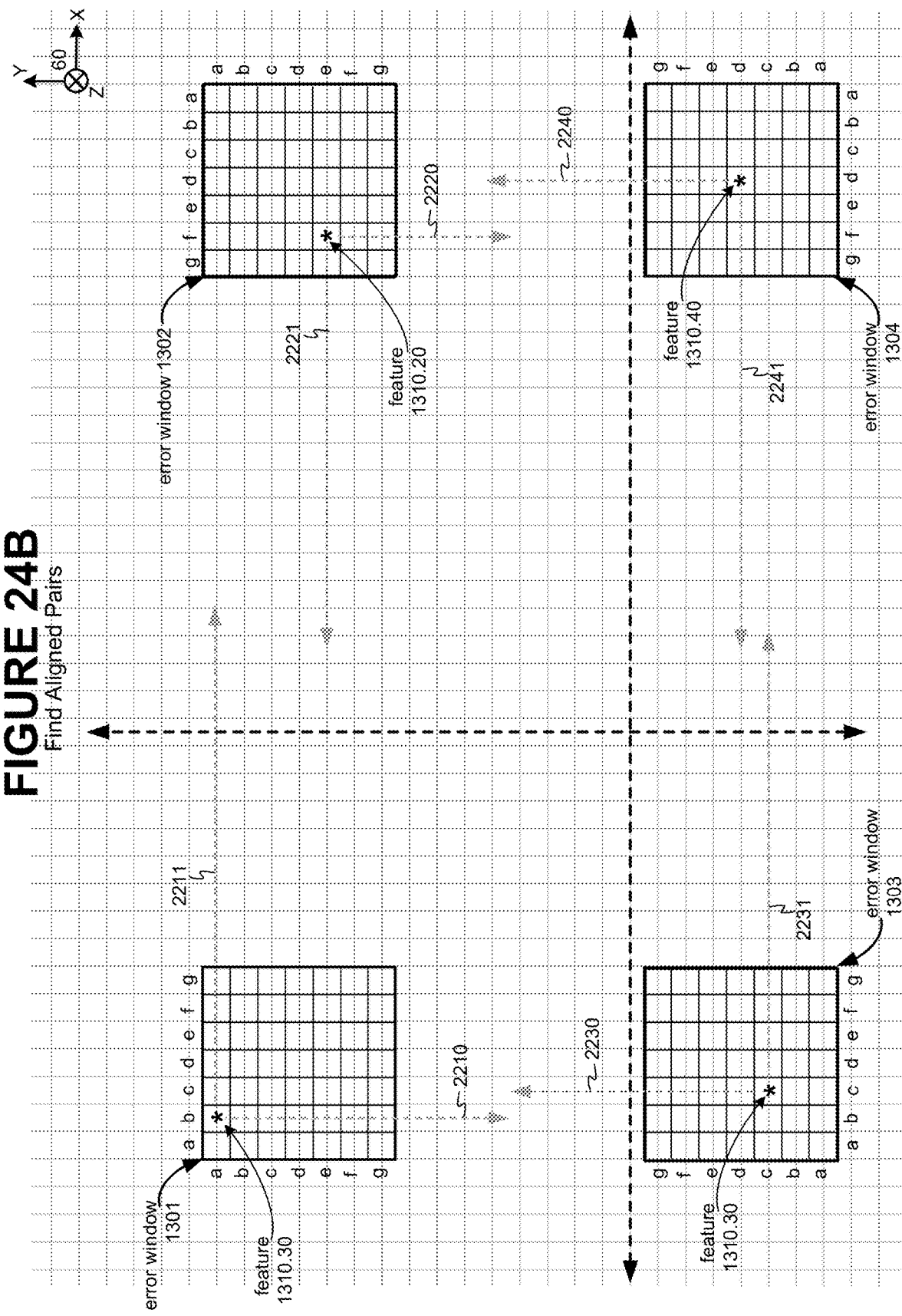

Try Opposite Corners: pair 1

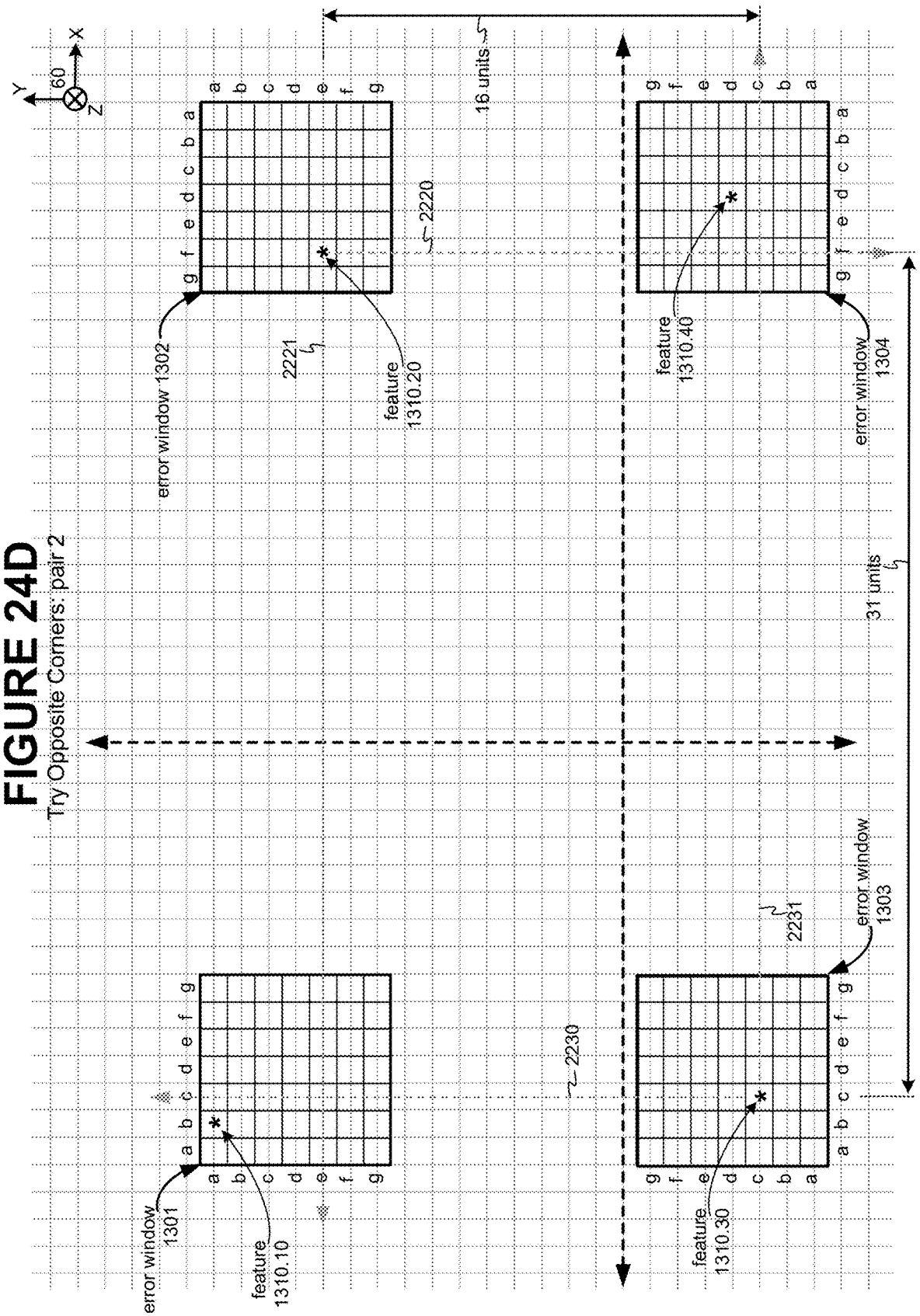

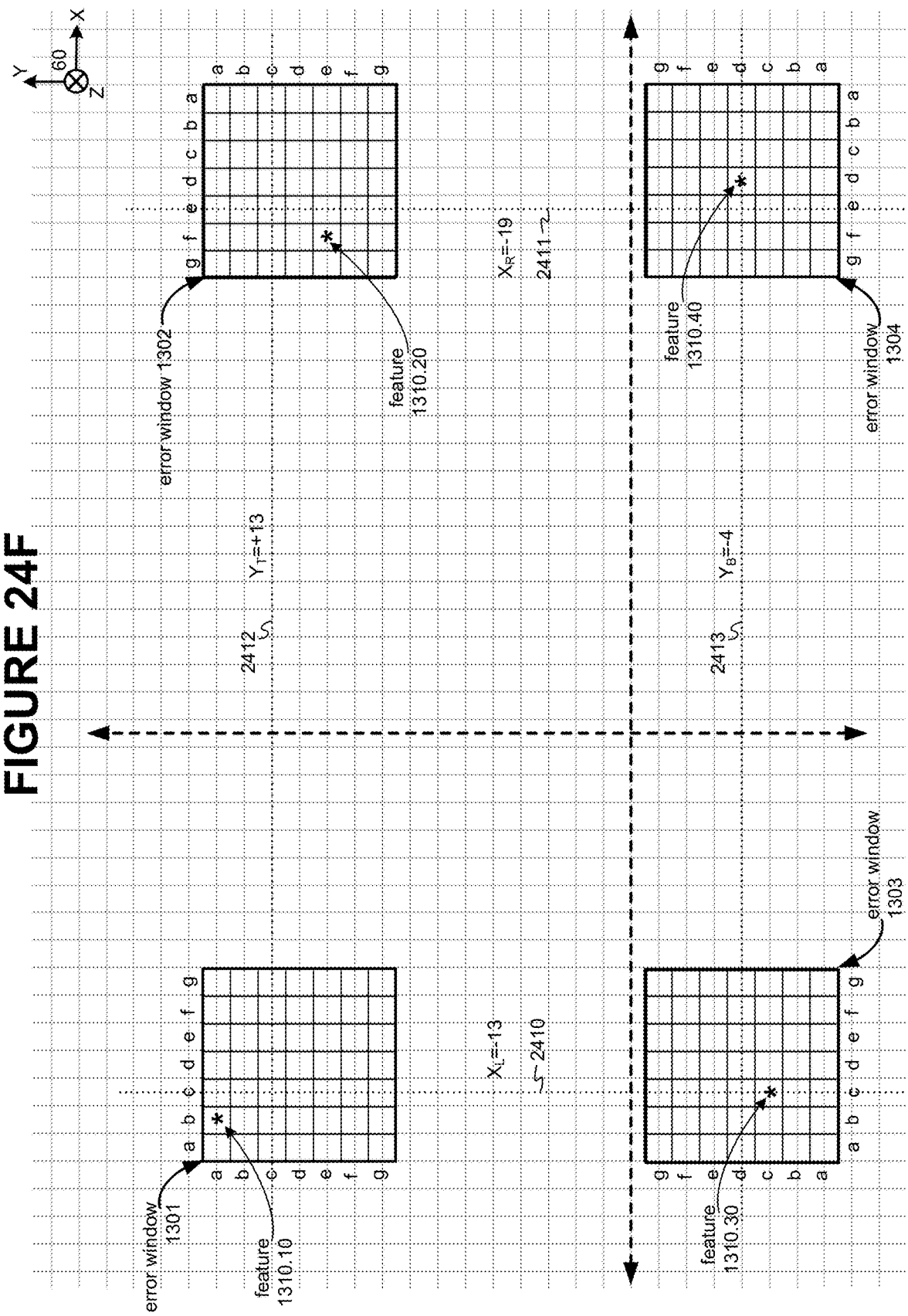

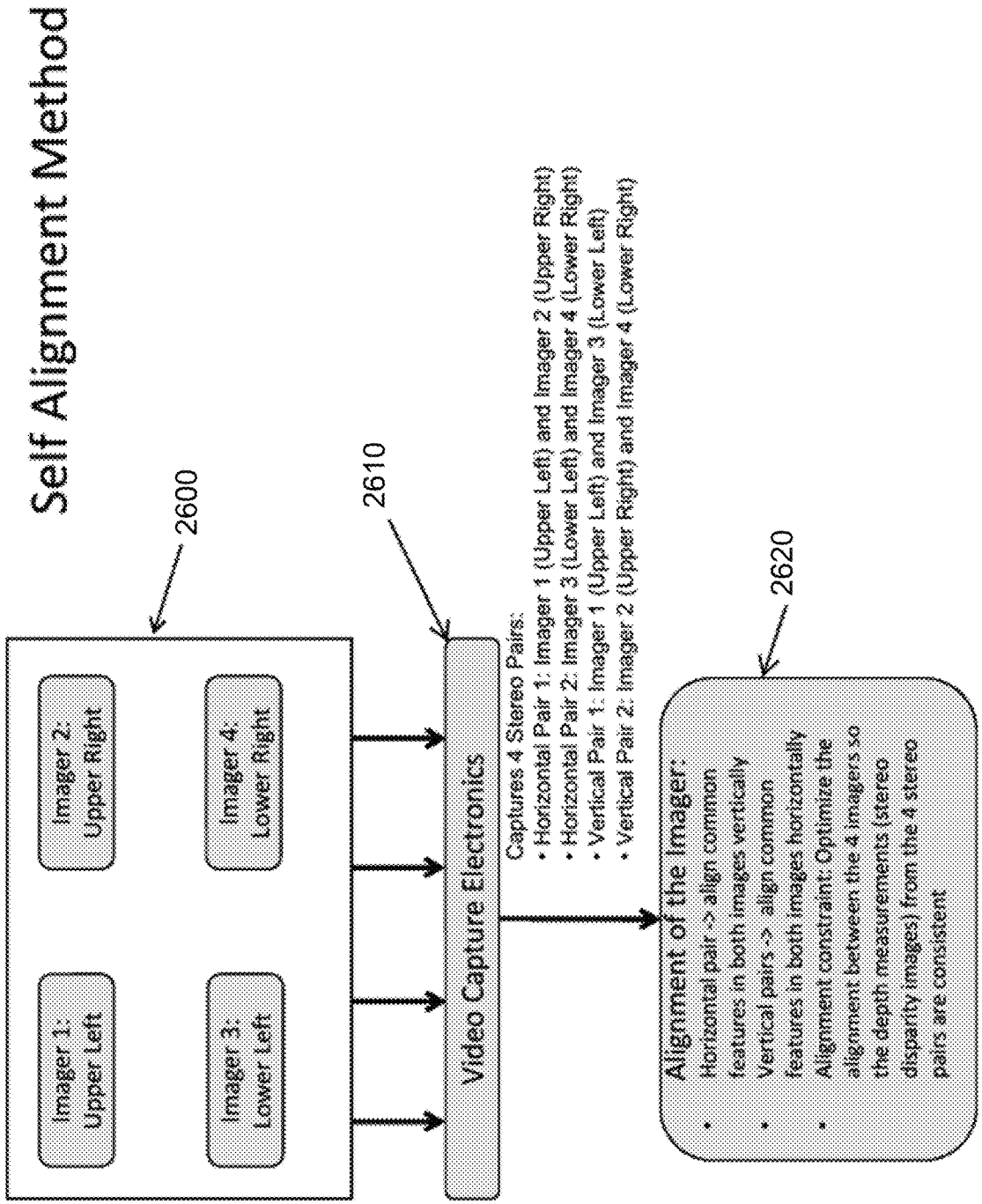

FIGURE 28A

Pseudocode for auto alignment

- (Xfi,Yfi) location of the common feature visible in all the images that is used for the auto alignment. For a quad imager configuration, there will be 4 coordinates (Xf1,Yf1), (Xf2,Yf2), (Xf3,Yf3) and (Xf4,Yf4)

1. Vertical misalignment (1,2) = Yf1 – Yf2 -> should be zero if the imagers are well calibrated
2. Vertical misalignment (3,4) = Yf3 – Yf4 -> should be zero if the imagers are well calibrated
3. Horizontal misalignment (1,3) = Xf1 – Xf3
4. Horizontal misalignment (2,4) = Xf2 – Xf4
5. Horizontal disparity average = ( |Xf1 – Xf2| + |Xf3 – Xf4| ) / 2
6. Vertical disparity average = ( |Yf1 – Yf3| + |Yf2 – Yf4| ) / 2
7. Convert the horizontal disparity and vertical disparity averages into geometric distance using the stereo formula (e.g., see "Computer & Machine Vision," Fourth Edition, by E.R. Davies, published 2012 by Elsevier Inc., Section 15.3.1, "Binocular Images.") and call this the Average distance (Ad)

FIGURE 28B

Pseudocode for auto alignment

8. Compute the new principal point $(Xn_i, Yn_i)$ for imager i, which results in zero vertical and horizontal misalignment (line 1 – 4), while also minimizing the total euclidean distance between the original principal point $(Xc_i, Yc_i)$ and the new principal point $(Xn_i, Yn_i)$ summed over all the imagers (Figure 27B) -> the goal is to find the smallest optical movement that will align the imagers. This process will be done through an optimization method 9. Another constraint that will be enforced during the optimization method is that the horizontal disparities average and the vertical disparity average (as computed in line 5 and 6 after the image is shifted by the distance between the calibrated principal point and the new principal point) must translate to the same geometric distance to the reference feature.

10. The optimization computed in #8 with the constraint #9 can be done using various algorithms, including brute force iterative method.

METHOD AND APPARATUS FOR A COMPUTER VISION CAMERA UNIT

As provided for under 35 U.S.C. § 120, this patent claims benefit of the filing date for the following U.S. patent application, herein incorporated by reference in its entirety:

"Method and Apparatus for a Computer Vision Camera Unit," filed 2018 Apr. 23 (y/m/d), having inventor Herman Herman and U.S. patent application Ser. No. 15/960,540.

As provided for under 35 U.S.C. § 120, U.S. patent application Ser. No. 15/960,540 claimed benefit of the filing date of, and incorporated by reference in its entirety, the following U.S. patent application, which is herein also incorporated by reference in its entirety:

"Method and Apparatus for a Computer Vision Camera Unit," filed 2017 Mar. 17 (y/m/d), having inventor Herman Herman and U.S. patent application Ser. No. 15/462,707.

As provided for under 35 U.S.C. § 119(e), U.S. patent application Ser. No. 15/462,707 claimed benefit of the filing date of, and incorporated by reference in its entirety, the following U.S. provisional patent application, which is herein also incorporated by reference in its entirety:

"Method and Apparatus for a Computer Vision Camera Unit," filed 2016 Mar. 17 (y/m/d), having inventor Herman Herman and App. No. 62/309,677.

FIELD OF THE INVENTION

The present invention relates generally to computer vision, and, more particularly, to a computer vision camera unit.

BACKGROUND OF THE INVENTION

Known computer vision systems, particularly those that offer stereo vision, are extremely complex and fragile.

For example, from the perspective of their mechanical construction, maintaining the alignment of the optical hardware is extremely difficult and expensive.

As another example, maintaining the integrity of high speed cabling and connectors is extremely difficult and expensive.

This is particularly true for computer vision (or "CV") systems subject to frequent mechanical disturbances (e.g., shocks, vibration, or both). Environments subject to such disturbances often also include temperature variation as an additional complication. Environments with these types of complications occur, for example, when CV systems are deployed on mobile platforms (such as autonomous, or semi-autonomous, vehicles).

This is unfortunate since, with respect to just information processing hardware itself, the cost of rugged systems has decreased dramatically in recent years. For example, currently-available smartphones are, in effect, rugged and inexpensive computer systems that also offer an ability to make telephone calls. If the additional vulnerabilities of CV systems can be addressed in an inexpensive way, the widespread use of such systems, with their concomitant benefit to society, can soon be expected.

Accordingly, there is a need for powerful and versatile CV systems, that are still rugged and inexpensive.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 4A is the same as FIG. 2A, except it is a magnified view, and the four lens-clamping structures are identified.

FIG. 7A shows a front view of CV camera unit 1, to which a cut-line 700 is added.

FIG. 8 depicts, in front view form and with focal points emphasized, the CV camera 1 shown in perspective form in FIG. 1C.

FIG. 10A is intended to illustrate how, prior to calibration, the focal point of each ICA may not coincide with its imaging chip's IE origin.

FIG. 10B omits the mechanical housing of CV camera 1, for purposes of focusing on the image sensing chips and CV calculations.

FIG. 10C is similar to 10B, except the image sensors have been enlarged, such that a set of axes, for each image sensor, can be illustrated.

FIG. 13E is the same as FIG. 13D, except the four pairs of axes of FIG. 13D are shifted, to have their origins coincident.

FIG. 14A presents an example CV camera 5 organized as a type 1.0 rectangle, rather than as a type 2.0 rectangle.

FIGS. 15C and 15D depict enumerating the number of type 1.0 rectangles possible, with a type 1.0 CV camera, and a 7 IE×7 IE error window.

FIGS. 15E and 15F depict enumerating the number of type 1.0 rectangles possible, with a type 1.0 CV camera, and a 6 IE×6 IE error window.

FIGS. 17F and 17G depict an enumeration of the type 2.0 rectangles possible, within the constraints of FIG. 17E.

FIGS. 19F and 19G depict an enumeration, of the candidate rectangular solutions, given the extra constraints of the misalignments.

FIGS. 20A-20C each consider one of the candidate reflective rectangular configurations identified in FIGS. 19F-19G.

FIG. 21A depicts the same one-RRE example addressed above in connection with FIG. 19A, except the solution is found by heuristics.

FIG. 21B graphically depicts the process by which pairs of feature-views, that are aligned exactly, are identified.

FIG. 21C depicts the completion of what is believed to be the correct rectangular configuration.

FIG. 22B shows that only one pair of feature-views is found to be aligned.

FIG. 22C shows the reconstruction of a complete rectangular configuration from only one pair of feature-views.

FIG. 23B shows, when proceeding around the perimeter of the polygon formed by the four feature-views, there is not even one pair of feature-views aligned with either the X or Y axes.

FIGS. 23C-23D each considers a diagonal pair of feature-views, as possibly defining a rectangular configuration of the correct type.

FIG. 24B shows that there is no pair of feature-views that aligns with either the X axis or Y axis.

FIGS. 24C-24D each addresses a diagonal-pair of feature views, neither of which defines a rectangular configuration of the correct type.

FIG. 24F depicts using the coordinates of FIG. 24E to determine averages, that form a good starting point, for attempting to determine the correct translated position of the rectangle of the correct size.

FIG. 26 presents an overview, of the automatic self-alignment apparatus, data flow, and procedure.

FIGS. 28A-28B present example pseudo-code, by which self-alignment can be accomplished.

DETAILED DESCRIPTION

Reference will now be made in detail to various embodiments of the invention, examples of which are illustrated in the accompanying drawings. Wherever possible, the same reference numbers will be used throughout the drawings to refer to the same or like parts.

Please refer to the section titled "Glossary of Selected Terms," for the definition of selected terms used below.

Table of Contents to Detailed Description

1 Mechanical Construction
2 Automatic Alignment
   2.1 Introduction
   2.2 Rectangular Stereo Pairs
   2.3 Detecting RRE's
      2.3.1 Overview
      2.3.2 Detecting Misalignment
         2.3.2.1 Type 1.0
         2.3.2.2 Type 2.0

Figure 1B:
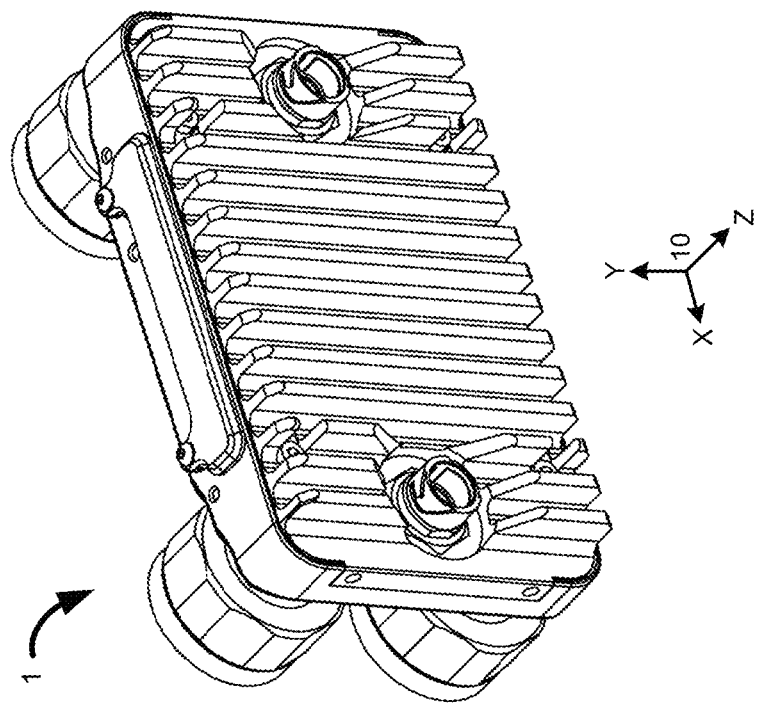
FIG. 1B depicts the back side of the CV camera unit of FIG. 1A.
Figure 1A:
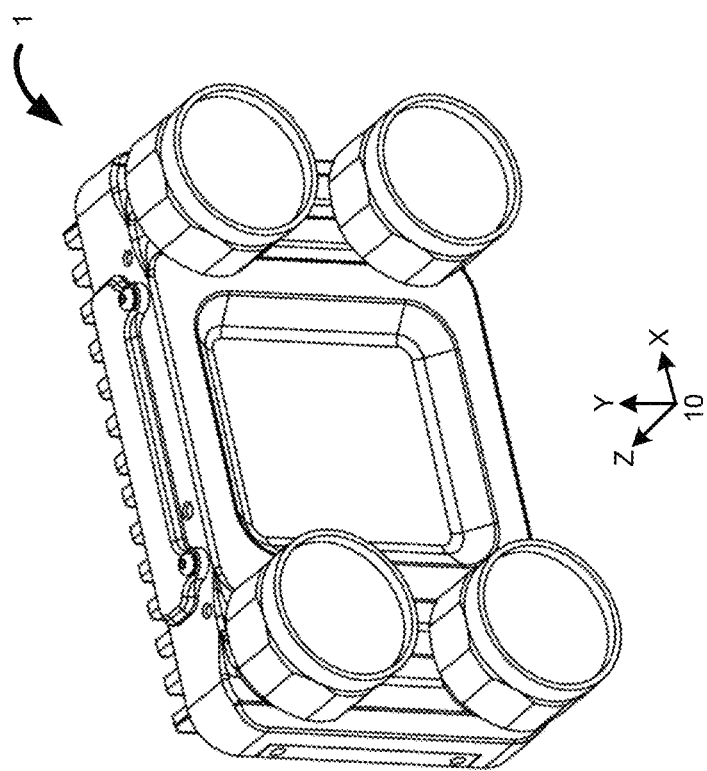
FIG. 1A depicts an example perspective view of the front side of a CV camera unit.

2.4 Correcting for RRE's
2.4.1 Overview
2.4.2 Exhaustive Optimization
  2.4.2.1 Four RRE Example
  2.4.2.2 One RRE Example
2.4.3 Heuristics
  2.4.3.1 two aligned pairs
  2.4.3.2 one aligned pair
  2.4.3.3 one diagonal pair
2.4.4 Large Search Spaces
2.5 Comparison to Single Stereo-Pair
2.6 Summary
3 Foveal and Peripheral Vision Emulation
4 Versatility
5 Additional Information
5.1 Number of Square Configurations
5.2 Likeliness of 3 RRE's forming Rectangle
6 Glossary of Selected Terms 1 Mechanical Construction FIG. 1A depicts an example perspective view of the front side of a CV camera unit 1, with an example set of axes 10. FIG. 1B depicts the back side of the CV camera unit of FIG. 1A, with a corresponding view of axes 10.

The example CV camera unit focused upon herein includes at least four image capture assemblies (or ICA's), where an ICA is a combination of (at least) an imager chip (e.g., a CCD integrated circuit) and its optical hardware (e.g., a lens assembly). Each ICA is at the vertex of a rectangular configuration.

Figure 1C:
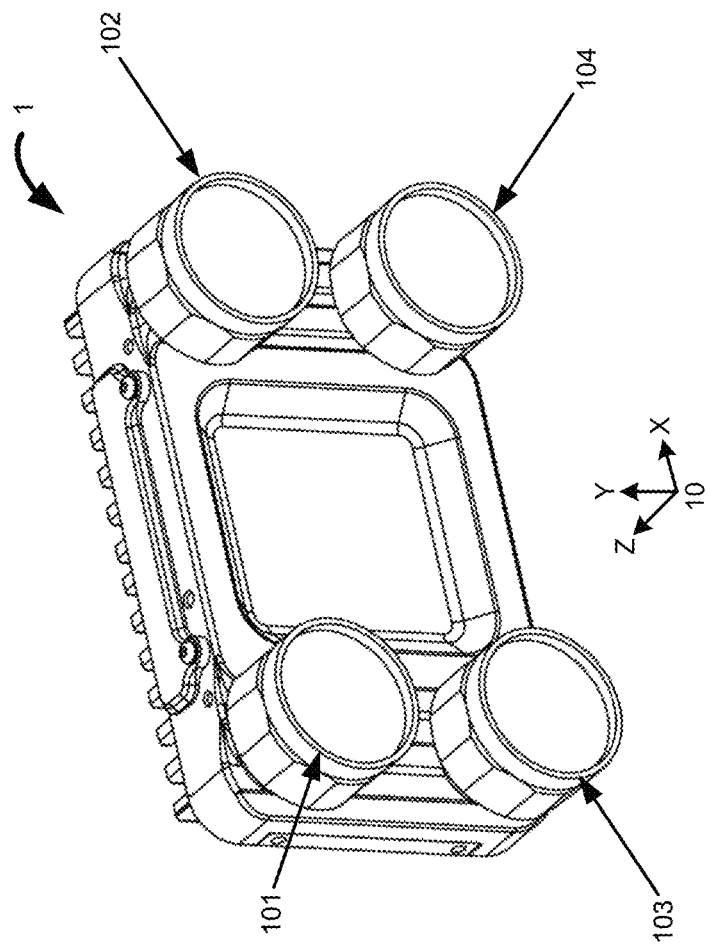
FIG. 1C is the same as FIG. 1A, except it indicates the four ICA's, of CV camera unit 1, with numeric labels 101-104.

FIG. 1C is the same as FIG. 1A, except it indicates the four ICA's, of CV camera unit 1, and numbers them 101-104.

As will be discussed further in the following section ("Automatic Alignment"), the type of CV camera focused upon herein are those providing what is called stereo depth perception. As is known in the art, a stereo vision system utilizes a pair of cameras, focused on essentially the same scene, but separated by a known small distance. The images from the camera pair can be expected to have small differences from each other due to parallax effects. By measuring the disparities, between images from a pair of cameras, the distance of objects from the CV camera can be determined. Objects seen with greater disparity, between the two cameras, are known to be closer. Standard procedures for stereo vision are described in such texts as the following: "Computer & Machine Vision," Fourth Edition, by E. R. Davies, published 2012 by Elsevier Inc., and herein incorporated by reference in its entirety. In particular, Section 15.3.1 ("Binocular Images") of Davies addresses the determination and use of disparity. Also, Section 15.3.2 ("The Correspondence Problem") of Davies addresses approaches to determining pairs of points that match in the two images of the stereo pair.

Figure 2A:
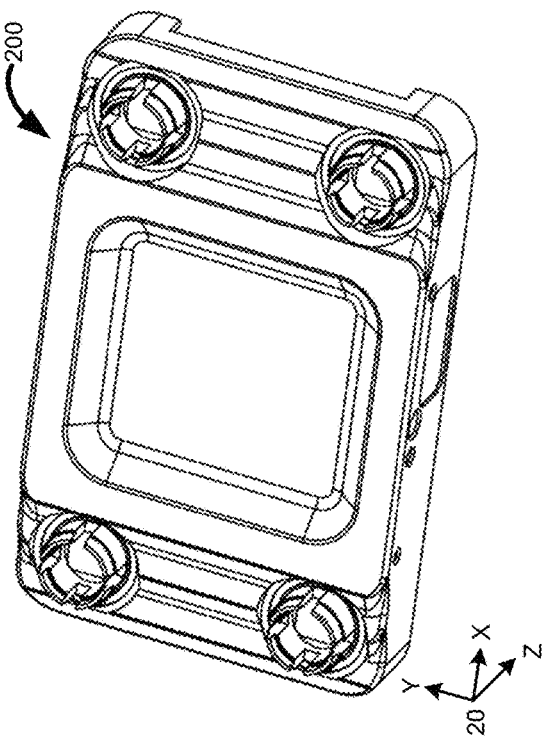
FIG. 2A depicts an example perspective view of just the front side of just the front plate of the CV camera of FIG. 1A.

FIG. 2A depicts an example perspective view of just the front plate (and without lens assemblies) of the front side of the CV camera 1 of FIG. 1A. (The example front plate of FIG. 2A is numbered 200. The differing orientation of FIG. 2A, with respect to FIG. 1A, can be seen from set of axes 20.)

While the front plate varies with respect to its external shape, it can be advantageous to have the material, from which the front plate is made, essentially uniform throughout. For example, the front plate of FIG. 2A can be machined, with a CNC milling machine, from a single block of aluminum. Such uniformity is important for maintaining accurate and consistent placing of the ICA's with respect to each other, despite environmental variations (e.g., temperature changes).

Figure 2B:
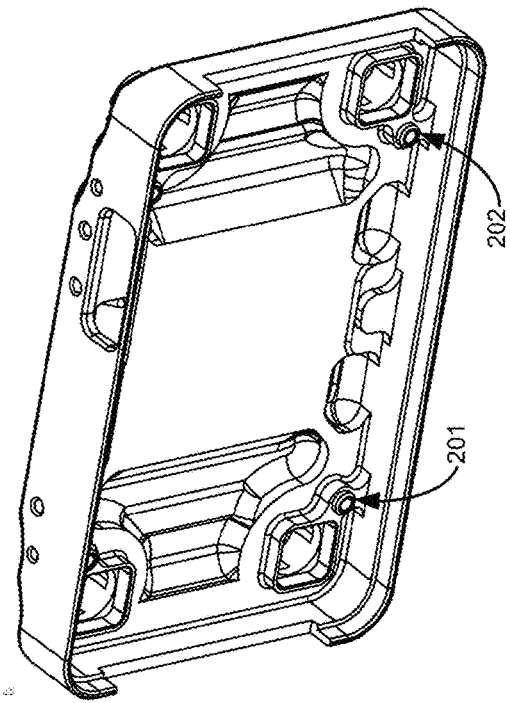
FIG. 2B depicts the same front plate of FIG. 2A, except the surface of the front plate that faces the interior of the CV camera unit is shown

FIG. 2B depicts the same front plate of FIG. 2A, except the surface of the front plate that faces the interior of the CV camera unit is shown.

Figure 3A:
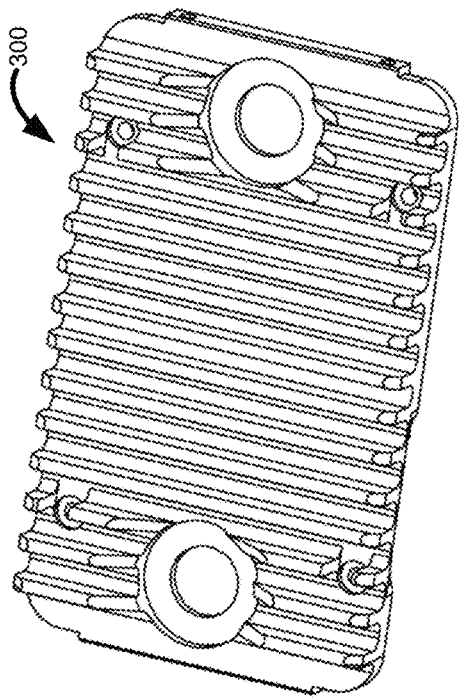
FIGS. 3A and 3B are the same as, respectively, FIGS. 2A and 2B, except they depict an example back plate of the example CV camera unit.
Figure 3B:
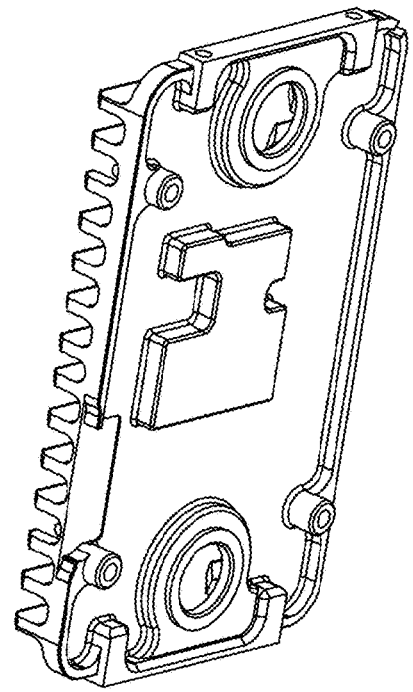

FIGS. 3A and 3B serve the same purposes as, respectively, FIGS. 2A and 2B, except they depict just an example back plate of the example CV camera unit 1. (The example back plate of FIG. 3A is numbered 300.)

FIG. 4A is the same as FIG. 2A, except it is a magnified view, and the four structures for lens-assembly clamping (numbered 401-404), are identified. As part of the construction process, for a CV camera unit, a lens assembly is inserted at each lens-clamping structure. The lens assembly can be of a tubular shape, with threading on its exterior surface. Each lens-clamping structure can also have threading, where its internal threading matches the exterior-surface threading of a lens assembly.

Figure 4B:
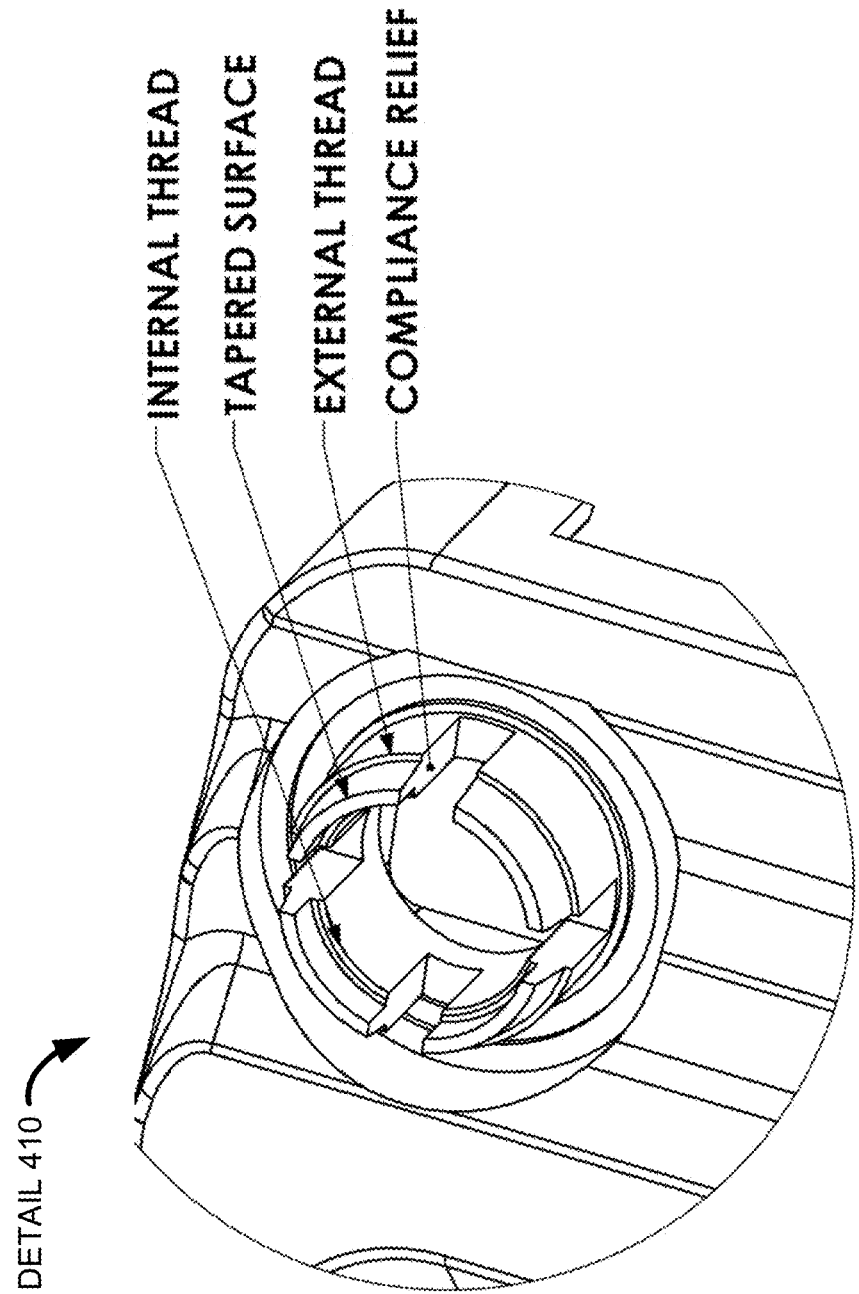
FIG. 4B is the same as FIG. 4A, except it is a further magnified view, that just depicts one of the four lens-clamping structures.

FIG. 4B is the same as FIG. 4A, except it is a further magnified view of FIG. 4A's detail area 410. FIG. 4B depicts just one of the four lens-clamping structures (structure 402). The example lens-clamping structure shown has four lens-clamping "fingers" that, in connection with a clamping nut, tightly, and uniformly, grasp a lens assembly.

Figure 6A:
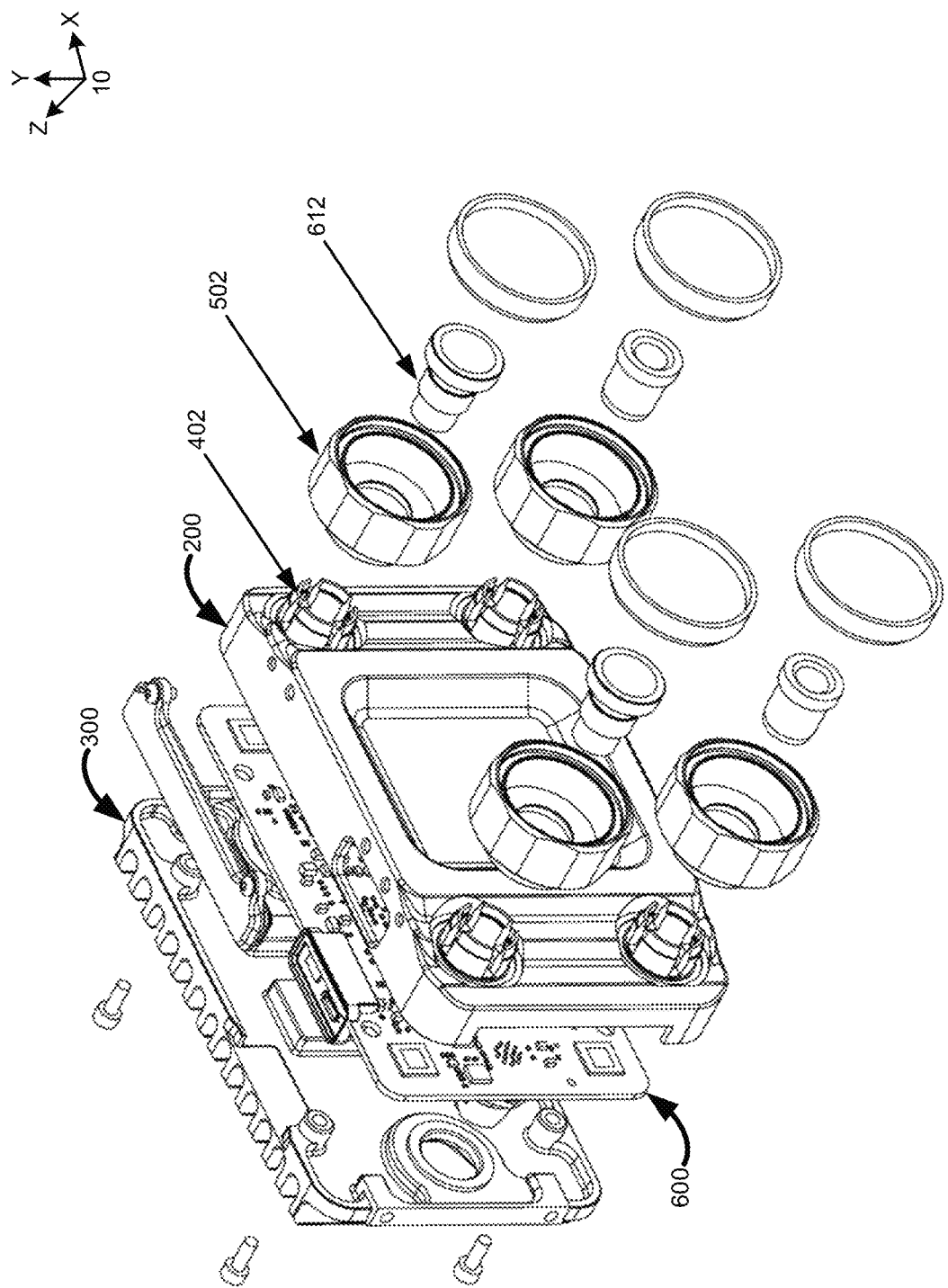
FIG. 6A depicts an exploded view of the CV camera unit, showing how the major components are assembled.

FIG. 6A depicts an exploded view of the CV camera unit, showing how the major components are assembled. For example, the figure shows front plate 200, and back plate 300. Additionally, FIG. 6A indicates lens-clamping structure 402, along with its relationship to a lens assembly 612, and clamping nut 502.

For the one lens-clamping structure 402, shown in FIG. 4B, 4 key sub-features are identified:
  "INTERNAL THREAD" for matching with external threading of a lens assembly.
  "TAPERED SURFACE" that causes progressively greater gripping, of a lens assembly, as a clamping nut is progressively tightened.
  "EXTERNAL THREAD" for progressively greater tightening of a clamping nut.
  "COMPLIANCE RELIEF" locations, that divide a lens-clamping structure into four "fingers."

Figure 5B:
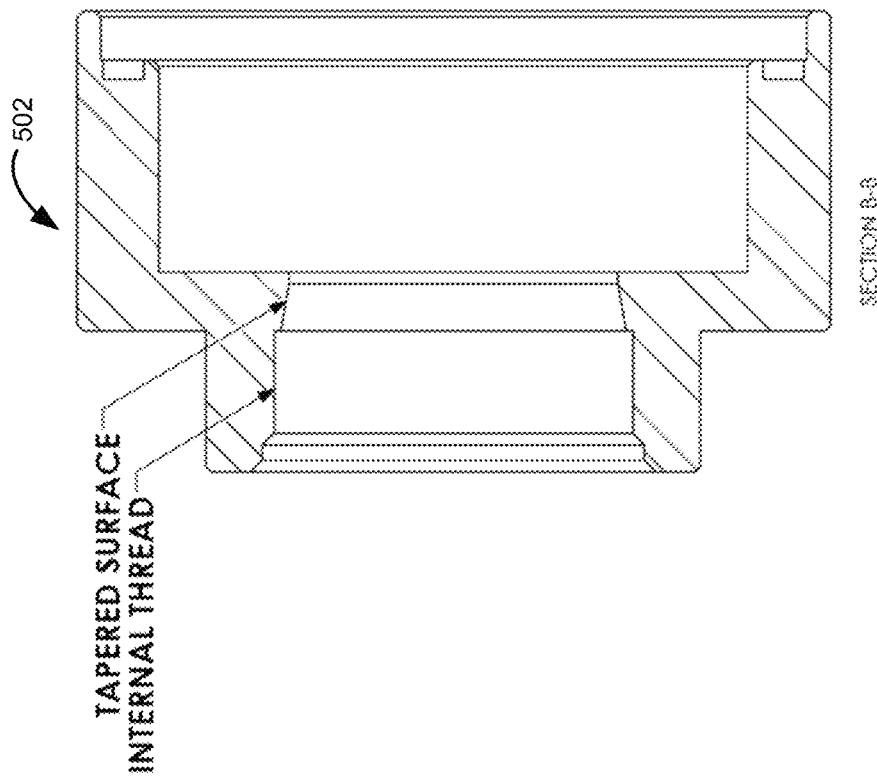
FIGS. 5A and 5B depict, respectively, front and side views of a clamping nut.
Figure 5A:
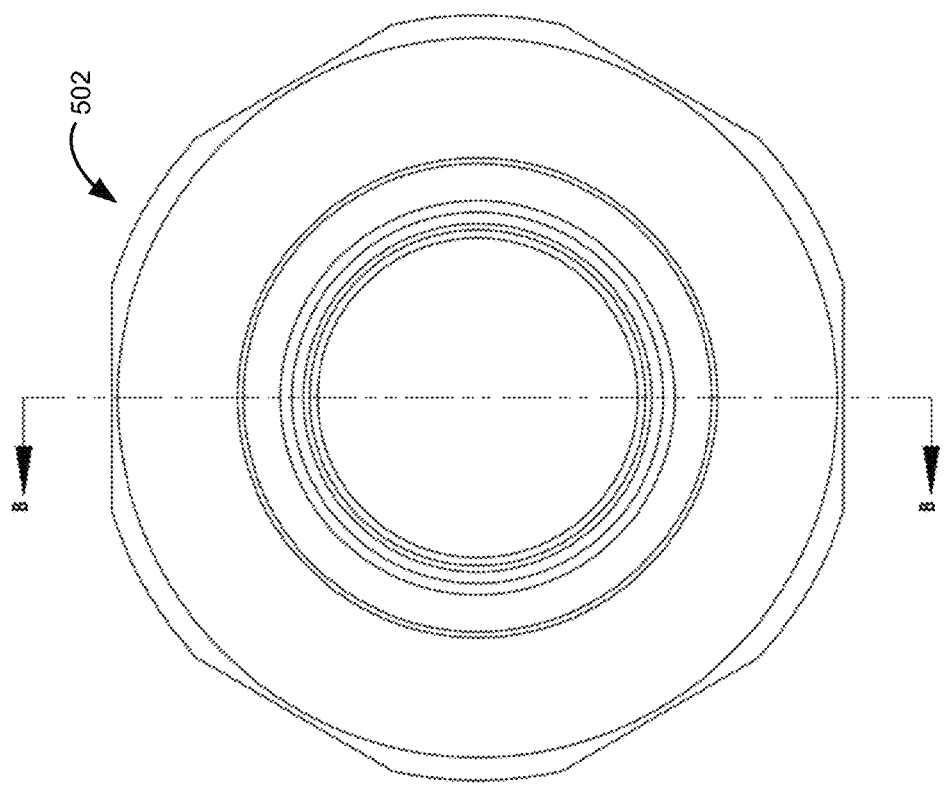

FIGS. 5A and 5B depict, respectively, front and side views of a clamping nut. (FIGS. 5A and 5B show the clamping nut as representing, for example, clamping nut 502.) FIG. 5A includes a cut line B-B, which defines the side view of FIG. 5B. As can be seen, FIG. 5B depicts internal threading, that matches the external threading of a lens-clamping structure (labeled "EXTERNAL THREAD" in FIG. 4B).

Once a lens assembly has been inserted, into a lens-clamping structure, it can be tightened in-place with a clamping nut. Specifically, as the internal threading of the clamping nut progressively covers the external threading of a lens-clamping structure, the tapered surface of the clamping nut (FIG. 5B) progressively applies increased pressure to the tapered surface of lens-clamping structure (FIG. 4B). At each point during the tightening process, the clamping nut applies an essentially uniform pressure to each of the clamping fingers. The uniform application of pressure achieves a progressively tightened holding, of a lens assembly, with a minimum of additional movement of the lens assembly (relative to the camera unit front plate).

In addition to front plate 200, and back plate 300, FIG. 6A also introduces a single printed-circuit board (or PCB) 600.

Figure 6B:
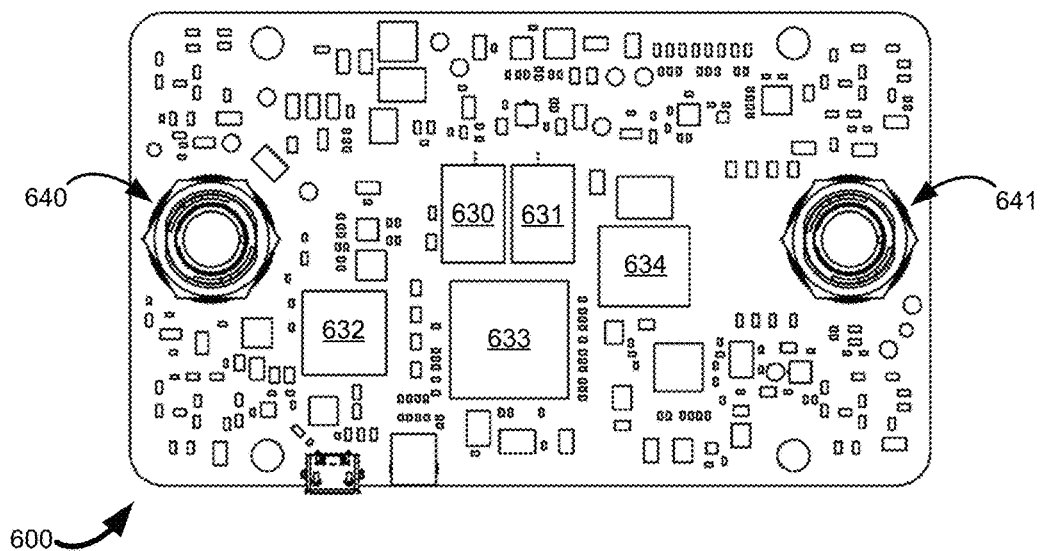
FIGS. 6B-6D show views of a same, single, printed-circuit board (or PCB), on which the electronics of the present CV camera unit can be mounted.
Figure 6C:
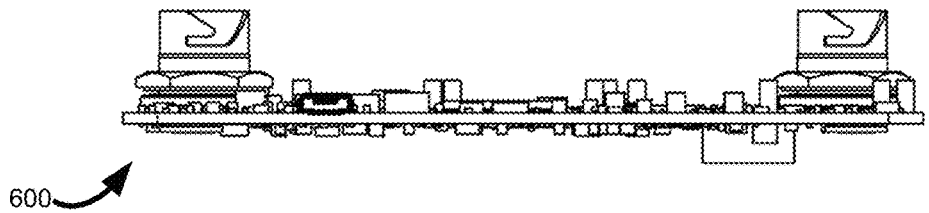
Figure 6D:
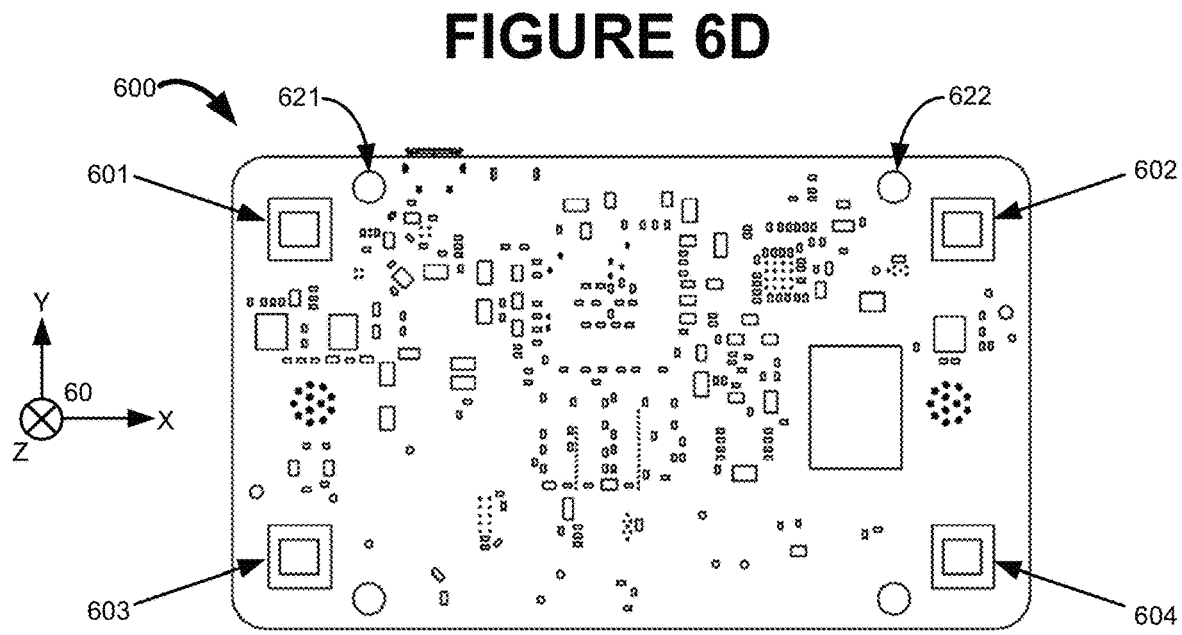

FIGS. 6B-6D each show just PCB 600, but from differing views. PCB 600 can serve as a unifying structural element, on which the imaging and image-processing electronics, of the present CV camera unit, can be mounted. FIG. 6B shows the side of the PCB that faces the inside of the back plate of the CV camera unit (e.g., faces the side of back plate 300 emphasized in FIG. 3B). FIG. 6C shows a side view of the PCB. FIG. 6D shows the side of the PCB (that we shall call the "front" side) facing the inside of the front plate of the CV camera unit (e.g., faces the side of front plate 200 emphasized in FIG. 2B).

As can be seen in FIG. 6D, at each corner, of the front side of the PCB, can be placed an imager chip (labeled 601-604). Each imager chip 601-604 is part of, respectively, each ICA 101-104 of FIG. 1C. To further clarify the relationship of FIG. 6D with FIG. 1A, FIG. 6D includes a set of axes 60 that correspond, in front view form, to set of axes 10.

Mounting all the imager chips on a single PCB, on which is also mounted the high-speed hardware for utilizing the imager chips, has many advantages. First, there is mechanical stability, in the unitary and uniform nature of a single PCB, that is comparable to the stability of lens assemblies and the front plate. Second, high speed cabling and connectors are often quite expensive. Having the imager chips, and the electronics that process their data, on a single PCB, reduces such connector costs to a minimum (while enhancing reliability). Third, the placement of components on PCB's has already been developed to a high level of accuracy (generally, placement is with sub-micron accuracy). This level of placement accuracy, originally developed for non-optical reasons, can now be re-purposed to achieve highly accurate, yet inexpensive, optical assemblies. Further, a single simple alignment between the front plate and PCB, on the basis of mechanical pins and holes, achieves a total accurate alignment of the lens assemblies and their corresponding imager chips. For example, pins 201 and 202, of the inside of the front plate (FIG. 2B), matching with holes of PCB 600, such as holes 621 and 622 (FIG. 6D).

Indicated in FIGS. 6B-6D are various components by which the CV camera unit can accomplish its signal and information processing. For example, FIG. 6B indicates various blocks, such as 630-634, that can represent various kinds of integrated circuit chips used to accomplish these purposes. For example, blocks 630-631 can represent high-capacity DRAM chips, on which data and/or programs can be stored. Blocks such as 633 can represent FPGA chips (such as those produced by XILINX, Inc. (San Jose, Calif., USA).

Overall, these chips can be expected to implement an image processing pipeline, that is able to process a constant stream of image frames, as they are produced by imager chips 601-604 (often at frame rates, per imaging chip, of about 30 per second). The pipeline begins with interface circuitry, that extracts signals produced by the imager chips. These signals can then be subject to various kinds of pre-processing (such as color-space conversion, or noise reduction), before being subjected to higher-level CV algorithms (such as stereo depth perception).

The particular balance, between use of hardware or software, will depend on such factors as the speed required (e.g., a faster response generally requires more operations done in hardware), and cost considerations (e.g., implementing a function in software is generally less expensive).

Other components can provide the signal levels, and implement the protocols, necessary to allow CV camera unit 1 to exchange data (and other types of signals) with a robotic system in which it may be incorporated. FIG. 6B, for example, indicates two hardware networking ports 640 and 641, that can provide a cable-based network connection (such as Gigabit-level Ethernet).

Figure 7C:
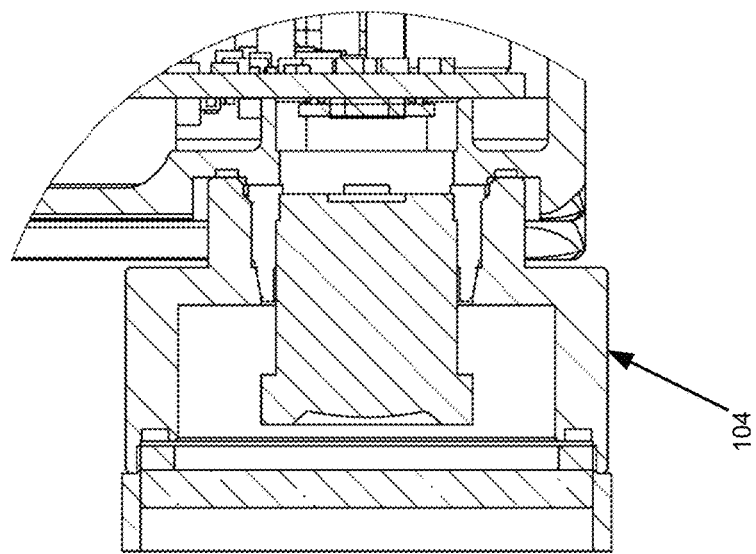
FIG. 7C depicts a magnified view, of a portion of the cross section of FIG. 7B.
Figure 7B:
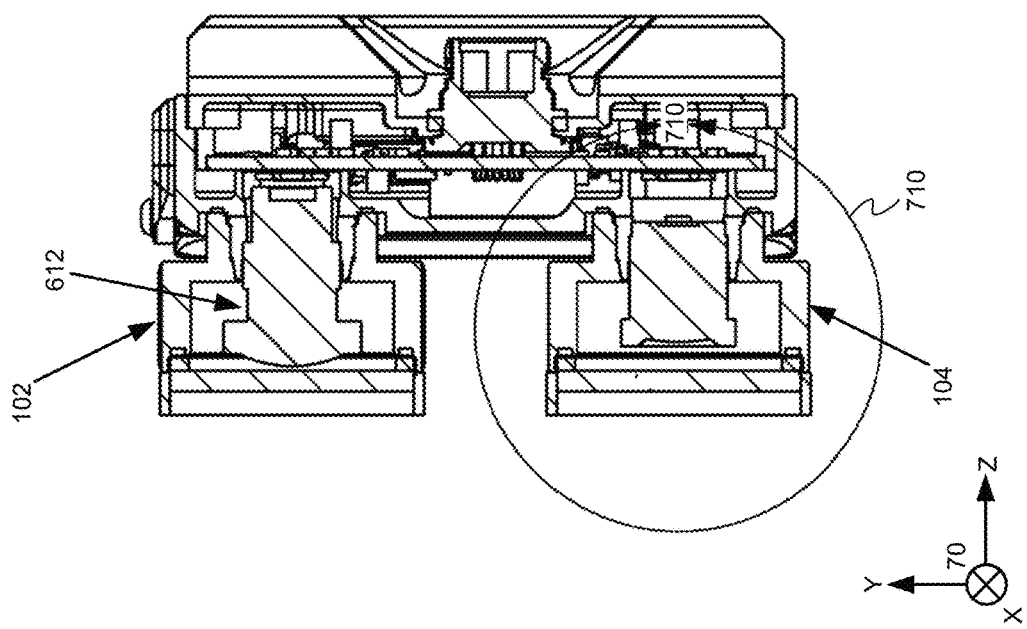
FIG. 7B illustrates the cross section defined by cut-line 700.

FIG. 7A shows a front view of CV camera unit 1, to which a cut-line 700 is added. The cross section defined by cut-line 700 (that cuts through ICA's 102 and 104) is illustrated in FIG. 7B. (FIG. 7B's relationship to FIG. 7A is further illustrated by set of axes 70.) FIG. 7C depicts a magnified view of a portion 710 (ICA 104) of the cross section of FIG. 7B.

2 Automatic Alignment

2.1 Introduction

An important feature, of the mechanical construction described in the previous section, is that it is designed to limit the possibilities for mis-alignment of the CV camera unit. Specifically, once a CV camera unit has been calibrated (for example, at its manufacturing facility), the mechanical construction of the previous section is intended to be extremely stable, despite many environmental stressors.

While extremely stable, there can still be environmental stressors, during a CV camera's ordinary use, that necessitate realignment. With known CV camera systems, such realignment can only be addressed by reapplication of specialized calibration procedures. Such calibration procedures almost always require temporary removal of the CV camera from its intended application environment. It would be advantageous if a CV camera could, while remaining in use, recalibrate itself.

In addition to the ever-present possibility of events that can necessitate realignment, if a CV camera system can be relied upon to recalibrate itself, this capability can enable new design trade-offs. For example, a significant component of the cost, for CV stereo systems, are the lens assemblies (e.g., lens assembly 612 of FIG. 6A, as discussed in the previous section). For known CV stereo systems, the components of a lens assembly (such as its lenses) must remain extremely stable (e.g., a lens of a lens assembly cannot shift within its mounting structure). For example, a shift in an optical component that causes even a single-pixel shift, in the image captured, can be unacceptable. This is because a change of even a few pixels, in the disparities measured by a camera pair, can have a substantial effect on the useful range of depths that can be measured by a CV camera (especially for those objects farther away from a CV camera, where disparity eventually decreases to zero).

Inexpensive lens assemblies have the characteristic that they can undergo small, but chaotic (or random), shifts in their focal (or principal) point. Specifically, an individual lens can slightly shift, within its mounting, such that the focal point of its containing lens assembly slightly shifts. If used in a CV system, this slight shift of focal point means that, for the ICA of which the lens assembly is a part, the focal point is directed to a different photo-sensitive (or imaging) element of its imager chip. In the following discussion, we will sometimes refer to one of these chaotic shifts as a "Random Realignment Event" (or RRE), and we will also refer to an imaging element as an "IE."

The possibility for an RRE means that a location, as measured by an ICA, can be more realistically treated as the center of an error window. The error window encloses the maximum extent, in any direction along the X and Y axes, to which an indicated location (by an ICA) may differ from the actual location.

If such inexpensive lens assemblies are to be used, an automated, and in-the-field, calibration procedure is needed. Below is presented an inventive and automatic calibration procedure, in conjunction with the inventive apparatus, for addressing such focal point shifts.

2.2 Rectangular Stereo Pairs

As a substrate, upon which automatic calibration can be performed, the present invention relies upon a rectangular arrangement of ICA's, such as the arrangement of ICA's 101-104 of FIG. 1C. This arrangement is repeated, in front view form, in FIG. 8. FIG. 8 indicates a focal point 801-804 for each of, respectively, ICA's 101-104. FIG. 8 indicates that, along the X-axis, distance 811 is twice the of distance 810, where 810 is along the Y-axis.

Figure 9:
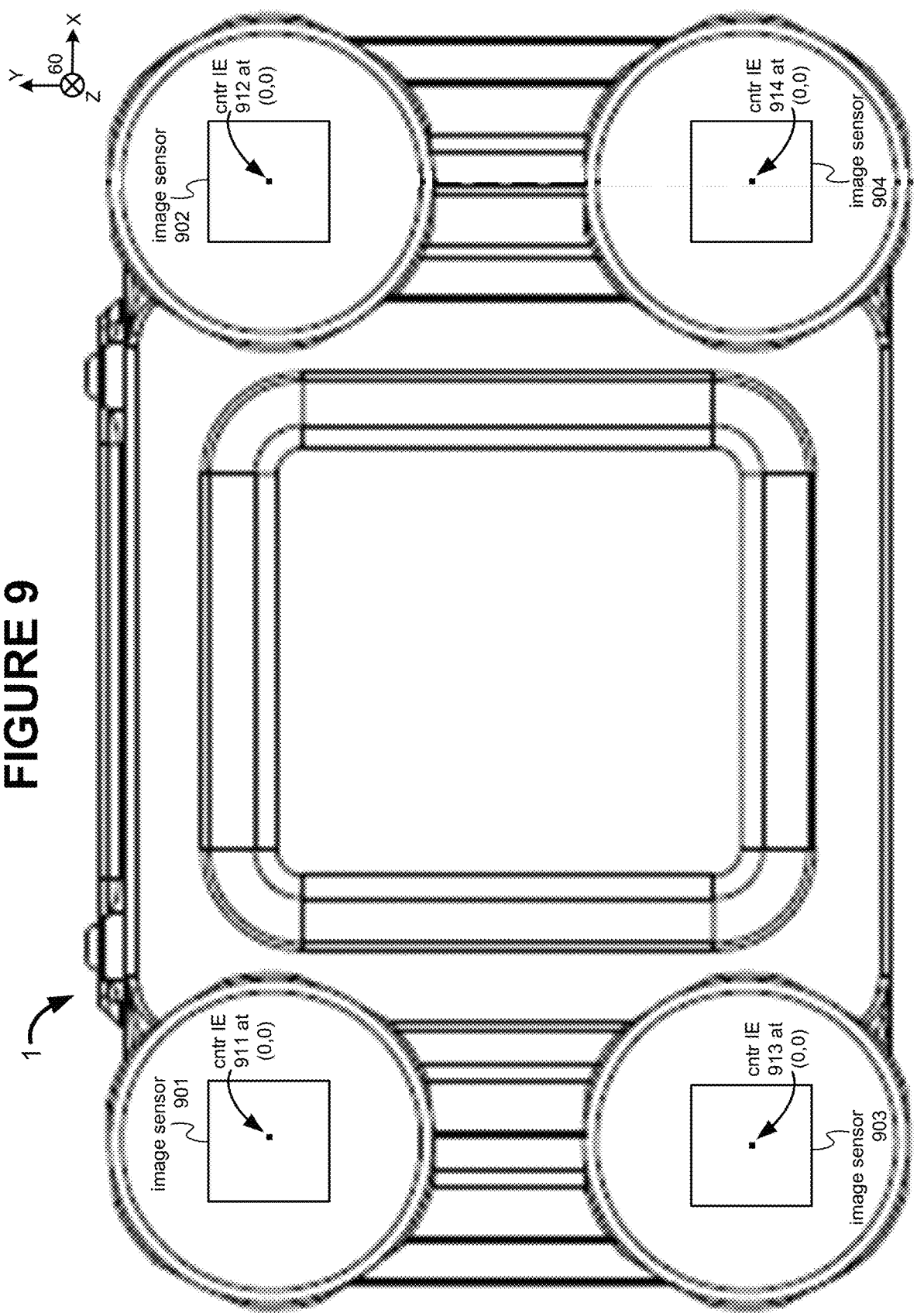
FIG. 9 is the same as FIG. 8, except, for each ICA, it's imaging chip rather than its optical path is emphasized.

FIG. 9 is the same as FIG. 8, except, for each ICA, it's imaging chip rather than its optical path is emphasized. FIG. 9 indicates an imaging chip 901-904 for each of, respectively, ICA's 101-104. Each imaging chip is assumed comprised of a matrix of IE's. As part of explaining the inventive automatic calibration procedure, it will be convenient to assign an origin coordinate (0, 0) to the IE that, with respect to just an imaging chip itself, is its center. This origin can be referred to as the "IE origin." As can be seen, for each of chips 901-904, its IE origin is labeled, respectively, 911-914.

FIG. 10A is a combination of FIGS. 8 and 9. It is intended to illustrate how, prior to calibration, the focal point of each ICA may not coincide with its imaging chip's IE origin. For example, focal point 801 of ICA 101 coincides with IE (2,1). This lack of alignment, between an ICA's focal point and its imaging chip's IE origin, can be corrected as follows.

For purposes of computer vision calculations (such as stereo depth perception), the IE of each chip, that should be treated as that ICA's origin, is likely to be different from the above-described "IE origin." To distinguish the computer vision IE, from the IE origin, we will refer to the computer vision IE as simply "the origin." For purposes of focusing on CV calculations, the mechanical housing of CV camera 1, as shown in FIG. 10A, is omitted in FIG. 10B. FIG. 10B depicts only the image sensing chips, and the focal points of the optical assemblies.

In FIG. 10B, each of image sensors 901-904 is assigned (at least initially) an origin of, respectively, 1010-1040. For example, since focal point 801 of ICA 101 is coincident with IE (2,1), when IE's are located with reference to the IE origin, this IE is where the origin of ICA 101 (origin 1010 in FIG. 10B) is initially located.

FIG. 10C is similar to 10B, except image sensors 901-904 have been enlarged, such that the set of axes for each image sensor, as a result of the origin chosen, can be illustrated.

For each ICA, an initial calibration by which its origin is located (i.e., the finding of the IE corresponding to its focal point), can be performed separately from the calibration of any other ICA. For example, each ICA can be illuminated with parallel light rays, perpendicular to the planes of an ICA's lenses. This type of calibration can be performed at a CV camera manufacturing facility. We can refer to this as an intra-ICA calibration.

Since the ICA's of CV camera 1 are arranged in a rectangular configuration, origins 1010-1040 are arranged according to the same type of rectangle (where the "type" of a rectangle is defined as the ratio between its two dimensions). In particular, for each of FIGS. 10B-10C, along the X dimension the origins are separated by an approximate distance 811, and, along the Y dimension, the origins are separated by an approximate distance 810. As discussed above, distance 811 is twice that of distance 810, and we can refer to this as a "type 2.0" rectangle.

Figure 11A:
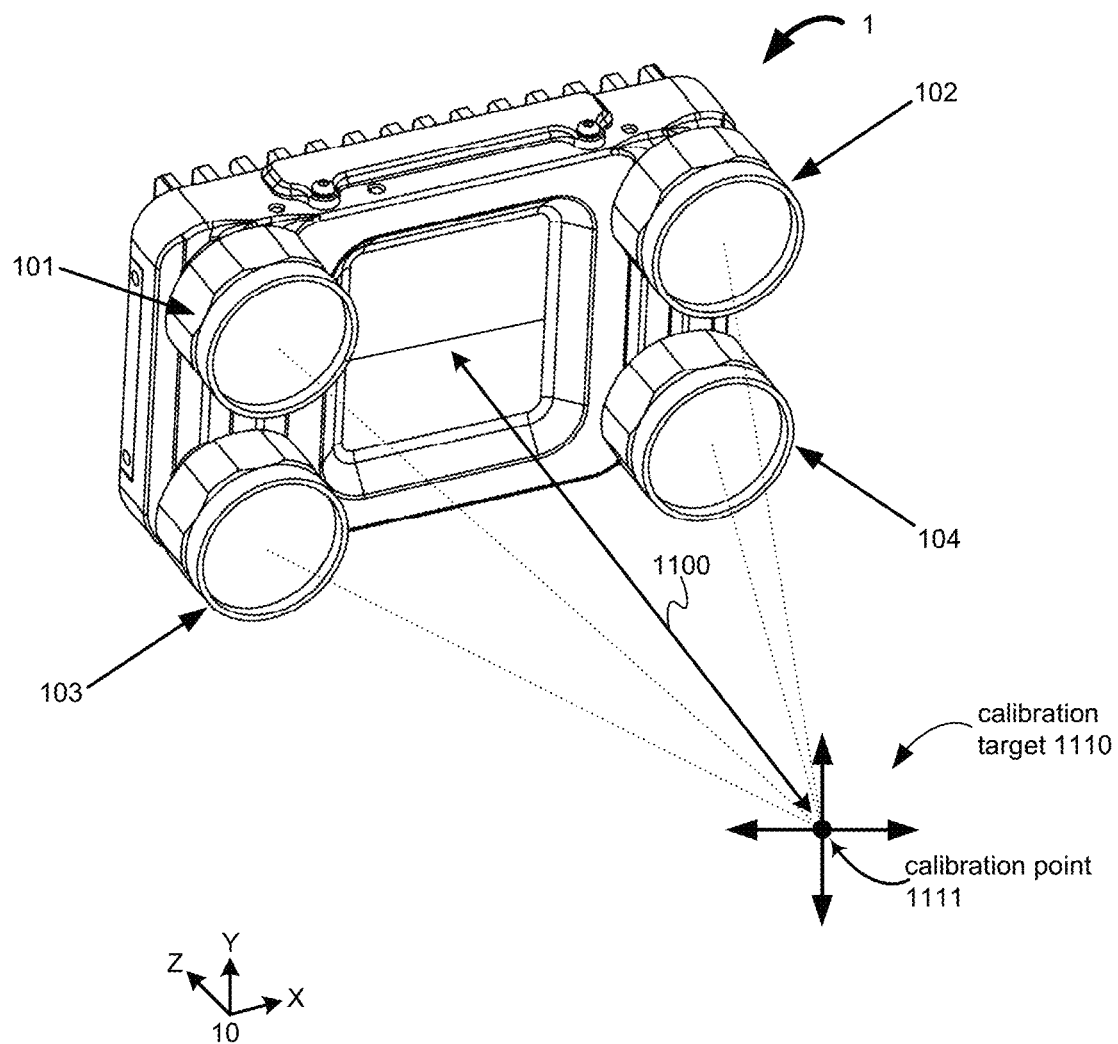
FIGS. 11A-11C depict different views of a same calibration arrangement.
Figure 11B:
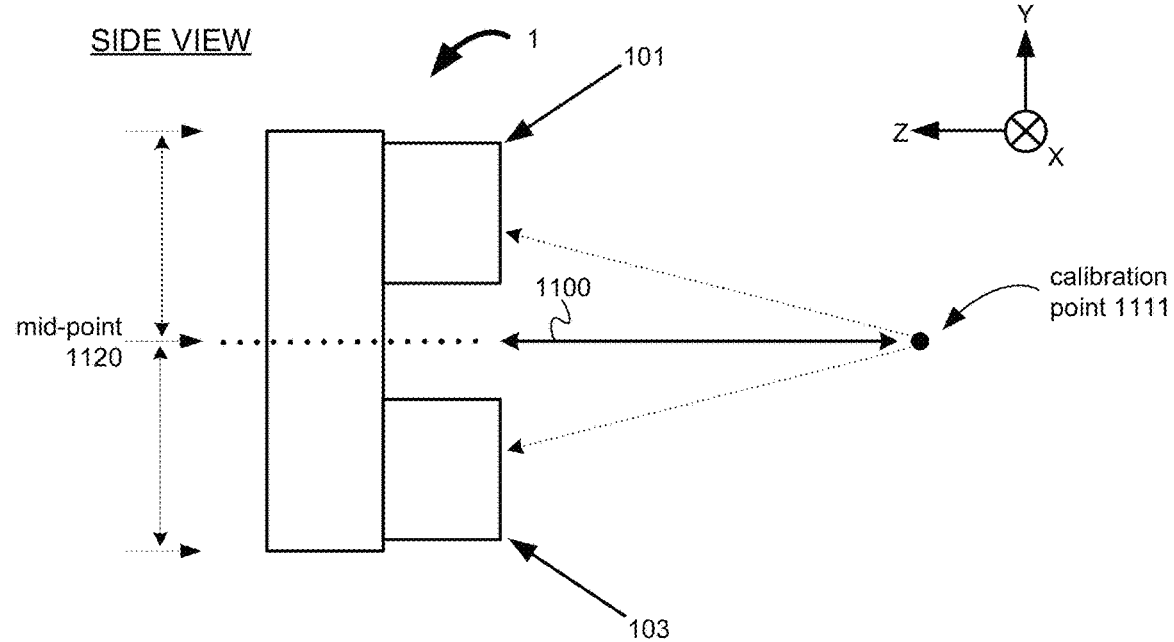
Figure 11C:
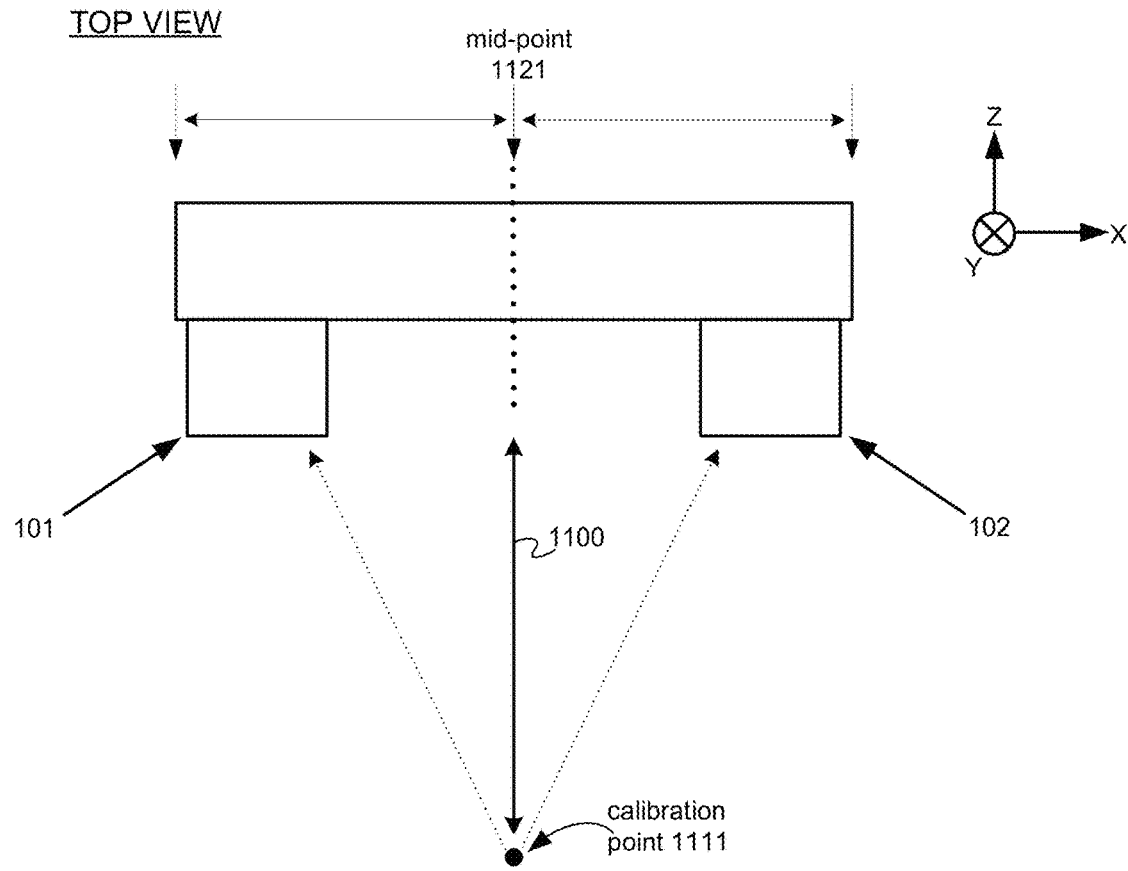

However, despite the precision and stability of the mechanical construction of CV camera 1, there can still be small differences between each ICA and the rectangle intended. Inter-ICA variation can be addressed by a calibration procedure of the type shown in FIGS. 11A-11C. Each of FIGS. 11A-11C depicts a different view of a same calibration arrangement:

FIG. 11A depicts a perspective view,
FIG. 11B a side view, and
FIG. 11C a top view.

As can be seen in FIG. 11A, inter-ICA variation can be addressed by determining how four ICA's focus on a same calibration target 1110. In particular, calibration target 1110 can provide a shared calibration point 1111. With regard to the distance along the Y axis, between ICA 101 and ICA 103 (or between ICA 102 and 104), FIG. 11B shows that calibration point 1111 is located at a mid-point 1120. Similarly, with regard to the distance along the X axis, between ICA 101 and ICA 102 (or between ICA 103 and 104), FIG. 11C shows that calibration point 1111 is located at a midpoint 1121.

Figure 12:
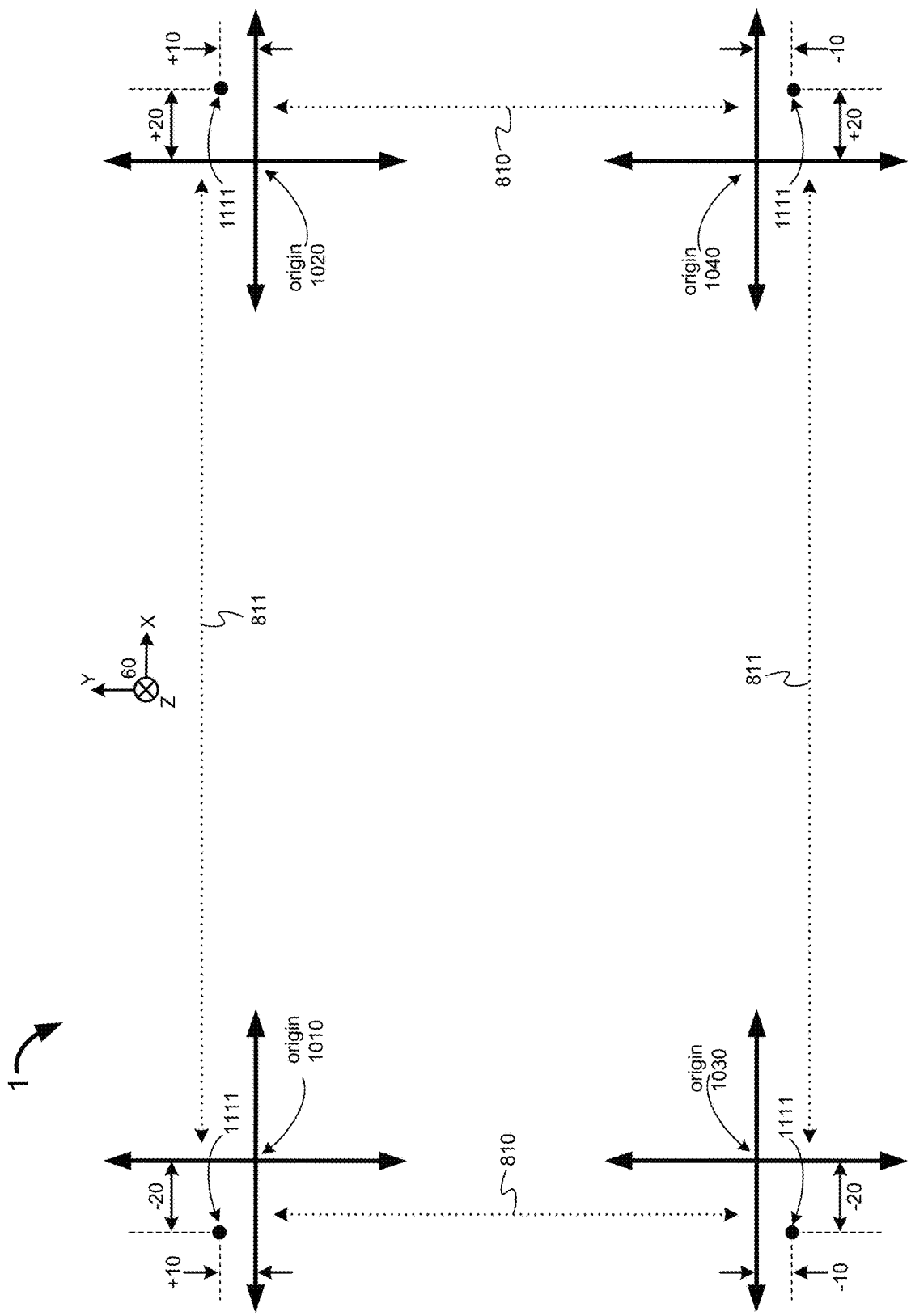
FIG. 12 shows the result of placing a calibration point at mid-points, in terms of the set of axes for each image sensor.

The result of placing calibration point 1111 at mid-points (i.e., at mid-points 1120 and 1121) is shown in FIG. 12. For each ICA, it captures its own view of calibration point 1111. For each set of axes of FIG. 12, its view of calibration point 1111 shares the following characteristic: it is located twice the (absolute) distance from the Y axis (20 units), as it is from the X axis (10 units). However, because of the central placement of calibration point 1111, with respect to the rectangular configuration formed by the focal points of the ICA's, each view is located in a different quadrant (with respect to its set of axes).

Considered together as a set, the views of calibration point 1111, as shown in FIG. 12, form a rectangle of type 2.0. As part of forming the rectangle, each view is located, exactly, at a different vertex. The set of views of FIG. 12 is only achieved if origins 1010-1040, considered together as a set, are arranged in a rectangle that:

is exactly type 2.0, and
is located in space such that calibration point 1111 is at exactly the midpoint, with respect to both dimensions.

If the exact placement (as is required for FIG. 12) is not initially achieved (regardless of whether the above-discussed intra-ICA calibration is performed), inter-ICA calibration involves adjusting one or more of the ICA's, with respect to the IE representing its origin. In other words, one or more of the assignments shown in FIG. 10C, where an IE is chosen to represent each of origins 1010-1040, may need to be adjusted. Once the desired rectangular configuration is achieved, of the views of the calibration point, the following can be determined. Since the distance between calibration point 1111 and CV camera 1 (distance 1100) is known, the disparities measured become a basis for depth perception. Specifically, for FIG. 12, a disparity of 40 along the X dimension, and a disparity of 20 along the Y dimension, are each known to correspond to distance 1100.

Figure 13A:
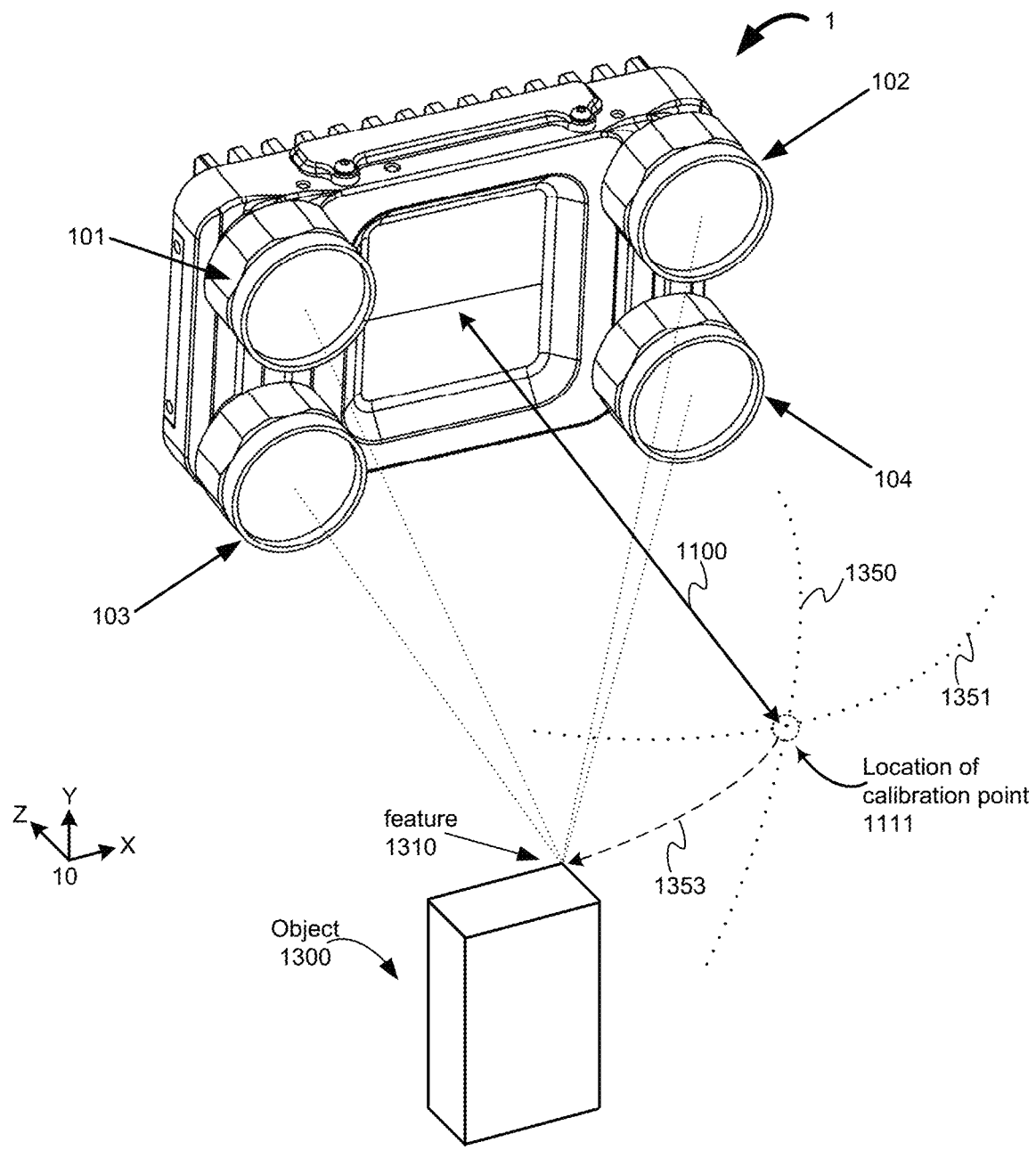
FIG. 13A shows an example where CV camera 1 is operating in something close to a real-world environment, and seeking to determine the depth of a feature 1310.

FIG. 13A shows an example where CV camera 1 is operating in something close to a real-world environment, and seeks to determine the depth of a feature 1310 on an object 1300. For simplicity of explanation, feature 1310 is assumed to be the same distance 1100, from CV camera 1, as is calibration point 1111. The prior location of calibration point 1111 is shown at the intersection of curved X axis 1351 and curved Y axis 1350. Axes 1350 and 1351 represent a constant-depth surface, where any point on the surface is at depth 1100.

With respect to calibration point 1111, feature 1310 is a traversal of distance 1353, leftward and downward, along the constant-depth surface. (More precisely, 1353 represents traversal in the negative direction, along the X and Y axes.)

Figure 13B:
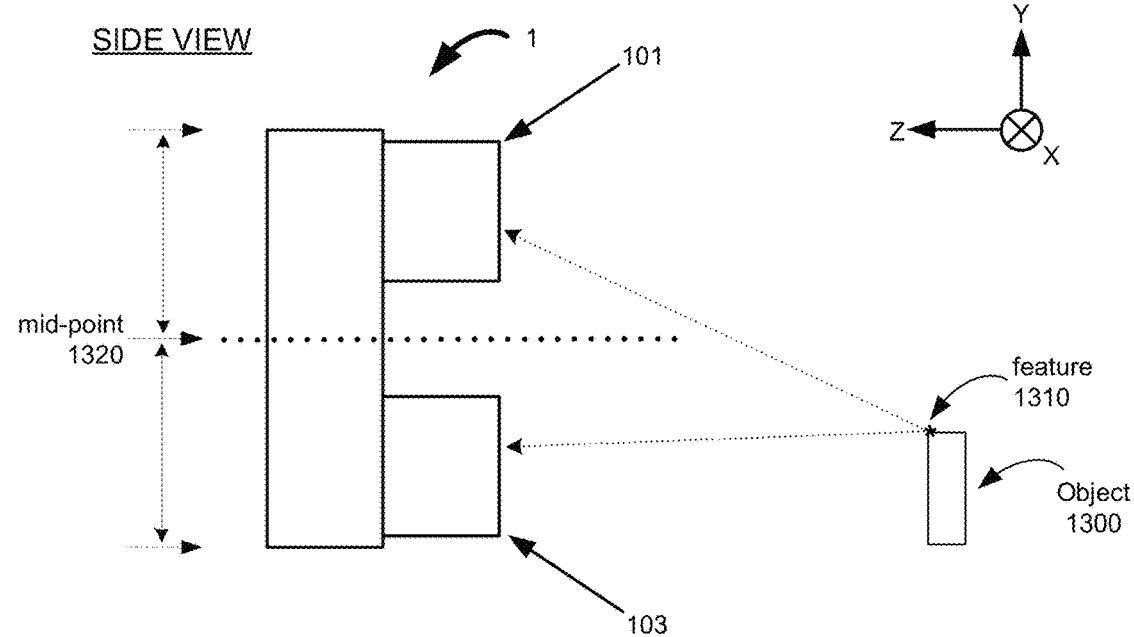
FIGS. 13B and 13C depict side and top views, of the arrangement shown in perspective form in FIG. 13A.
Figure 13C:
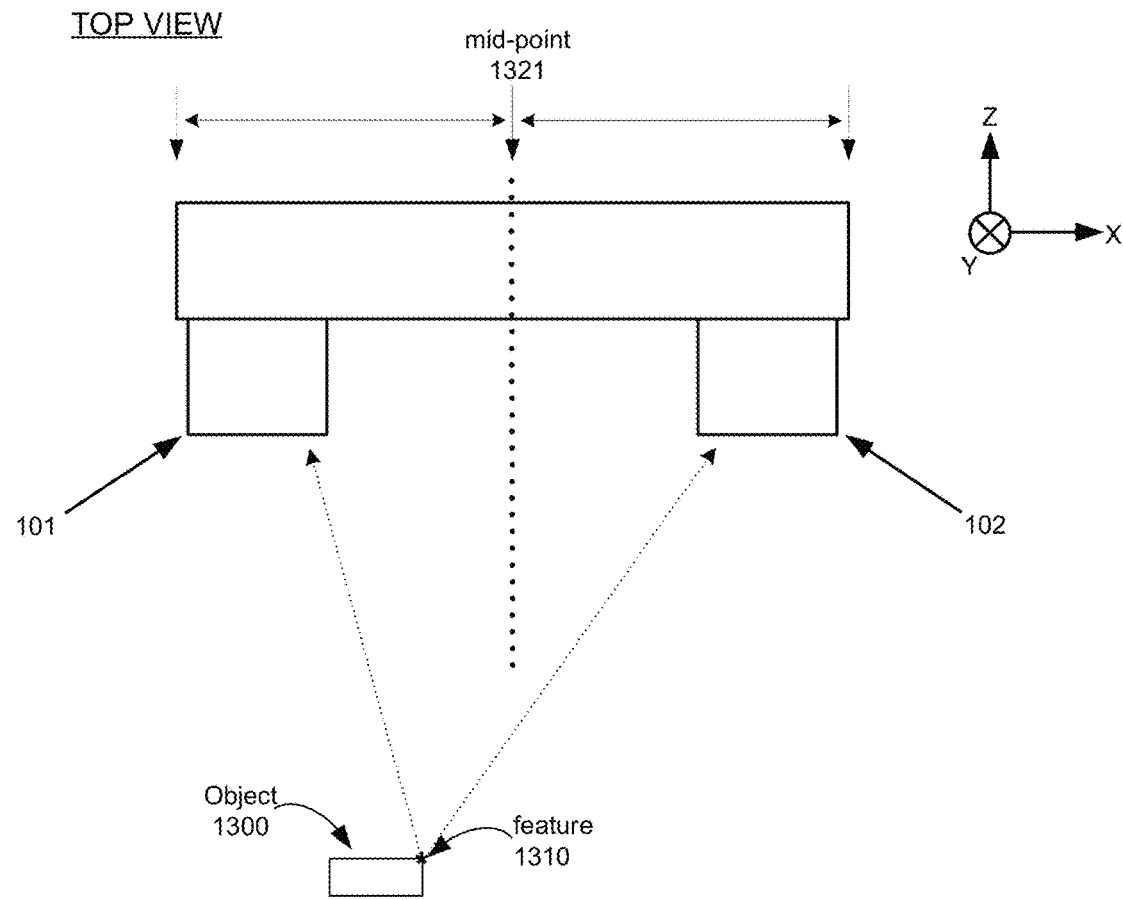

The downward and leftward location, of feature 1310 with respect to calibration point 1111, is further reflected in FIGS. 13B and 13C. (In FIG. 13B, feature 1310 is shown to be below midpoint 1320, while in FIG. 13C, feature 1310 is shown to be to the left of midpoint 1321.)

Figure 13D:
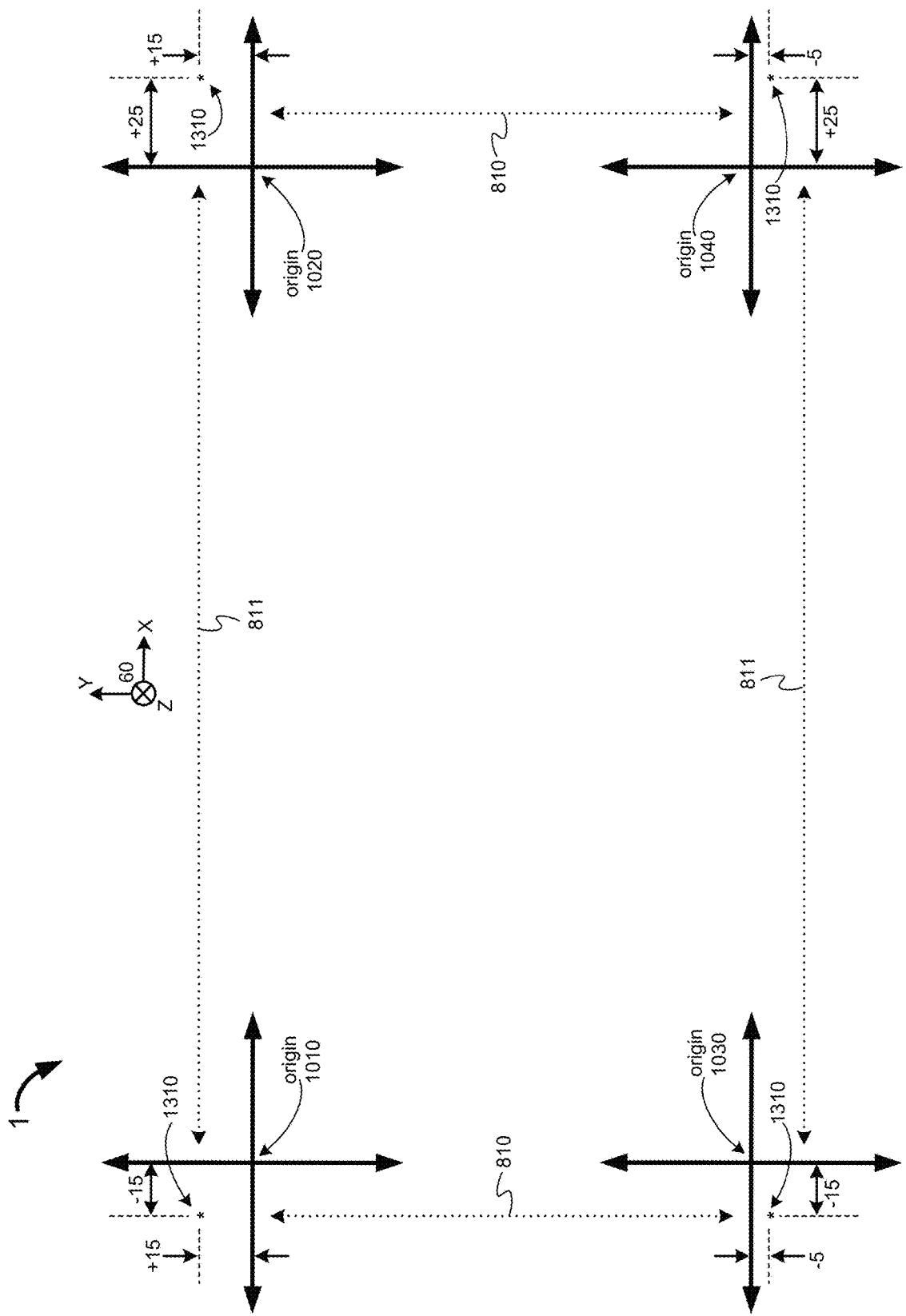
FIG. 13D depicts, with respect to axes X and Y, the same total disparities of FIG. 12, but shifted spatially, because the feature viewed is shifted relative to the calibration point.

FIG. 13D depicts, with respect to axes X and Y, the same total disparities of FIG. 12 (since the depth of feature 1310 is the same as that of calibration point 1111). However, since feature 1310 is shifted in space, its rectangle of type 2.0 is shifted rightward and upward, with respect to FIG. 12. Specifically, for purposes of example, the rectangle of FIG. 13D is shifted, with respect to FIG. 12, five units rightward and five units upward (more precisely, five units in the positive direction, along the X and Y axes).

As a further simplification, for purposes of explanation, FIG. 13E is the same as FIG. 13D, except for the following. The four pairs of axes of FIG. 13D (i.e., the pairs of axes at origins 1010-1040) are shifted, to have their origins coincident in FIG. 13E. In order to make clear which feature view corresponds to which set of axes, each view of feature 1310 is given a suffix, from 10-40:

1310.10 is relative to origin 1010,
1310.20 is relative to origin 1020,
1310.30 is relative to origin 1030, and
1310.40 is relative to origin 1040.

Referred to herein as an "integrated view," a diagram like FIG. 13E depicts a single, shared, point-feature as a rectangular configuration, reflective of the rectangular configuration of the ICA's that produced it. We shall refer to this configuration as the "reflective rectangular configuration" of point-feature 1310.

For purposes of simplicity of explanation (while not sacrificing generality), the following explanation also introduces an example simplification to the construction of a CV camera 1. In addition to considering a CV camera where the ICA's are arranged as a type 2.0 rectangle, another type of CV camera (referred to herein as a CV camera 5) is introduced, where its ICA's are organized according to a square configuration (also known as a type 1.0 rectangle). This is introduced in FIG. 14A (that corresponds to FIG. 13D), where both the X and Y dimensions are assumed to be of length 810. A square configuration has at least two advantages, relative to other rectangle types:

Analysis of its mathematical properties is particularly straightforward.
Its symmetrical shape matches well with the assumption of a symmetric error window for RRE's. Therefore, in terms of the number of potential solutions that may need to be considered, as a result of the occurrence of one or more RRE's, it tends to represent the most computationally-intensive scenario, relative to other rectangle types.

Figure 14A:
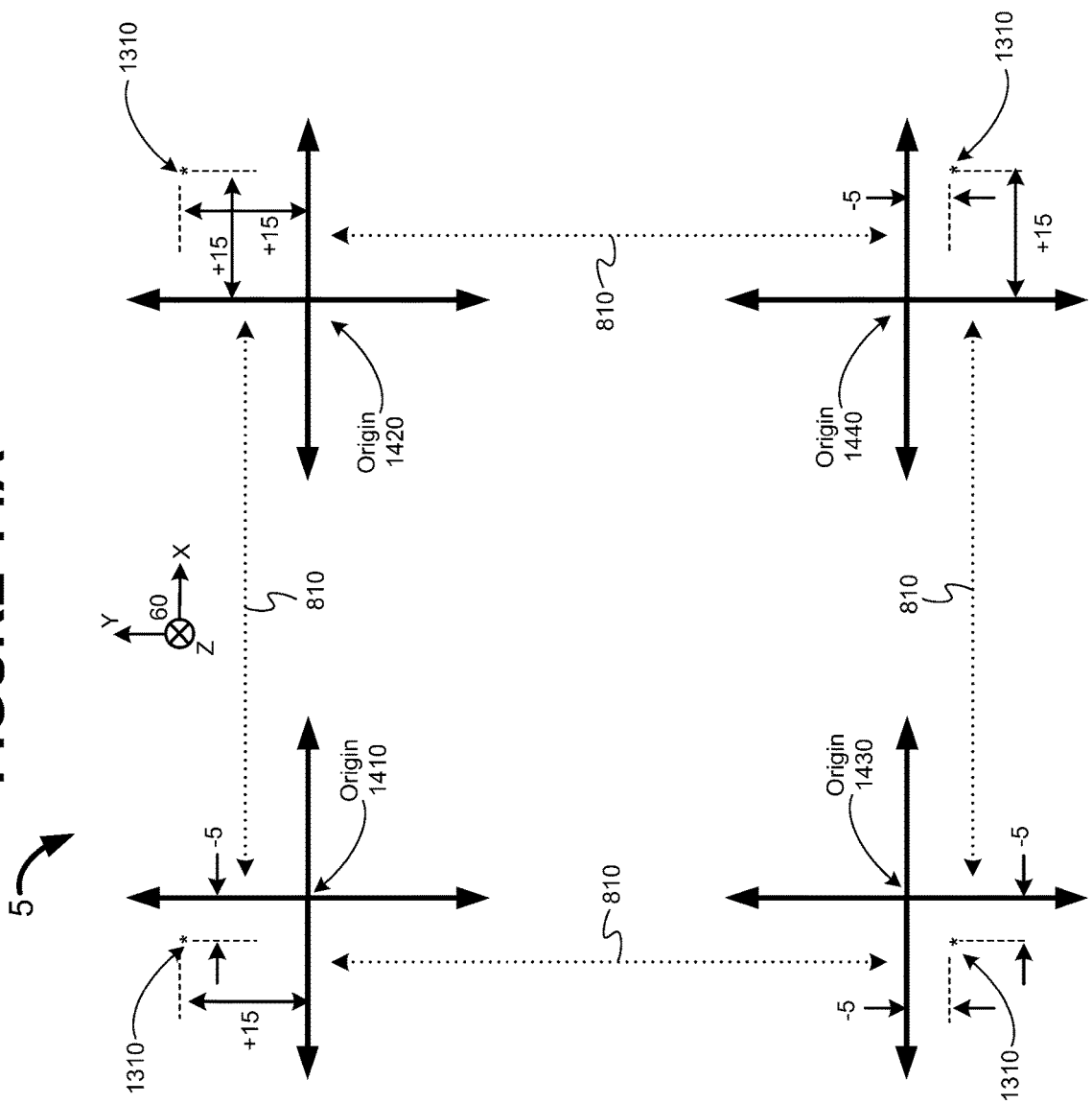
FIG. 14A corresponds to FIG. 13D, except

Along the Y axis, FIG. 14A has the same net disparity (20 units), as shown in FIGS. 12 and 13D-13E. However, for the X axis, unlike FIGS. 12 and 13D-13E, FIG. 14A has the same net disparity (20 units) as its Y axis.

Figure 14B:
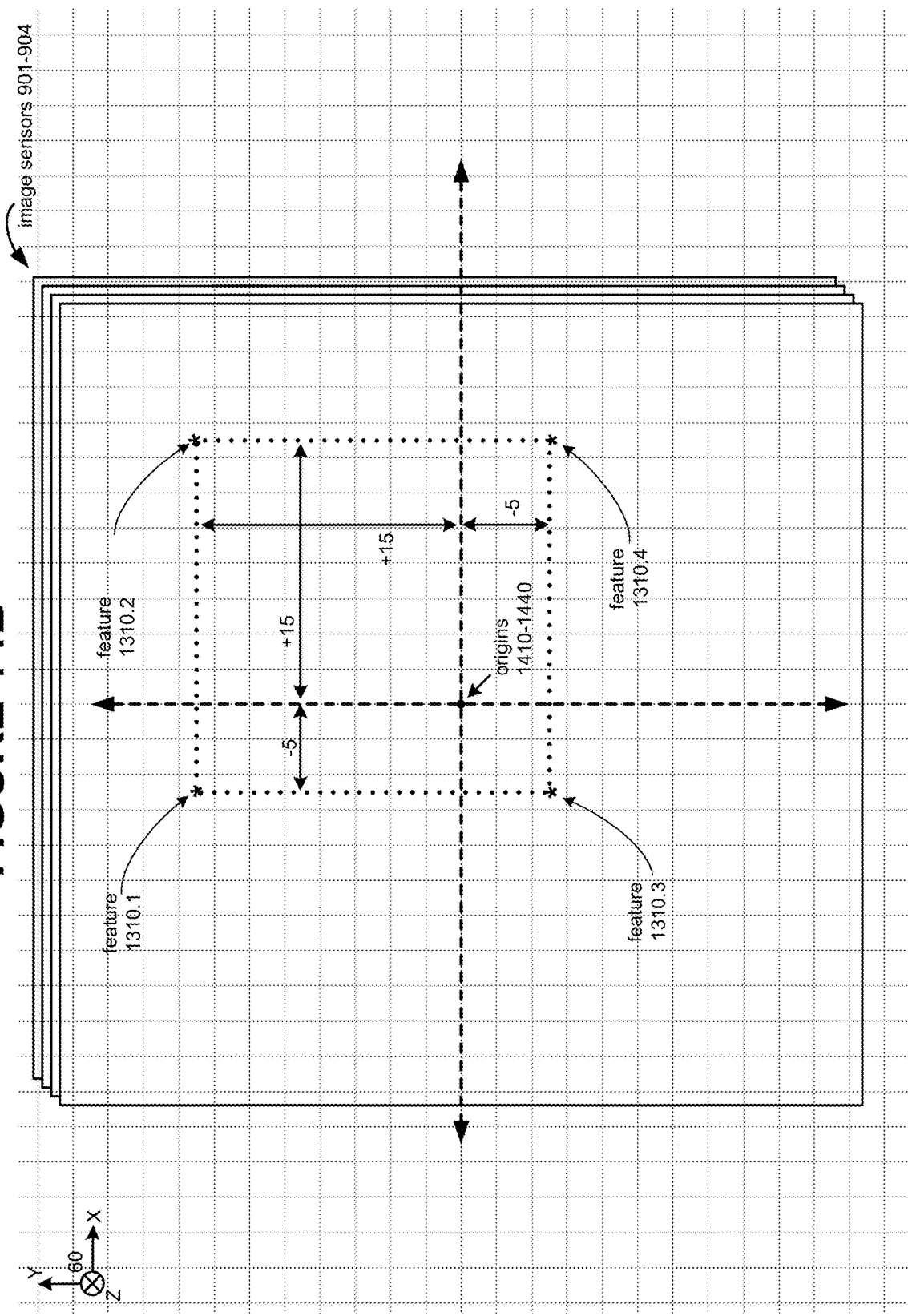
FIG. 14B is the reflective rectangular configuration version of FIG. 14A.

As a further simplification, for purposes of explanation, FIG. 14B is the reflective rectangular configuration version of FIG. 14A. In other words, the four pairs of axes of FIG. 14A (i.e., the pairs of axes at origins 1410-1440) are shifted, to have their origins coincident in FIG. 14B. In order to make clear which feature view corresponds to which set of axes, each view of feature 1310 is given a suffix, from 1-4:

1310.1 is relative to origin 1410,
1310.2 is relative to origin 1420,
1310.3 is relative to origin 1430, and
1310.4 is relative to origin 1440.

2.3 Detecting RRE's
2.3.1 Overview

Simply being able to reliably detect misalignment is an extremely important feature for most practical robotic systems. For reasons explained below, this is a characteristic not reliably achieved with current single-pair stereo CV systems.

Since the mechanical structure of CV camera 1 is assumed to be extremely stable, a main purpose of the automatic realignment procedure, of the present invention, is to detect RRE's.

In order to accomplish this detection, the realignment procedure of the present invention relies on the ability to identify a point-feature as a same point-feature ("the shared point-feature"), across all ICA's of a CV camera. The depth of the shared point-feature need not be known—just the fact that it is the same feature being simultaneously seen, across all ICA's. For the reflective rectangular configuration of a CV camera, if both of the following conditions are true, the CV camera's ICA's will be regarded as properly aligned:

Condition I. Can be described two ways:
  Each view, of the shared point-feature, coincides, exactly, with a different vertex of a rectangle.
  The four point-feature views form a four-sided polygon, and every pair of immediately-adjacent point-feature views, around the perimeter of the polygon, is aligned with either the X axis or Y axis.
Condition II. The rectangle formed, by the views of the shared point-feature, is of the same type as the rectangle formed by the focal points, of the ICA's of the CV camera.

The auto-realignment procedure is intended to be applicable to any CV camera where at least some subset of its ICA's can be utilized as a rectangular configuration.

The invention is based upon the fact that shared point-features are common occurrences, in real-world environments where a CV camera may be used. For example, many suitable points result from two lines (or edges of an object) meeting at a right angle (or at something close to a right angle). FIG. 13A shows this kind of right angle occurring at a corner 1310 of a block-type object 1300. Location 1310 could be, for example, the corner of a door (and we shall use feature 1310 as our example shared point-feature).

Figure 13F:
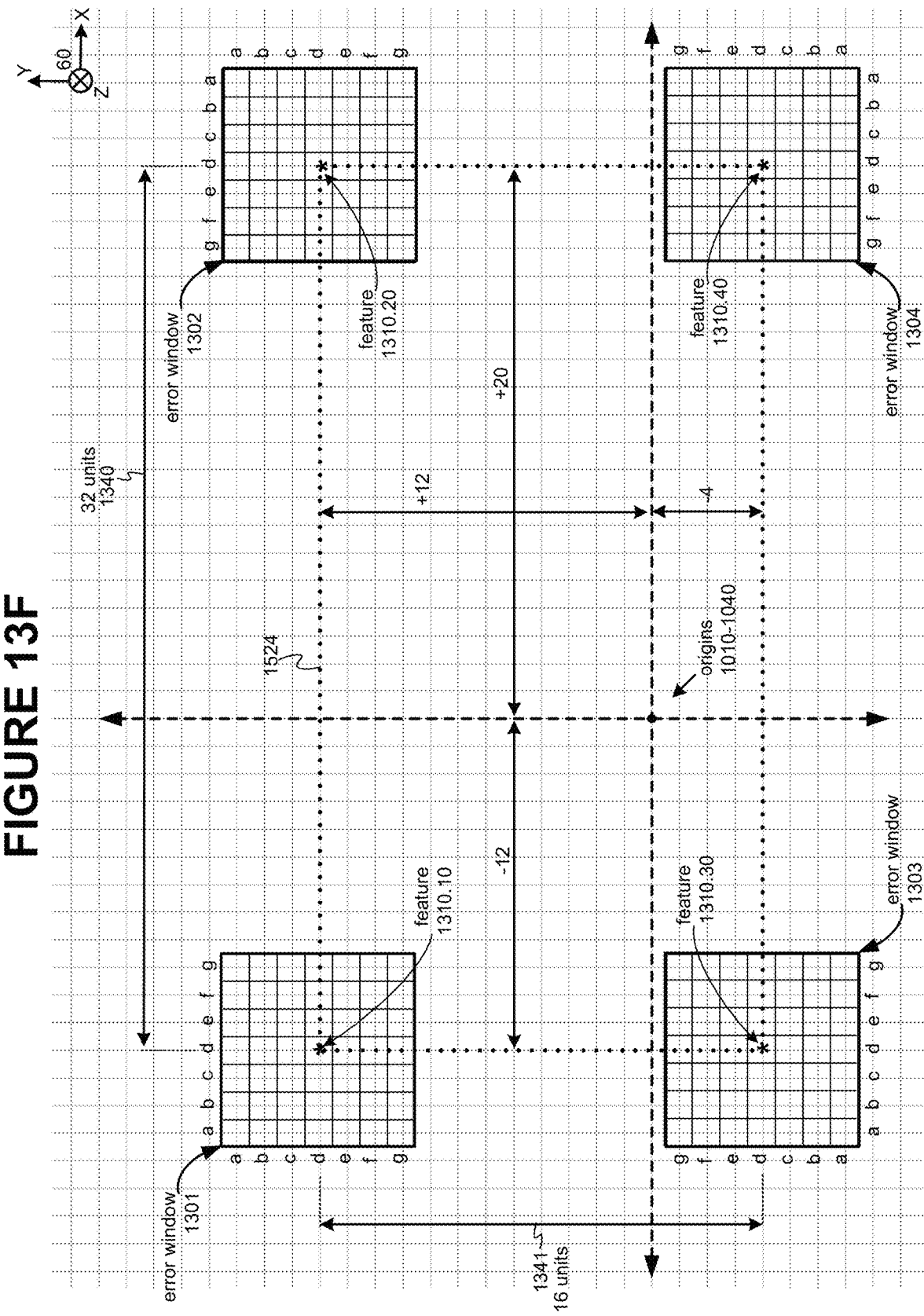
FIG. 13F is similar to FIG. 13E, except it introduces, to a reflective rectangular configuration, a framework for representing the uncertainty introduced by the possibility of RRE's.

FIG. 13F is similar to FIG. 13E, except it introduces, to a reflective rectangular configuration, a framework for representing the uncertainty introduced by the possibility of RRE's. Each detection, of a shared point-feature, is presented as the central element of an error window:

View 1310.10, of point-feature 1310, is depicted at the center IE of error window 1301.
View 1310.20, of point-feature 1310, is depicted at the center IE of error window 1302.
View 1310.30, of point-feature 1310, is depicted at the center IE of error window 1303.
View 1310.40, of point-feature 1310, is depicted at the center IE of error window 1304.

For purposes of example, the error-window size focused upon herein is a 7×7 grid of IE's. The 7×7 grid represents an error model assumption that, although an ICA has produced a view of a feature (such as feature 1310), there is an uncertainty, as to whether that view is correctly aligned, with the views of the other ICA's. Specifically, the correct location, of each view of a feature 1310, can differ by as much as approximately 3 pixels, in any direction, from the location detected by its ICA.

The augmentation with error windows, of a reflective rectangular configuration, can be referred to as an "error-window configuration."

For purposes of clarity of explanation, FIG. 13F assumes smaller net disparities than FIG. 13E. FIG. 13E is illustrated with net disparities, in the X and Y directions, respectively, of 40 IE's and 20 IE's. In contrast, FIG. 13F is illustrated with net disparities, in the X and Y directions, respectively, of 32 IE's and 16 IE's. By using an example with smaller disparities, individual IE's become more distinguishable.

The reflective rectangular configuration of FIG. 13F (labeled 1524) is assumed to represent correct alignment, because Condition I and Condition II appear to be true:

Each of its vertices is one of the four views, of feature 1310: 1310.10-1310.40.

Rectangle 1524 is of the correct type (type 2.0): the X axis distance (labeled 1340) is 32 units, while the Y axis distance (labeled 1341) is 16 units.

Nevertheless, there is still some uncertainty, regarding the actual position of each of views 1310.10-1310.40. This is represented by placing each feature at the central IE of an error window: the IE located at the coordinates, relative to each error window itself, of (d, d).

Figure 14C:
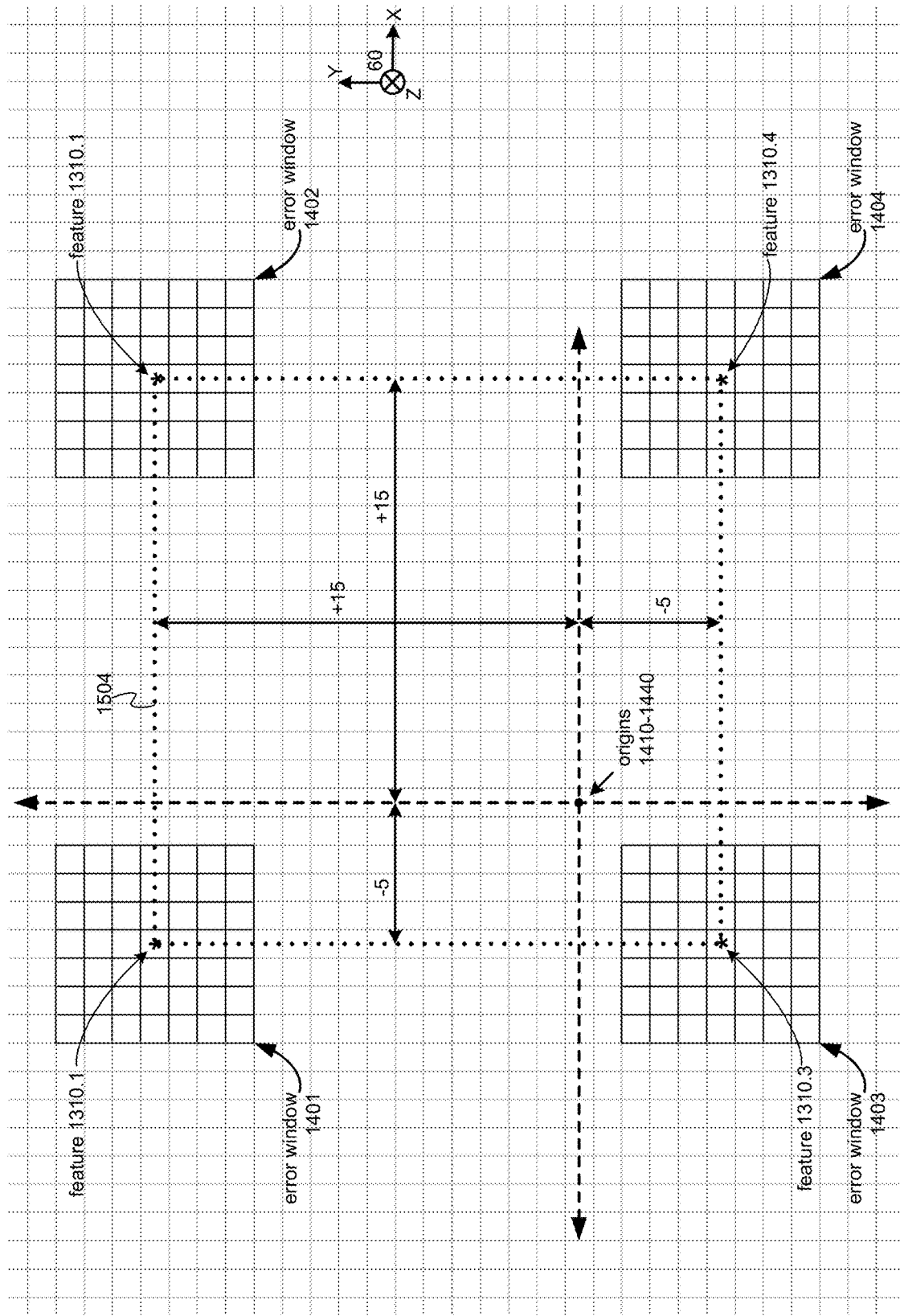
FIG. 14C provides an error-window configuration, of the reflective rectangular configuration of FIG. 14B.

The relationship between FIGS. 14C and 14B is similar to that between FIGS. 13F and 13E. FIG. 14C provides an error-window configuration, of the reflective rectangular configuration of FIG. 14B:

View 1310.1, of point-feature 1310, is depicted at the center IE of error window 1401.

View 1310.2, of point-feature 1310, is depicted at the center IE of error window 1402.

View 1310.3, of point-feature 1310, is depicted at the center IE of error window 1403.

View 1310.4, of point-feature 1310, is depicted at the center IE of error window 1404.

Like FIG. 13F, FIG. 14C also uses an error window size of 7 IE×7 IE. Unlike FIG. 13F, FIG. 14C illustrates its disparities with the same number of IE's (20 units) as shown in FIG. 14B. In FIG. 14C, the reflective rectangular configuration is labeled 1504.

If either, or both, of Condition I or Condition II are not satisfied, it is assumed that one or more of the views (of the shared point-feature) is in error. The task then becomes the performing of a regression analysis, where the goal is to find a rectangular configuration, of the correct type, that is a "best" (or at least "good") fit, according to a suitable metric. As discussed above, the rectangular configuration needs to be of a type reflective of the rectangular configuration of ICA's forming the CV camera. Whether a particular reflective rectangular configuration fits the data better than another depends upon such factors as the metric used, and the error model for alignment failures of the CV camera.

For each of FIGS. 13F and 14C, the four feature views (1310.10-1310.40 for FIG. 13F, and 1310.1-1310.4 for FIG. 14C) satisfy Conditions I and II, so no regression is necessary in those cases.

2.3.2 Detecting Misalignment

With a rectangular configuration of ICA's, in accordance with the principles of the present invention, the only undetectable combinations of RRE's are those that, while leading to an incorrect configuration, still produce a rectangular configuration of the correct type. For example, with a square configuration of ICA's, a combination of RRE's is only undetectable if it happens to result in an incorrect, but still square, configuration of point-feature locations. As another example, with a type 2.0 configuration of ICA's, a combination of RRE's is only undetectable if it produces an incorrect, but still type 2.0, configuration.

Under the assumption of a 7×7 error window, the number of rectangles, for both type 1.0 and type 2.0 ICA configurations, are determined below.

The below calculations show that, when starting with ICA's calibrated to measure a shared point-feature as an exactly rectangular configuration of a known type, it is extremely unlikely that random perturbations, applied to one or more of the ICA's, will result in an ICA configuration that is still exactly rectangular and of the correct type.

2.3.2.1 Type 1.0

Based on the assumption of 49 possible locations (i.e. 7×7) for each view by an ICA, of a shared point-feature, the total number of possible rectangular configurations that could be measured (including the correct configuration), for a set of four views, is as follows:

49×49×49×49=5,764,801

Figure 15A:
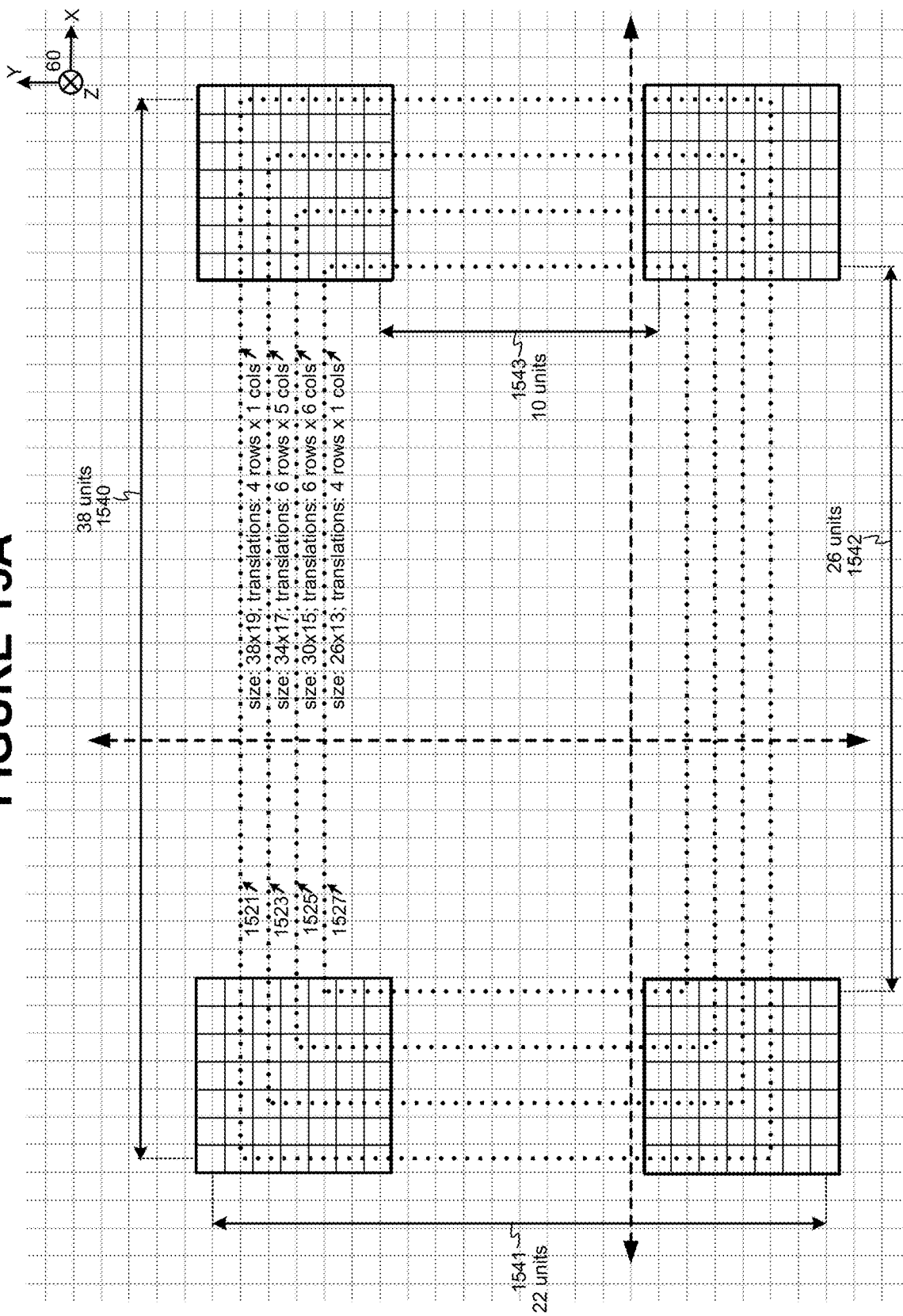
FIGS. 15A-15B depict an enumeration of the number of possible rectangles, when the error window is 7×7, and the ICA's are arranged according to a type 2.0 rectangular configuration.
Figure 15B:
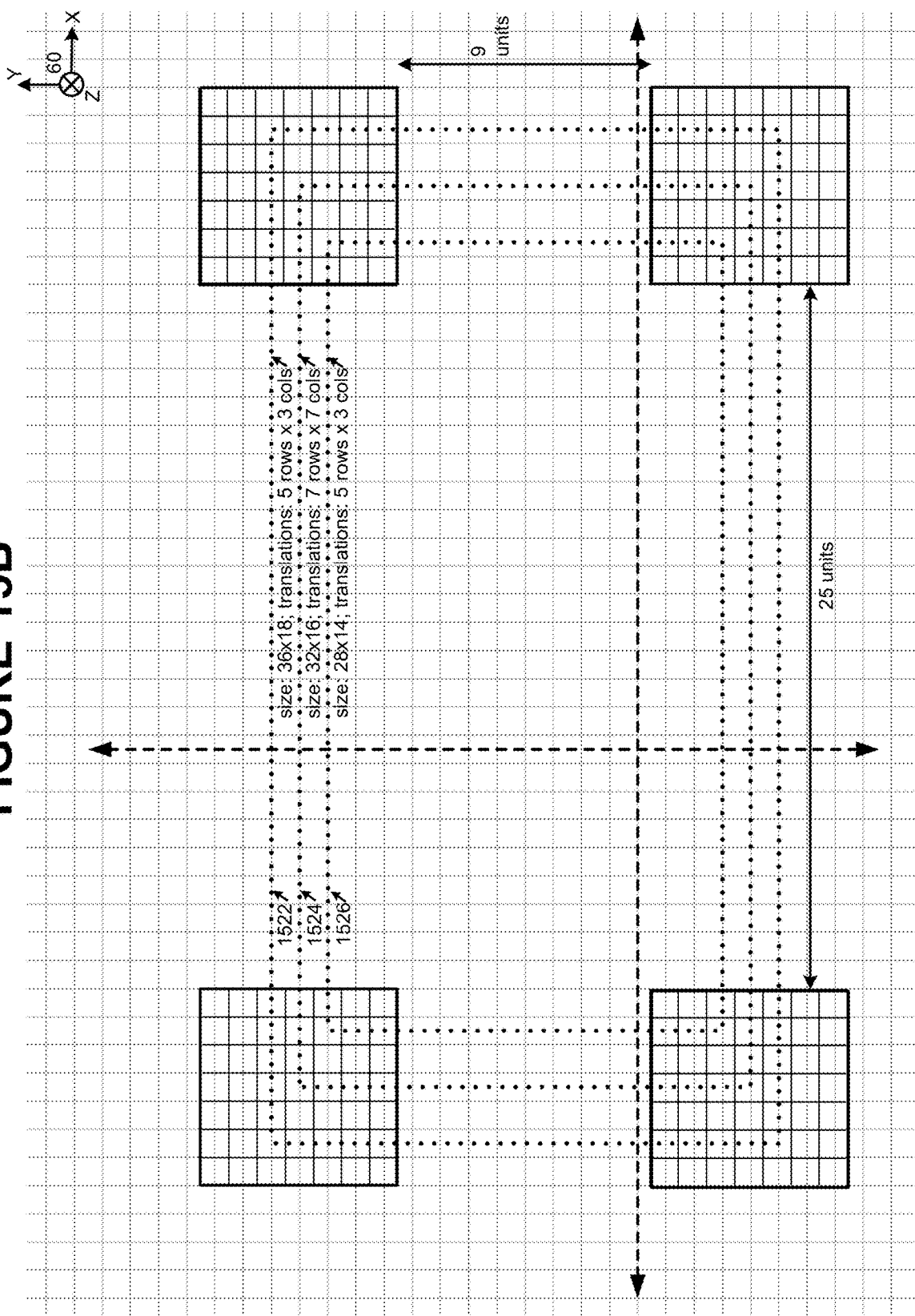
Figure 15D:
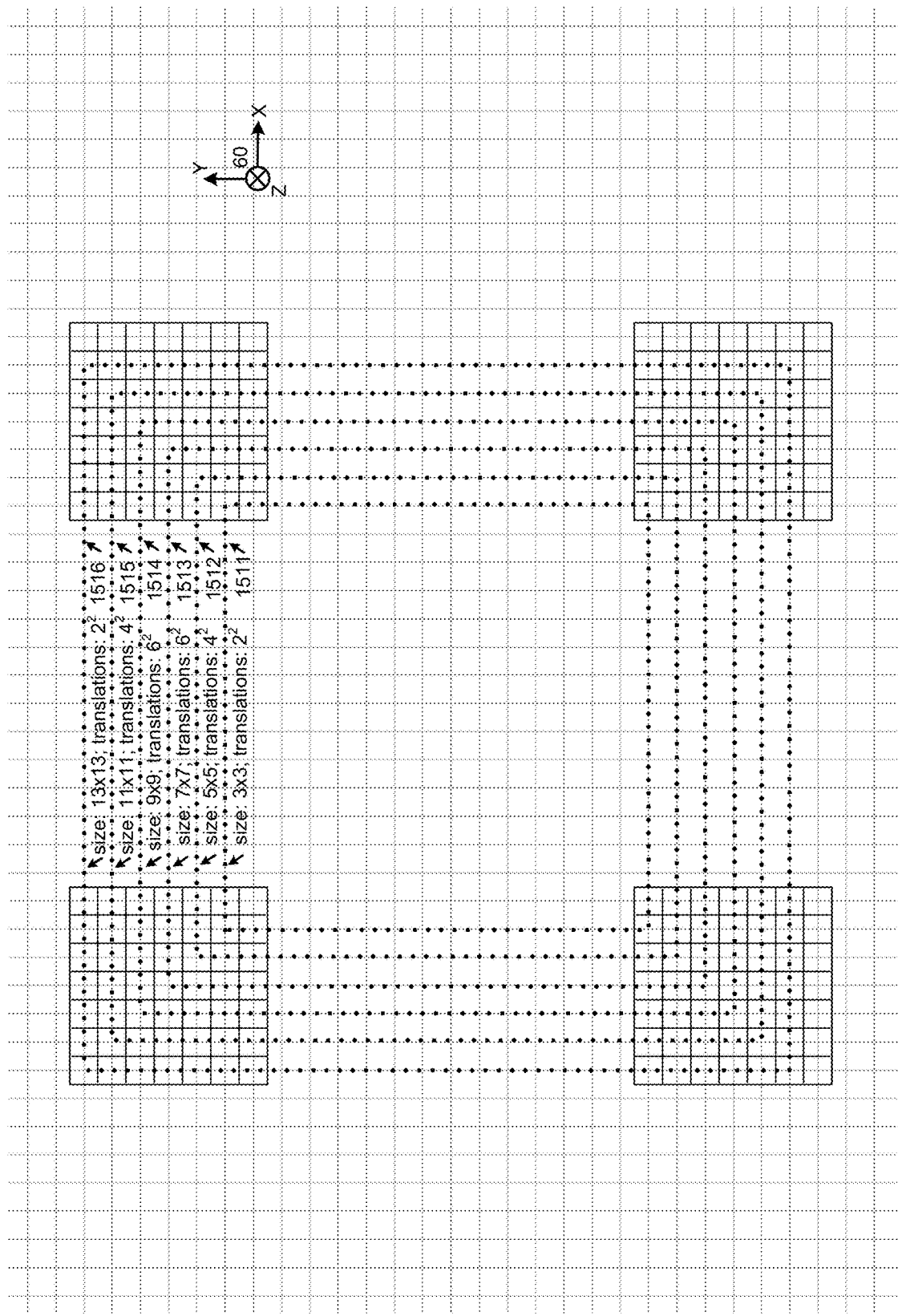

For determining the number of these 5,764,801 possibilities that are square, FIGS. 15C and 15D can be used.

FIG. 15C enumerates 7 square configurations (labeled 1501-1507), where each uses, along its X and Y dimensions, a same even number of IE's. The sizes of the even-numbered squares are:

2, 4, 6, 8, 10, 12, 14

(Note: the number of IE's between error windows are ignored, because they are the same for both dimensions.)

FIG. 15C also labels each square-size with a number of locations to which it can be translated. Each of the above-listed square-sizes can translate to, respectively, the following number of locations:

$1^2, 3^2, 5^2, 7^2, 5^2, 3^2, 1^2$

These possibilities sum, as follows:

1+9+25+49+25+9+1=119

Similarly, FIG. 15D counts the number of square configurations (labeled 1511-1516), where each uses, along the X and Y dimensions, an odd number of IE's (once again, the number of IE's between error windows are ignored). The sizes of the odd-numbered squares are:

3, 5, 7, 9, 11, 13

FIG. 15D also labels each square-size with a number of locations to which it can be translated. Each of the above-listed square-sizes can translate to, respectively, the following number of locations:

$2^2, 4^2, 6^2, 6^2, 4^2, 2^2$

These possibilities sum, as follows:

4+16+36+36+16+4=112

Summing the number of possibilities, for both even and odd sizes, yields a total of 231 square configurations. Thus, leaving out the correct configuration, there are a total of 230 square configurations that can be transitioned to, as a response to any combination of one to four RRE's.

Leaving out the correct configuration, there are a total of 5,764,800 possibilities that can be transitioned to, as a result of a combination of one to four RRE's. Of the 5,764,800 configurations, only 230 are incorrect in an undetectable way. The odds, for the occurrence of a configuration of RRE's that is undetectable and incorrect, is as follows:

230/5,764,800=0.00004=4/100,000=1/25,000

Said another way, the odds of one or more RRE's occurring, among the ICA's of a CV camera 5 (i.e., a CV camera of type 1.0), and being undetected, is about 1 in 25,000, or 0.004%. (In fact, if only one or two ICA's undergo an RRE, the likelihood of non-detection is zero. This is because a rectangle cannot be re-sized, into another rectangle of the same type, by only translating the location of one or two of its vertices.)

For the other 99.996%, of the possible measurements of a shared point-feature, they are detectable as erroneous, because they fail to satisfy Condition I or Condition II:
1. At least one pair of immediately-adjacent point-feature views, around the perimeter of the polygon formed by the four point-feature views, is out of alignment with both the X and Y axes.
2. Even if all pairs are in alignment, the measured set of point-feature locations do not form a rectangle of the correct type (for the simplified example of FIG. 14C, the set does not form a rectangle of type 1.0).

2.3.2.2 Type 2.0

For a CV camera with ICA's configured according to a rectangle-type other than 1.0 (such as type 2.0 of CV camera 1), the extremely small odds, of non-detection of a misalignment, become even smaller.

FIGS. 15A-15B depict an enumeration of the number of possible rectangles, when the error window is 7×7, and the ICA's are arranged according to a type 2.0 rectangular configuration. In general, this can be done in two main ways:
  Starting from the largest possible rectangle (given the error-window configuration under consideration), and incrementally proceeding to the smallest one.
  Starting from the smallest possible rectangle, and incrementally proceeding to the largest one.

It is worth noting that the number of rectangles, in an enumeration, depends only on the rectangle type, and the size of the error window. Therefore, while FIGS. 15A-15B use the example rectangle size introduced in FIG. 13F, the following analysis is equally applicable to other situations, where either, or both, of the following factors differ:
  distances between the focal points of the ICA's,
  the number of IE's of the imaging chips used.

Enumeration, starting from the largest possible rectangle, can be accomplished as follows.

Start by guessing whether the longest dimension of the long side, or the longest dimension of the short side, is the limiting dimension for a largest possible rectangle. For FIG. 15A, the longest dimension of the long side is distance 1540, or 38 units, while the longest dimension of the short side is distance 1541, or 22 units.

Then determine if the other dimension of the error-window configuration (i.e., the dimension not chosen by the guess), can actually accommodate the guess.

For example, if the longest dimension of the long side is guessed to be the limiting dimension, check whether half that dimension can be accommodated by the longest dimension for the short side. In the case of FIG. 15A, this means guessing distance 1540 (of 38 units) is the limiting dimension, and then checking whether half that distance (or 19 units) can be accommodated by distance 1541. In this case, 19 units can be accommodated by the short side. This means we have guessed correctly. The largest rectangle possible (as a candidate for the correct reflective rectangular configuration) is 1521 of FIG. 15A, with dimensions 38×19.

On the other hand, if the other dimension, of the error-window configuration, cannot accommodate the guess, then we know the guess was incorrect. In that case, the algorithm chooses the longest distance of the other dimension, as the limiting distance for a largest rectangle.

For example, if the longest dimension of the short side is guessed to be the limiting dimension, then check whether twice that dimension can be accommodated by the longest dimension of the long side. In the case of FIG. 15A, this means guessing distance 1541 (or 22 units) as the limiting dimension, and then checking whether twice that distance (or 44 units) can be accommodated by distance 1540. In this case, since 44 units cannot be accommodated by the long side, we know that we have guessed incorrectly. Therefore (as was already determined above), it is known that the largest rectangle possible (within the error-window configuration of FIG. 15A) has a long-side dimension of 38 units.

Once a largest rectangle (e.g., 1521) has been produced, successively smaller type 2.0 rectangles can be produced, by decreasing the X dimension of rectangle 1521 in decrements of 2 units, while decreasing the Y dimension in corresponding decrements of one-unit.

The next smaller type 2.0 is 36 units in the X dimension and 18 units in the Y dimension. To depict this next smaller size in a graphically clean way, that does not overlap rectangle 1521, it is depicted in FIG. 15B as rectangle 1522.

After rectangle 1522, the next smaller type 2.0 is 34 units along the X dimension and 17 units along the Y dimension. To prevent this next smaller size from graphically overlapping rectangle 1522, it is depicted as rectangle 1523 in FIG. 15A.

The production of successively smaller rectangles continues until a rectangle is sought to be created where at least one dimension cannot be accommodated. This happens when a next-smaller rectangle, than rectangle 1527 of FIG. 15A, is sought to be created. Specifically, the X dimension of 26 units cannot be further reduced.

(Enumeration, starting from the smallest possible rectangle, can be accomplished in a similar way to that discussed above, except:
  The start is to guess whether the shortest dimension of the long side, or the shortest dimension of the short side, is the limiting dimension for a smallest possible rectangle.
  Successively larger type 2.0 rectangles are produced, by increasing the X dimension of rectangle 1527 in increments of 2 units, while increasing the Y dimension in corresponding increments of one-unit.)

As can be seen, between FIGS. 15A and 15B, a total of seven rectangles, enumerated 1521-1527, are identified. For each of them, in addition to showing its X and Y dimensions, FIG. 15A also shows the number of translations that can be performed.

For example, with rectangle 1521, it is labeled as having 4 possible row translations, and 1 possible column position. This means each vertex of rectangle 1521 can occupy 4 different rows, of its error-window configuration, and, within each row, the vertex can also occupy only one column. Thus, the total number of possible translations for rectangle 1521 (as a whole) is 4.

Rectangle 1522, of FIG. 15B, is labeled as having 5×3 possible translations. This means each vertex can occupy 5 different rows, of the error-window configuration, and, within each row, the vertex can also occupy 3 possible columns. Thus, the total number of possible translations, for rectangle 1522 (as a whole), is 15.

Proceeding in the same way with the 5 remaining rectangles, the total number of type 2.0 rectangles, depicted by FIGS. 15A and 15B, can be calculated as follows:
  =4+15+30+49+36+15+4
  =153

Clearly, the 153 type 2.0 rectangles possible (with an error window of 7×7) is significantly smaller than the total of 231 possible type 1.0 rectangles, calculated with FIGS. 15C-15D.

The odds, for the occurrence of a configuration of RRE's that is undetectable and incorrect, is as follows:
  $153/5{,}764{,}800 \approx 0.003\%$

2.4 Correcting for RRE's
2.4.1 Overview

For either of the error types discussed above (i.e., a failure to satisfy Condition I or Condition II), the response is the same: use the four views (of a shared point-feature) as data, to which is applied an appropriate two-dimensional regression procedure. The goal of the regression is to find, among all possible rectangles of the correct type, the one that is a best fit (or at least a good fit) to the data.

Towards this end, known optimization techniques, developed in other areas of applied science, can often be utilized. Typically, such techniques can be described as statistical, heuristic, stochastic, or any combination of these approaches. The likelihood of finding an optimal (or close to optimal) fit can be increased with better models of the failure modes most likely to occur, given the CV camera's construction, and usage environment.

Two main considerations, for a suitable approach to optimization, include at least the following:
- The metric for evaluating candidate configurations: Estimates whether the correct fit to the data has been chosen (i.e., the realignment chosen is the same as that which would occur with a standard calibration procedure). Since each RRE is assumed to be random, with respect to both its magnitude and direction, it cannot be known with absolute certainty whether a particular estimate is correct.
- Generating candidate configurations for consideration: Sometimes this can be done by a simple exhaustive-possibility generator. In other cases, there may be too many potential configurations to search exhaustively. Considered more generally, the problem of traversal of large search spaces, for an optimal or close to optimal solution, occurs in many areas of applied science.

Depending upon the particular optimization technique used, these two main considerations may be largely separated, leading to a two-phase generate/evaluate cycle, or they may be intermixed.

An example regression metric, that has been shown to produce good results, is known in mathematics as "Least Absolute Distance" (or LAD). When translated to the present invention, LAD becomes the search for a candidate reflective rectangular configuration, such that the sum of the absolute distances (between each vertex of the configuration and its corresponding view of the shared point-feature) is minimized. LAD is often valued for its ability to avoid values that are "outliers" (i.e., values that are far outside the preponderance of variation occurring in the data). This characteristic can be important when, for example, only one ICA has undergone an RRE at the time the auto-alignment procedure is applied. In fact, when using lens assemblies that can undergo small, but chaotic, shifts, this appears to be the most common mode of failure.

Another example regression metric is "Minimize Maximum Absolute Distance" (or MMAD). This involves the search for a candidate reflective rectangular configuration such that the greatest absolute distance, between any vertex of the configuration and its corresponding view of the shared point-feature, is minimized.

Both LAD and MMAD will be illustrated in the following subsection, on exhaustive optimization.

2.4.2 Exhaustive Optimization

Just as having a small number of potentially correct rectangles (e.g., 231 for a square, and 153 for type 2.0 rectangles) is helpful for purposes of detecting whether a misalignment has occurred, it also makes it easier to find the rectangle with the best fit to the data. An exhaustive consideration of 231 rectangles is possible.

This section presents, through two examples, a two-phase generate/evaluate approach to determining a reflective rectangular configuration that is at least a good fit, when a configuration is measured that does not satisfy Conditions I or II. The procedure relies upon an ability to impose an error window, that limits the number of possibilities for consideration, while still keeping an exhaustive approach to candidate generation.

During evaluate, either of the above-described LAD or MMAD metrics is applied.

It should be noted, however, that even where exhaustive techniques are possible, finding the correct or most optimal solution cannot be guaranteed. This is because the autoalignment procedure is seeking to compensate for essentially random sources of potential error. The best solution can be found to the extent the metric, used to evaluate candidates, is accurate. Better metrics tend to be based upon more accurate knowledge, of the failure modes of the CV camera to which they are applied.

2.4.2.1 Four RRE Example

Figure 17A:
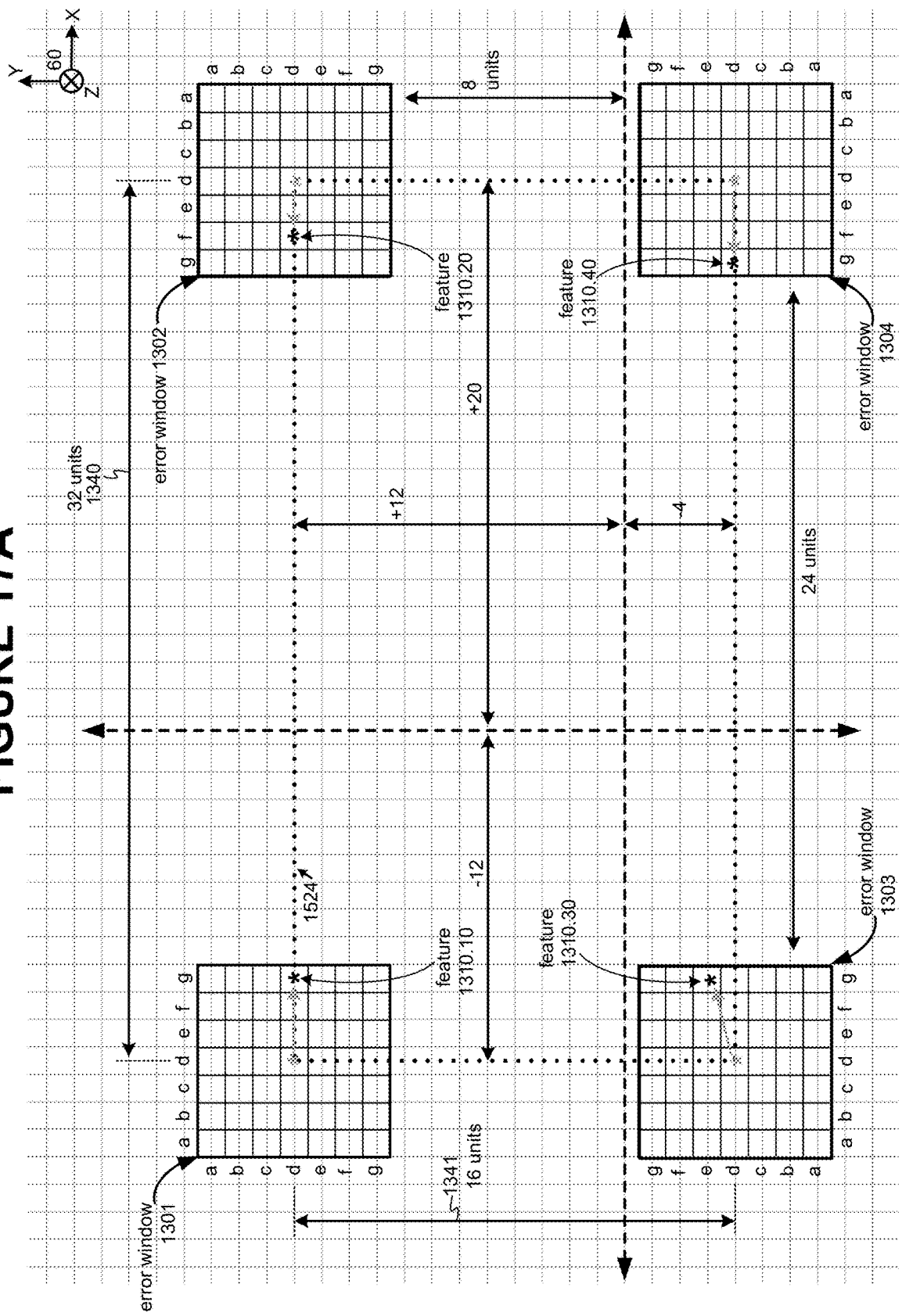
FIG. 17A illustrates what can happen if, at some point in time, CV camera 1 undergoes 4 RRE's.

In the following example, FIG. 13F is assumed to illustrate the views a CV camera 1 can be expected to see, of a shared point-feature 1310, assuming its ICA's are properly aligned. FIG. 17A illustrates what can happen if, at some point in time, CV camera 1 undergoes 4 RRE's. For each feature view of FIG. 13F, it's position has changed, as follows, in FIG. 17A:
- Feature view 1310.10: moved, with respect to its error window 1301, from (d, d) to (d, g). This can also be referred to as moving in the positive direction, along the X axis, by 3 units.
- Feature 1310.20: moved, with respect to its error window 1302, from (d, d) to (d, f). This can also be referred to as moving in the negative direction, along the X axis, by 2 units.
- Feature 1310.30: moved, with respect to its error window 1303, from (d, d) to (e, g). This can also be referred to as follows: moving in the positive direction, along the X axis, by 3 units, and moving in the positive direction, along the Y axis, by 1 unit.
- Feature 1310.40: moved, with respect to its error window 1304, from (d, d) to (d, g). This can also be referred to as moving in the negative direction, along the X axis, by 3 units.

CV camera unit 1, however, does not know that 4 RRE's have occurred, since the last time it applied the auto-alignment procedure. It just knows that, between two pairs of feature-views, around the perimeter of what should be a type 2.0 rectangle, alignment has been lost:
- 1310.20 is not aligned with 1310.40
- 1310.30 is not aligned with 1310.40

Figure 17B:
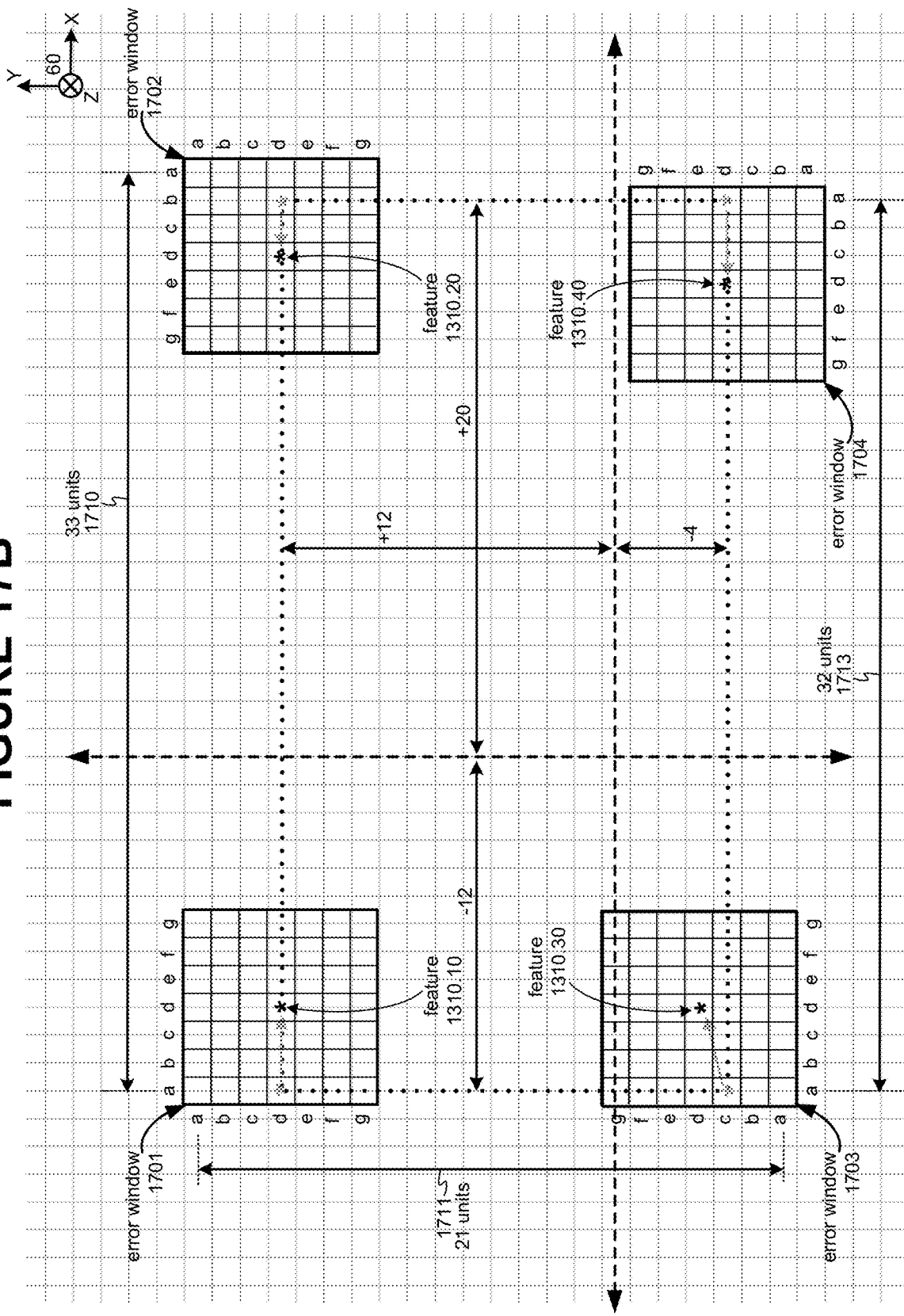
FIG. 17B depicts each feature-view, of FIG. 17A, as being at the center of a new 7×7 error window.

To reflect the initial lack of knowledge, regarding which feature-views may have moved, FIG. 17B depicts each feature-view as being at the center of a new 7×7 error window:
- Feature-view 1310.10 within error window 1701
- Feature-view 1310.20 within error window 1702
- Feature-view 1310.30 within error window 1703
- Feature-view 1310.40 within error window 1704

Figure 17C:
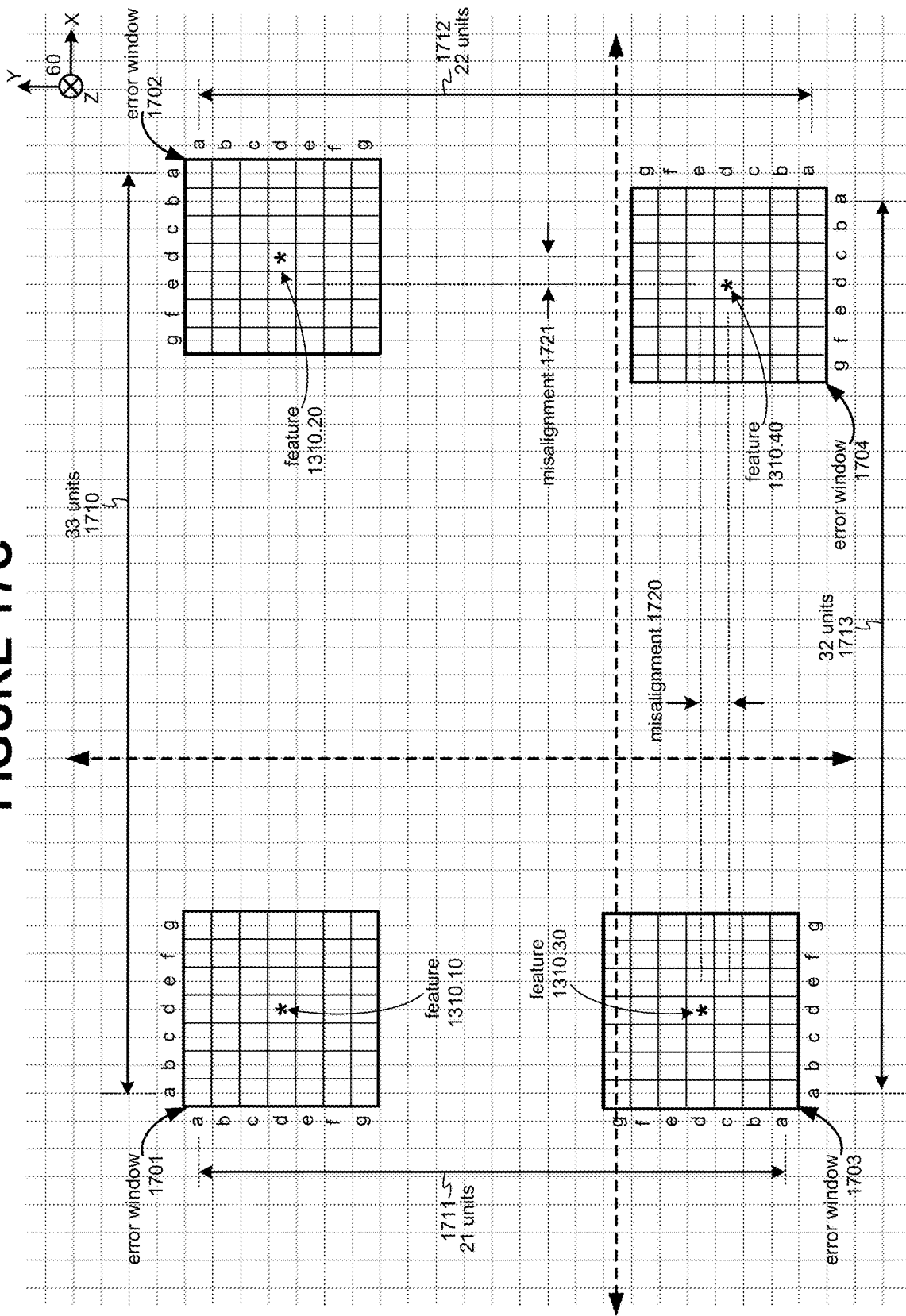
FIGS. 17C and 17D depict how relative mis-alignment of feature-views, along with a limitation of each error window to a certain size, can be used to further limit error windows.
Figure 17D:
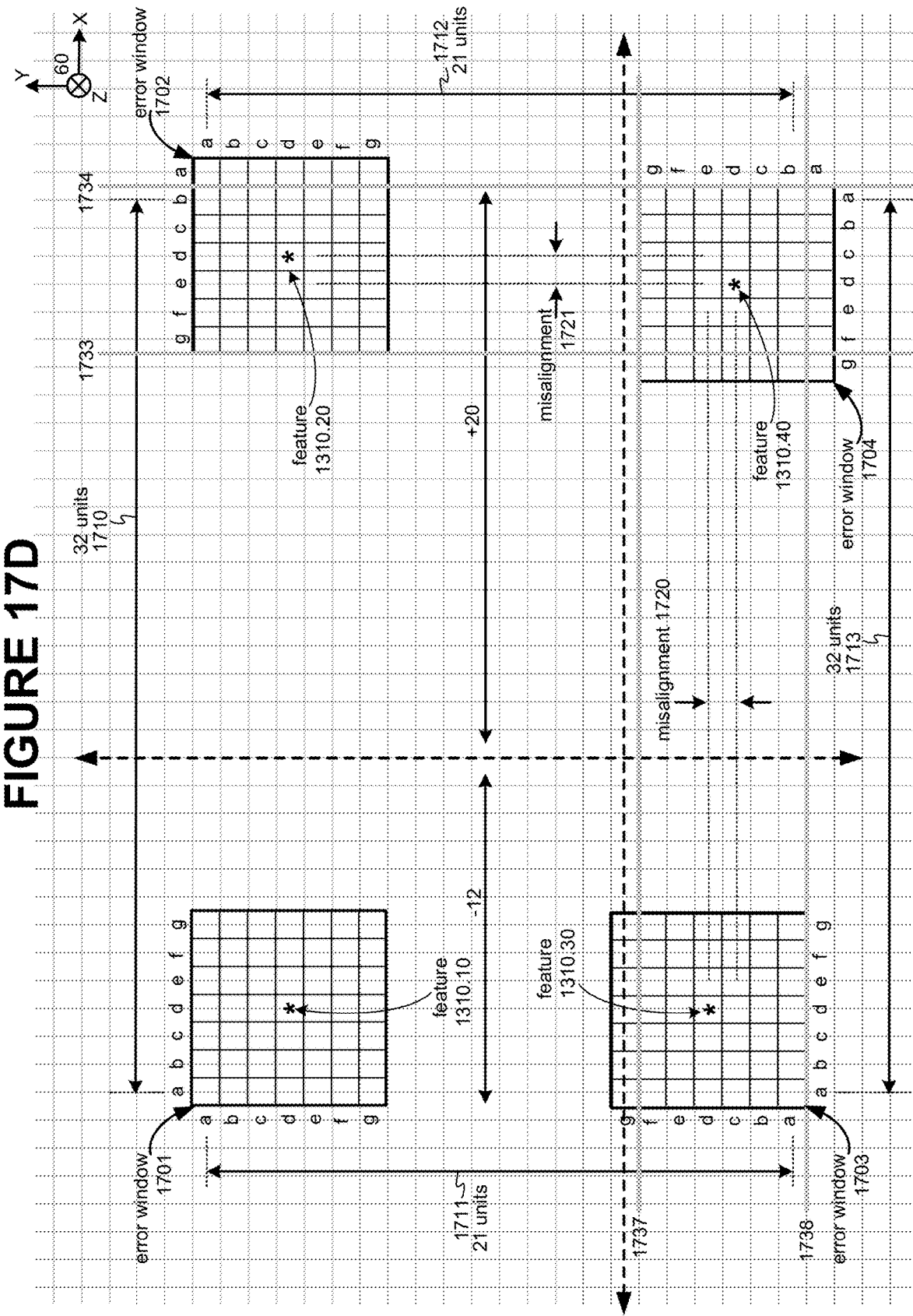

FIGS. 17C and 17D depict how the relative mis-alignment of feature-views, along with a limitation of each error window to a certain size (e.g., the 7×7 grid), can be used to further limit some of the error windows.

In particular, FIG. 17C depicts the two mis-alignments: 1720 (between feature-views 1310.30 and 1310.40), and 1721 (between feature-views 1310.20 and 1310.40).

FIG. 17D shows how mis-alignments 1720 and 1721 can be used to reduce the size of error windows 1702, 1703, and 1704.

For mis-alignment 1721, feature view 1310.20 of error window 1702, and feature view 1310.40 of error window 1704 are known to share the following:
- 1310.20 and 1310.40 must actually lie on some same line x=c (where c is some constant);
- maximum distance, between current location of 1310.20 and x=c is (w−1)/2
- maximum distance, between current location of 1310.40 and x=c is (w−1)/2
- let m=(w−1)/2=(7−1)/2=3
- minimum value for c
  - must be ≥both ($x_{1310.20}$−m) and ($x_{1310.40}$−m)
  - since $x_{1310.20}$>$x_{1310.40}$ then ($x_{1310.20}$−m)>($x_{1310.40}$−m)
  - therefore, the lower bound for c is ($x_{1310.20}$−m), or line 1733
- maximum value for c
  - must be ≤both ($x_{1310.20}$+m) and ($x_{1310.40}$+m)
  - since $x_{1310.20}$>$x_{1310.40}$ then ($x_{1310.20}$+m)>($x_{1310.40}$+m)
  - therefore, upper bound for c is ($x_{1310.40}$+m), or line 1734

In general, when two feature-views 1 and 2 must be on a same line parallel to the X axis, $x_1$>$x_2$, window width is w, and m=(w−1)/2:
- minimum value for c=$x_1$−m
- maximum value for c=$x_2$+m (The same calculation applies, mutatis mutandis, for two feature-views that must lie on a same line parallel to the Y axis.)

For mis-alignment 1720, feature view 1310.30 of error window 1703, and feature view 1310.40 of error window 1704 are known share the following:
- 1310.30 and 1310.40 must actually lie on some same line y=c (where c is some constant);
- maximum distance, between current location of 1310.30 and y=c is (w−1)/2
- maximum distance, between current location of 1310.40 and y=c is (w−1)/2
- let m=(w−1)/2=(7−1)/2=3
- minimum value for c
  - must be ≥both ($y_{1310.30}$−3) and ($y_{1310.40}$−3)
  - since $y_{1310.30}$>$y_{1310.40}$ then ($y_{1310.30}$−m)>($y_{1310.40}$−m)
  - therefore, lower bound for c is ($y_{1310.30}$−m), or line 1738
- maximum value for c
  - must be ≤both ($y_{1310.30}$+3) and ($y_{1310.40}$+3)
  - since $y_{1310.30}$>$y_{1310.40}$ then ($y_{1310.20}$+3)>($y_{1310.40}$+3)
  - therefore, upper bound for c is ($y_{1310.40}$+3), or line 1737

Figure 17E:
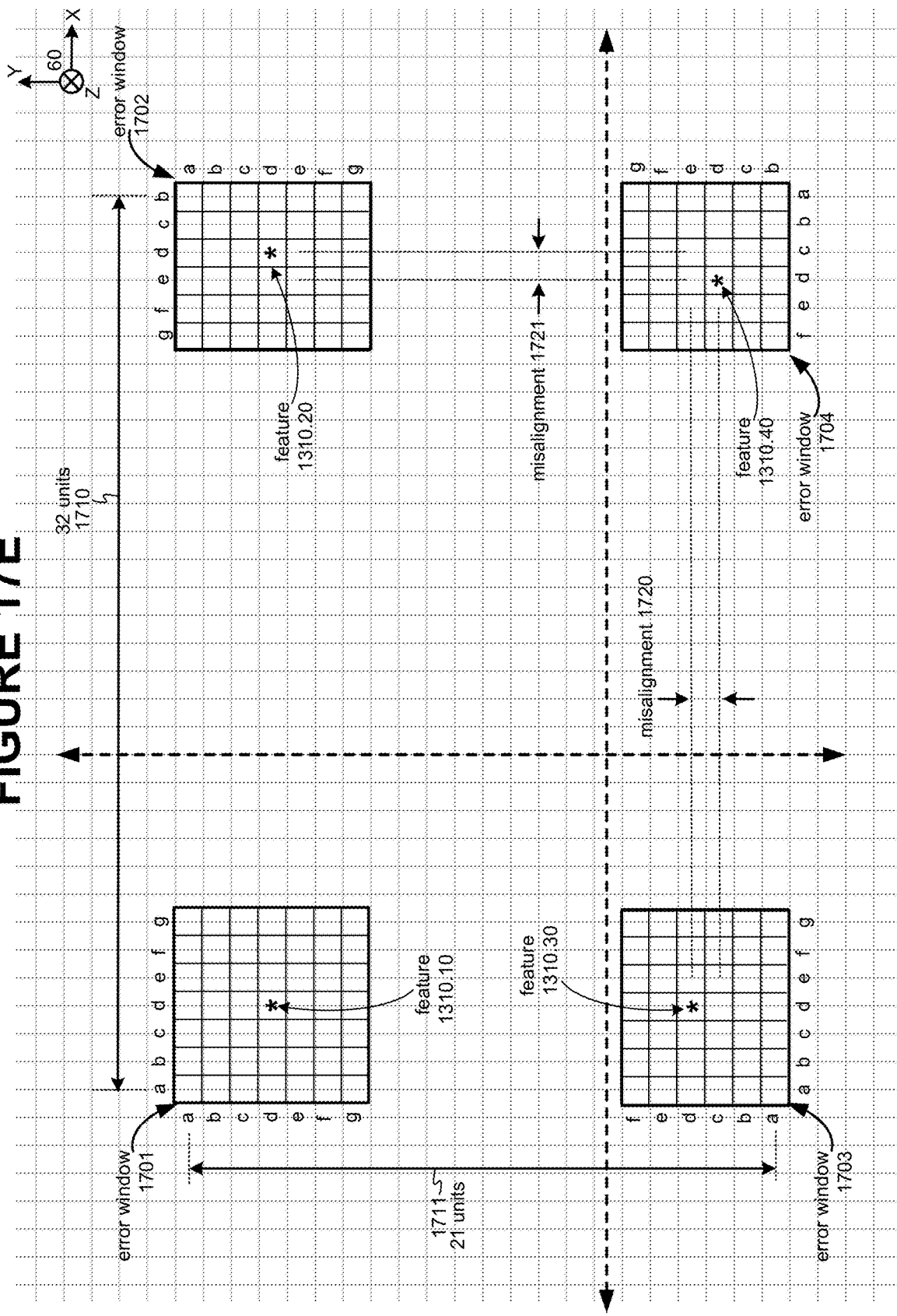
FIG. 17E depicts the net effect of the limitations identified in FIGS. 17C-17D.

FIG. 17E depicts the net effect of the limitations identified in FIGS. 17C-17D. As can be seen, error windows 1702, 1703, and 1704 are smaller.

Figure 17G:
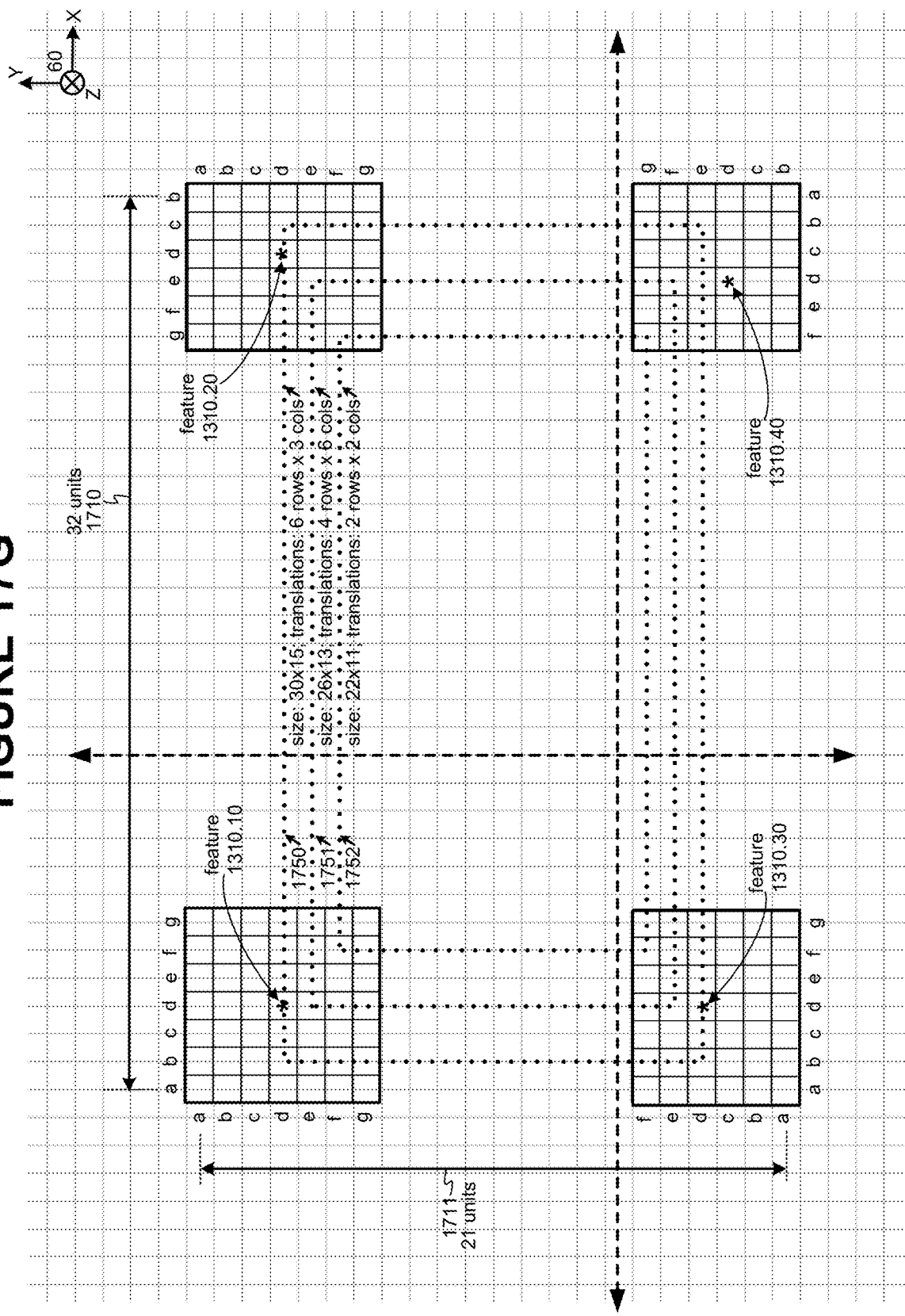

In accordance with the same general procedure, described above for FIGS. 15A-15B, an enumeration of the type 2.0 rectangles is possible, within the constraints of FIG. 17E. This enumeration is depicted in FIGS. 17F and 17G. Because of the extra constraints of FIG. 17E, FIGS. 17F-17G count only 89 rectangles for consideration (43 in FIG. 17F and 46 in FIG. 17G), compared to the 153 enumerated in FIGS. 15A-15B—a reduction of 42% (i.e., (64/153)× 100).

Figure 18A:
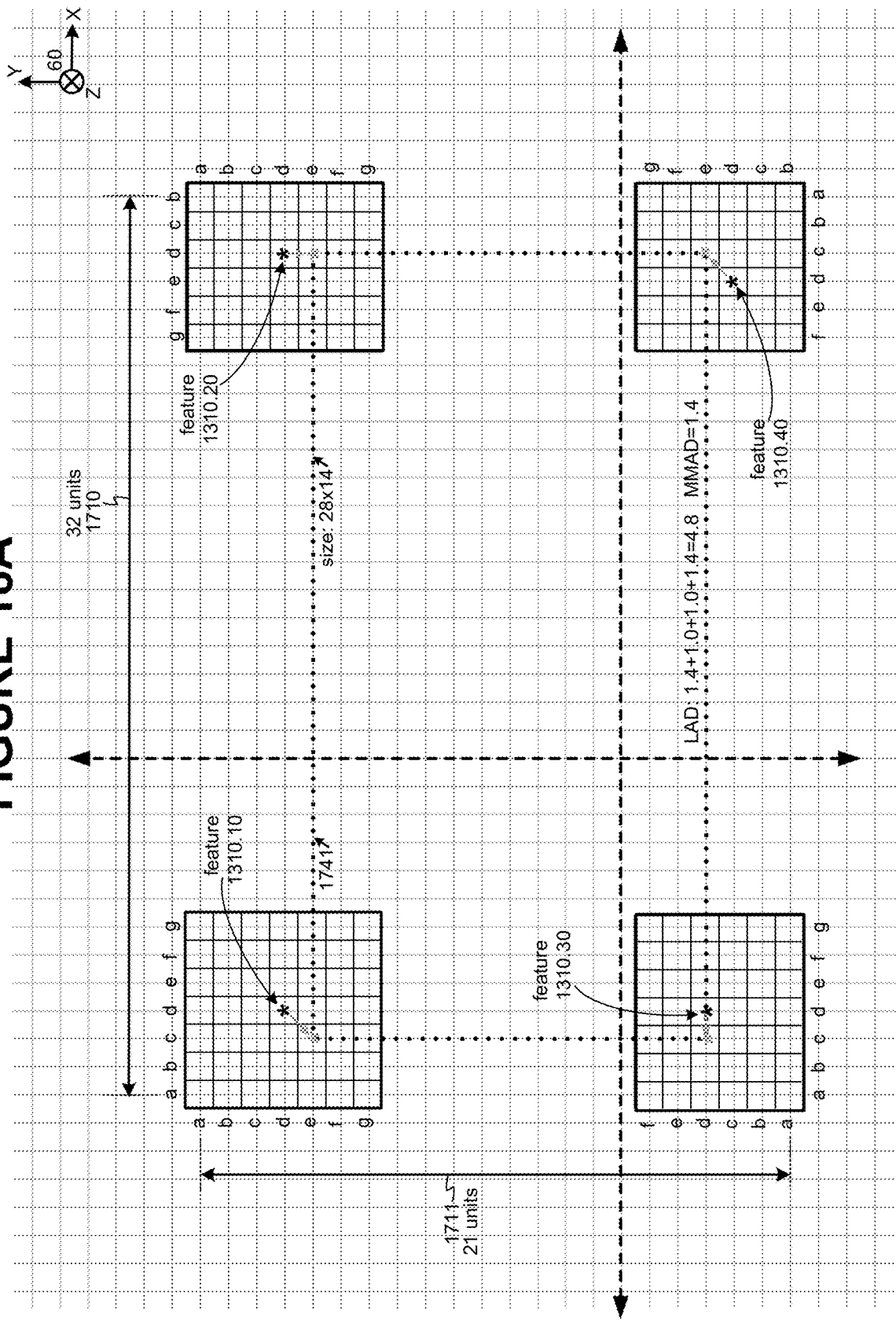
FIGS. 18A-18B depict the performance, according to two metrics, of two of the rectangles enumerated in FIGS. 17F and 17G.
Figure 18B:
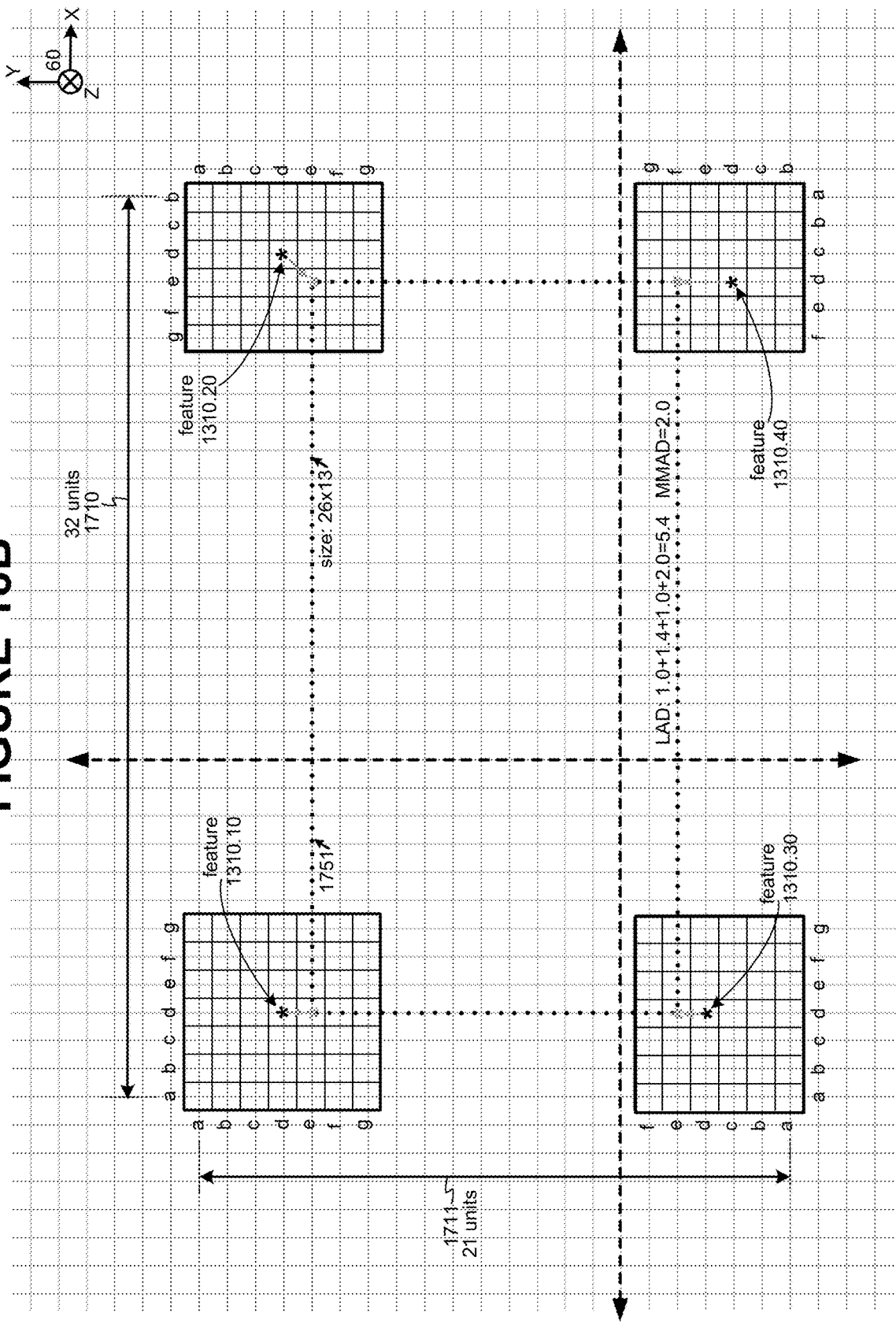

Among the 89 candidates, for the correct reflective rectangular configuration of CV camera 1, one is considered in each of FIGS. 18A-18B:

FIG. 18A:
- Rectangle 1741 is selected, with size 28×14 (enumerated in FIG. 17F).
- Of the 25 possible translations for 1741, one is selected where feature view 1310.10 moves from IE (d, d) to (e, c).
- Regression metrics apply to 1741 as follows:
  - LAD:
    - Feature view 1310.10: (d, d) to (e, c)=1.4
    - Feature view 1310.20: (d, d) to (e, d)=1.0
    - Feature view 1310.30: (d, d) to (d, c)=1.0
    - Feature view 1310.40: (d, d) to (e, c)=1.4
    - Total: 4.8
  - MMAD: maximum distance=1.4

FIG. 18B:
- Rectangle 1751 is selected, with size 26×13 (enumerated in FIG. 17G).
- Of the 24 possible translations for 1751, one is selected where feature view 1310.10 moves from IE (d, d) to (e, d).
- Regression metrics apply to 1751 as follows:
  - LAD:
    - Feature view 1310.10: (d, d) to (e, d)=1.0
    - Feature view 1310.20: (d, d) to (e, e)=1.4
    - Feature view 1310.30: (d, d) to (e, d)=1.0
    - Feature view 1310.40: (d, d) to (f, d)=2.0
    - Total: 5.4
  - MMAD: maximum distance=2.0

Rectangles 1741 and 1751 are presented merely for purposes of example. As part of an exhaustive evaluation strategy, the remaining 87 rectangles can also be evaluated, in a manner similar to that discussed above for 1741 and 1751. If choosing between 1741 and 1751, 1741 would be chosen, both according to the LAD and MMAD metrics.

Figure 18C:
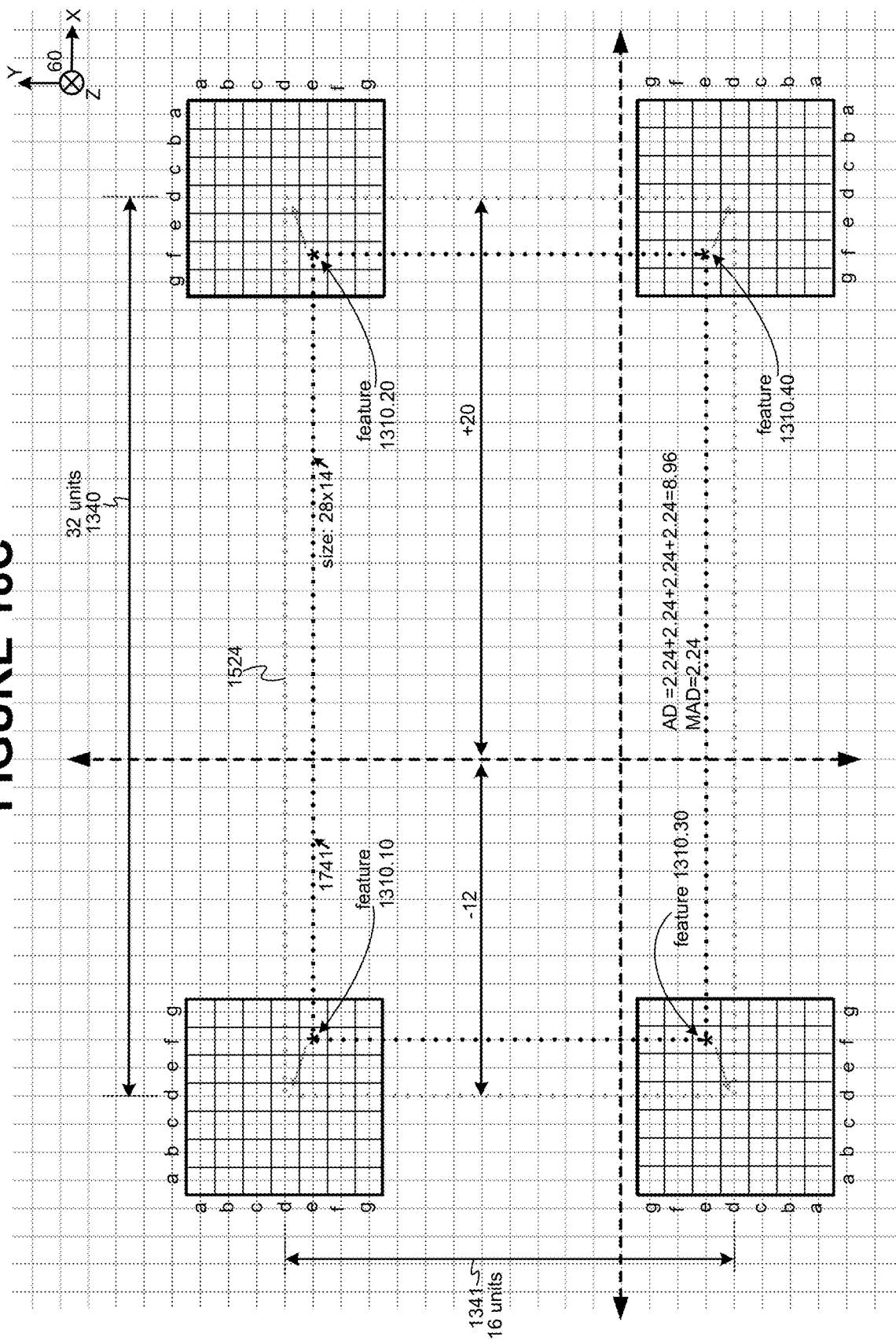
FIGS. 18C and 18D each compare, against the correct configuration of FIG. 13F, the rectangles chosen in FIGS. 18A-18B.
Figure 18D:
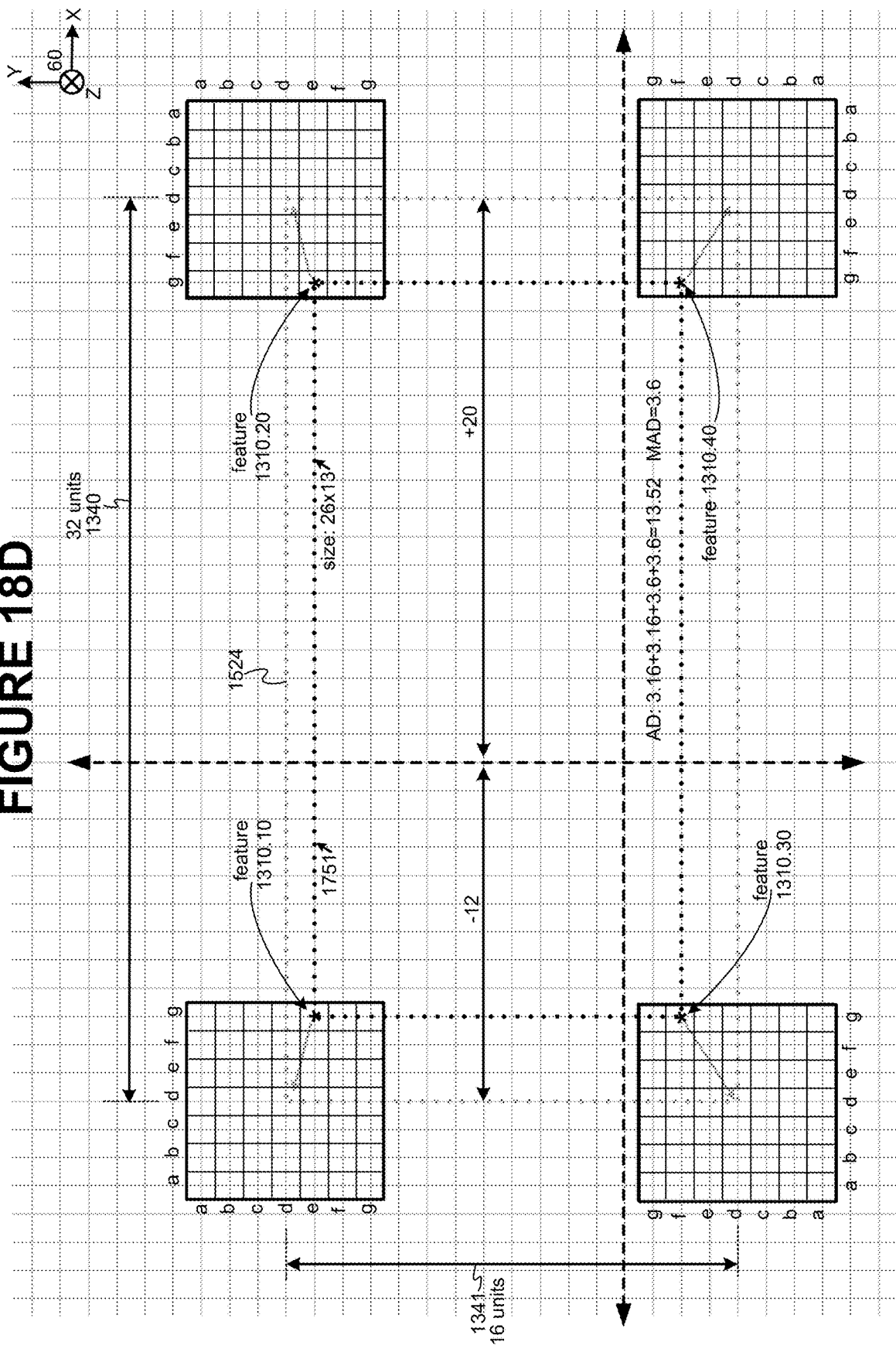

FIGS. 18C and 18D each compare, respectively, rectangles 1741 and 1751 (as chosen in FIGS. 18A-18B) against the correct configuration of FIG. 13F. The above-discussed regression metrics can be applied, with the minor modification that each is used simply for purposes of comparison (between the solution chosen by regression, and the correct solution), rather than to find a "least" or "minimized" solution:
- Least Absolute Distance (LAD) becomes just Absolute Distance (AD), and
- Minimize Maximum Absolute Difference (MMAD) becomes just Maximum Absolute Distance (MAD).

Application of these metrics results in the following:

FIG. 18C:
- AD:
  - Feature view 1310.10: (e, f) to (d, d)=2.24
  - Feature view 1310.20: (e, f) to (d, d)=2.24
  - Feature view 1310.30: (e, f) to (d, d)=2.24
  - Feature view 1310.40: (e, f) to (d, d)=2.24
  - Total: 8.96
- MAD: maximum distance=2.24

FIG. 18D:
- AD:
  - Feature view 1310.10: (e, g) to (d, d)=3.16
  - Feature view 1310.20: (e, g) to (d, d)=3.16
  - Feature view 1310.30: (f, g) to (d, d)=3.6
  - Feature view 1310.40: (f, g) to (d, d)=3.6
  - Total: 13.52
- MAD: maximum distance=3.6

As can be seen, the fact that rectangle 1741 has a better score under the metrics (i.e., LAD and MMAD), than 1751, is also reflected in the fact that 1741 matches the actual answer better than 1751.

2.4.2.2 One RRE Example

Figure 19A:
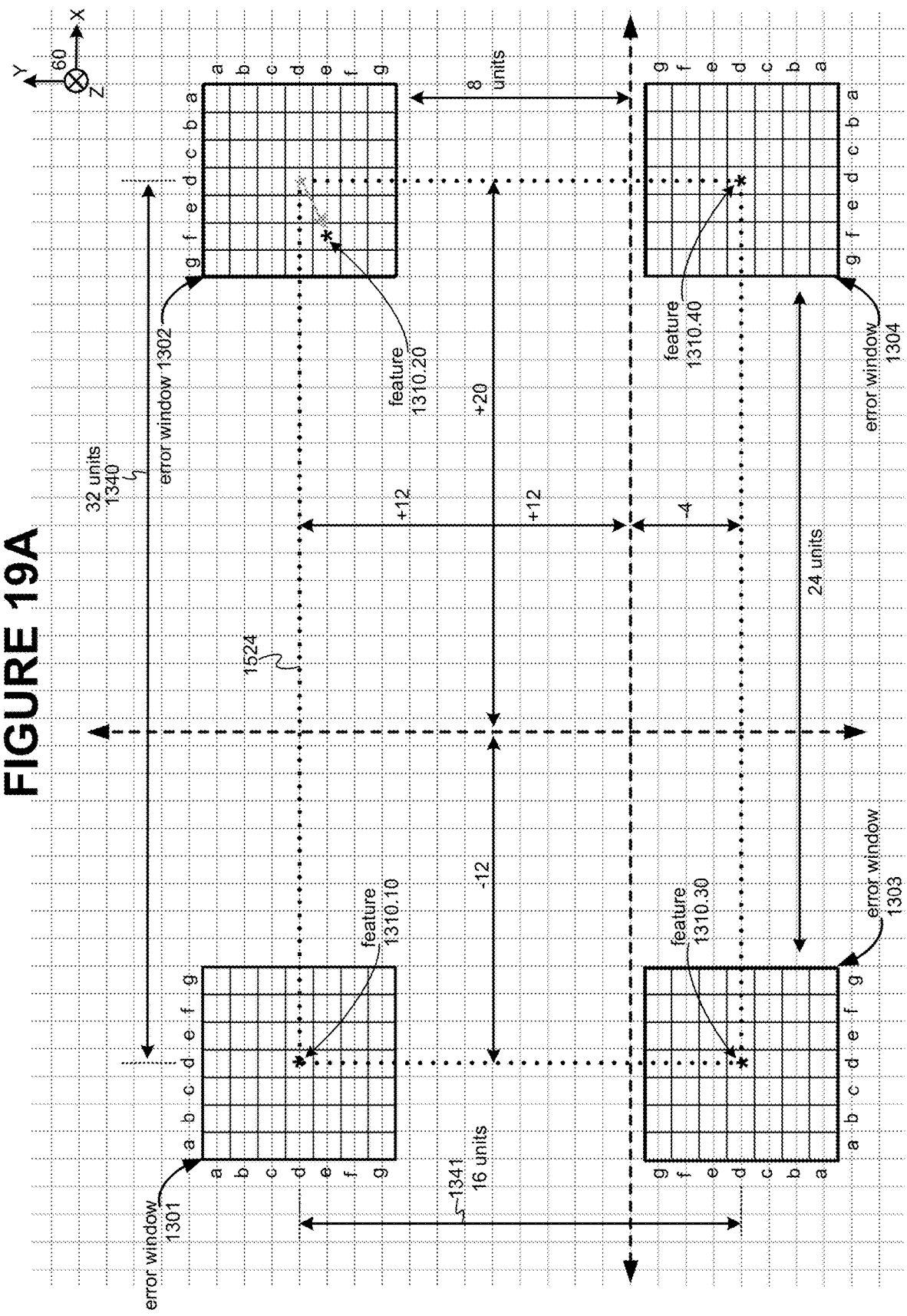
FIG. 19A is intended to depict, with respect to FIG. 13F, the occurrence of one RRE.

With respect to FIG. 13F, FIG. 19A is intended to depict the occurrence of one RRE. For view 1310.20 of error window 1302, it has changed position (between FIGS. 13F and 19A) from (d, d) to (e, f). This can also be referred to as moving −2 units along the X axis and −1 unit along the Y axis.

Figure 19B:
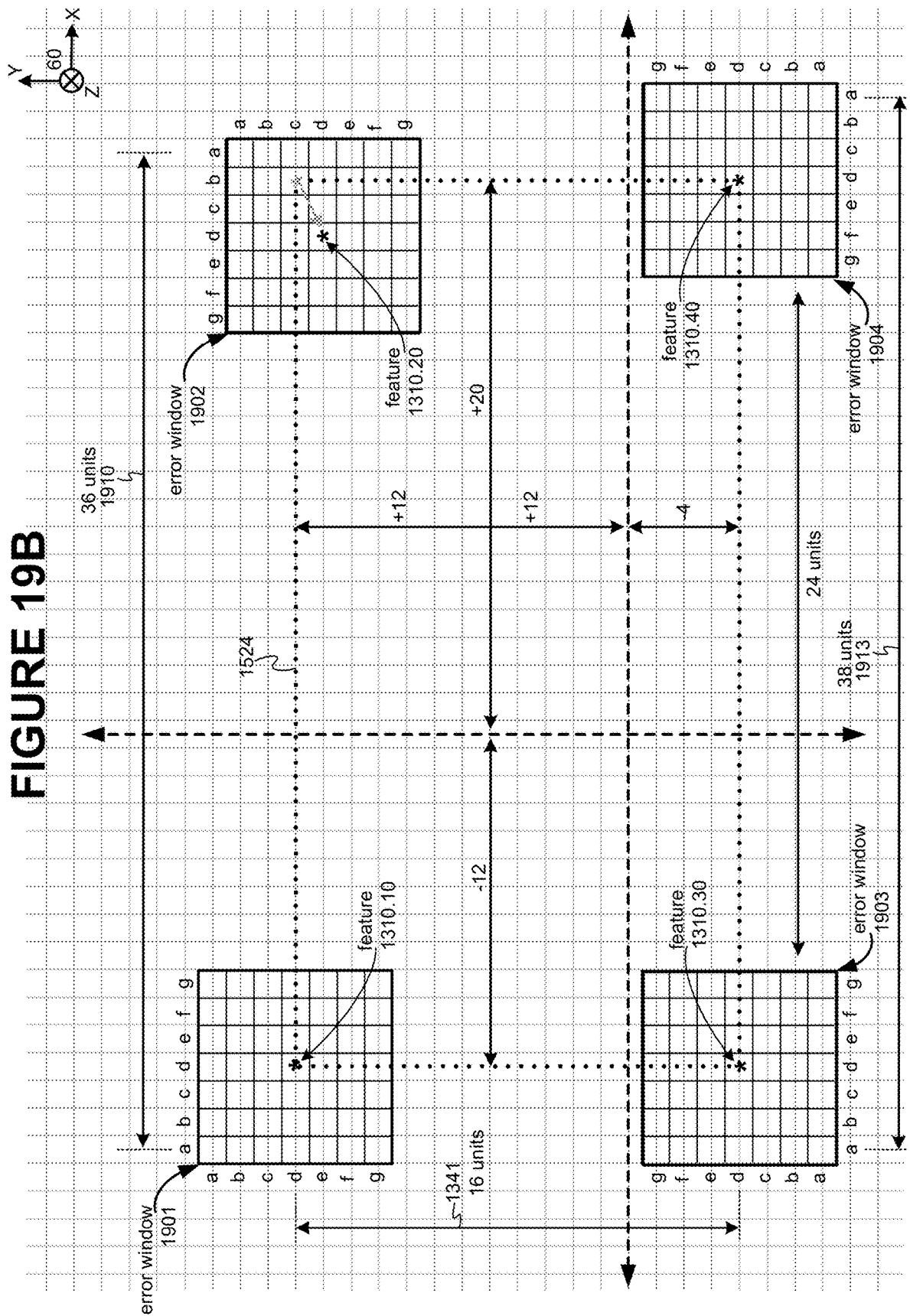
FIG. 19B depicts, with respect to FIG. 19A, each feature-view as being at the center of a new 7×7 error window.

In a similar manner to that discussed above, for the 4 RRE example of FIG. 17B, FIG. 19B depicts each feature-view as being at the center of a new 7×7 error window:

Feature-view 1310.10 within error window 1901
Feature-view 1310.20 within error window 1902
Feature-view 1310.30 within error window 1903
Feature-view 1310.40 within error window 1904

Figure 19C:
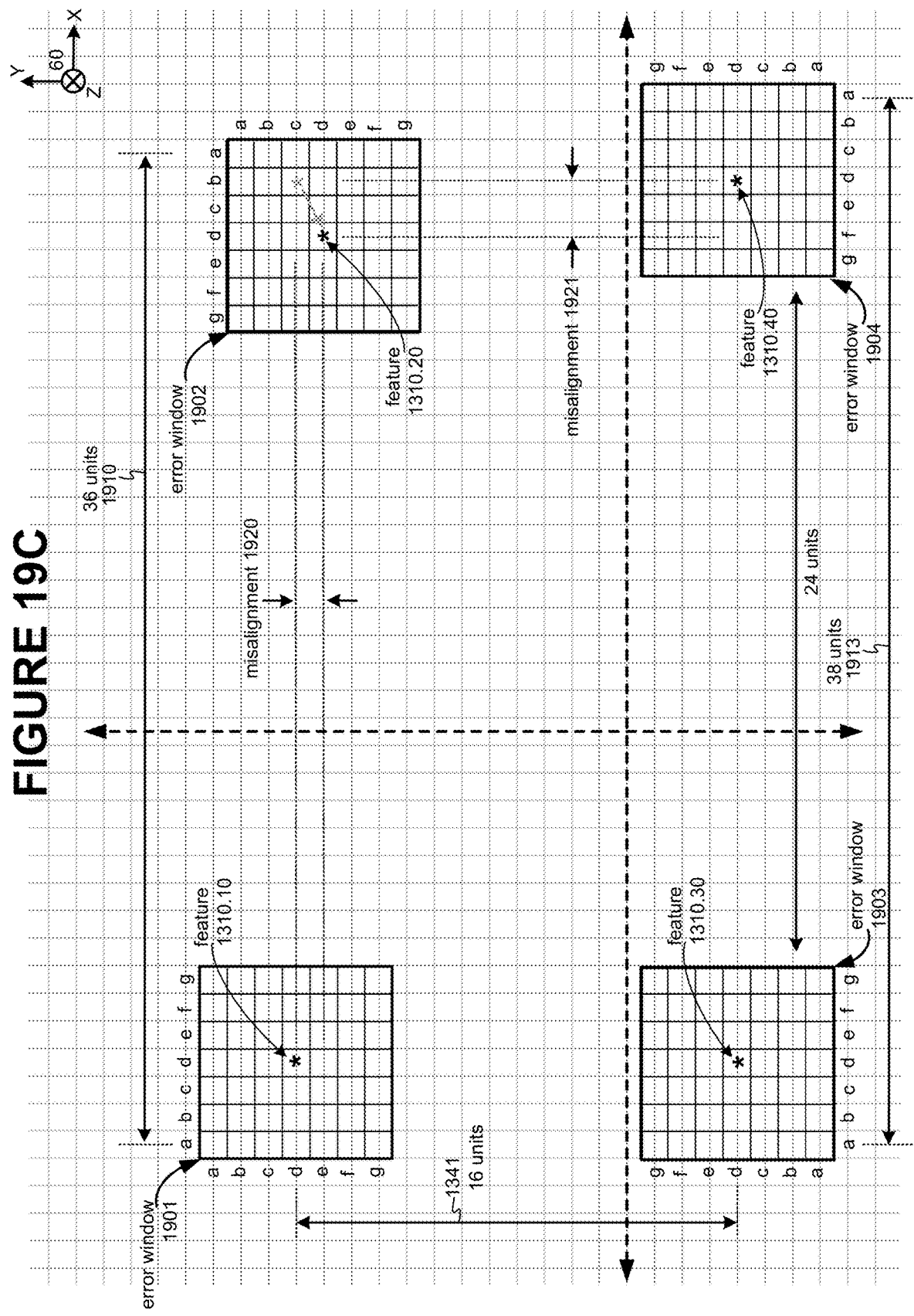
FIGS. 19C and 19D depict how relative mis-alignment of feature-views, along with a limitation of each error window to a certain size, can be used to further limit error windows.

As depicted in FIG. 19C, auto-alignment for CV camera unit 1 can be triggered by a lack of alignment between two pairs of feature-views (when considering pairs of feature views, around the perimeter of what should be a type 2.0 rectangle):

1310.20 is not aligned with 1310.10, as emphasized by misalignment 1920; and
1310.20 is not aligned with 1310.40, as emphasized by misalignment 1921.

Figure 19D:
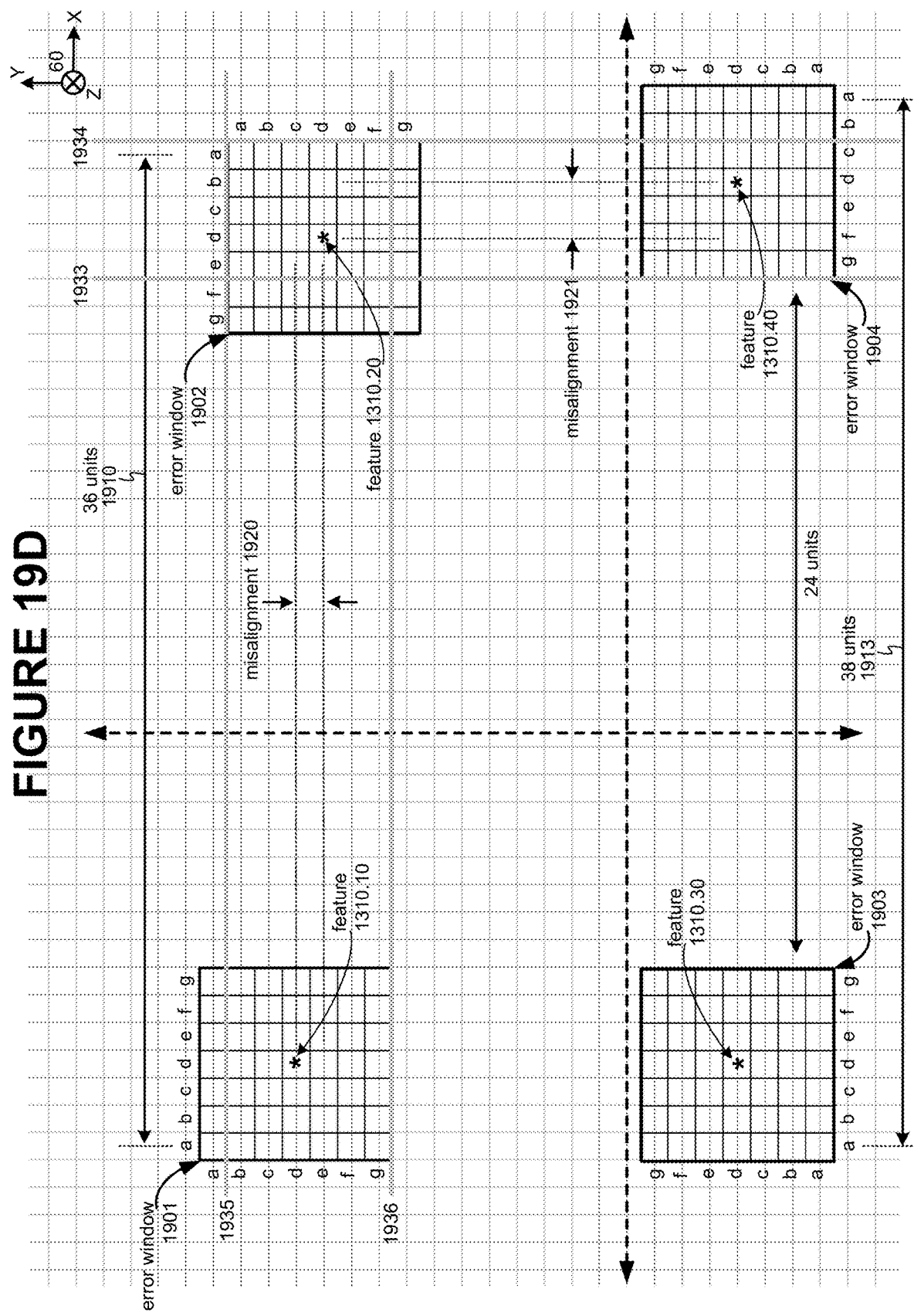

FIG. 19D shows how mis-alignments 1920 and 1921 can be used to reduce the size of error windows 1901, 1902, and 1904. Specifically, lines 1933 and 1934 set minimum and maximum limits, within which the $x=c_1$ line, connecting feature views 1310.20 and 1310.40, must be found. Also, lines 1936 and 1935 set minimum and maximum limits, within which the $y=c_2$ line, connecting feature views 1310.10 and 1310.20, must be found.

Figure 19E:
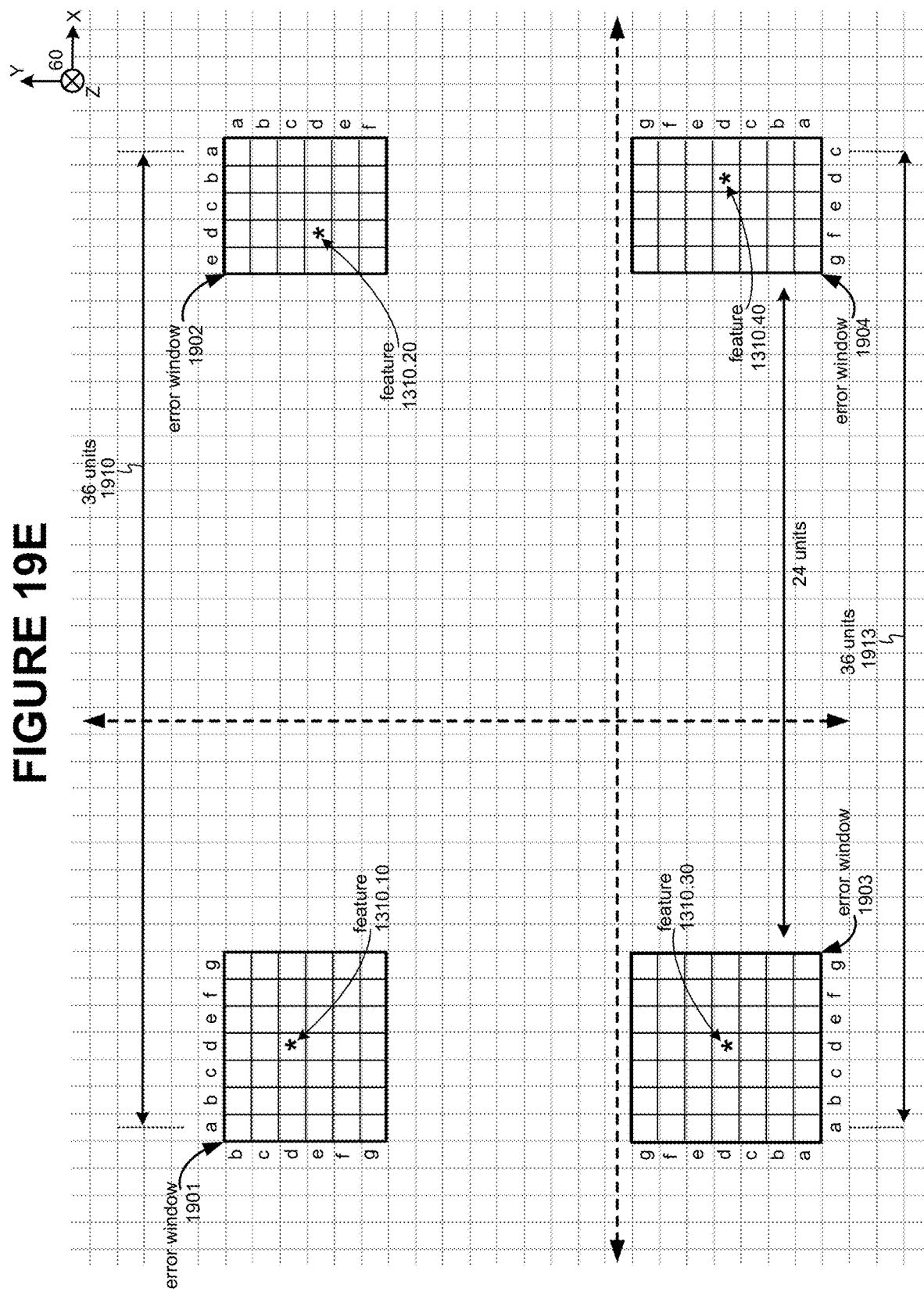
FIG. 19E depicts the net effect of the limitations identified in FIGS. 19C-19D.

FIG. 19E depicts the resized error windows, based on the results of FIG. 19D.

Figure 19F:
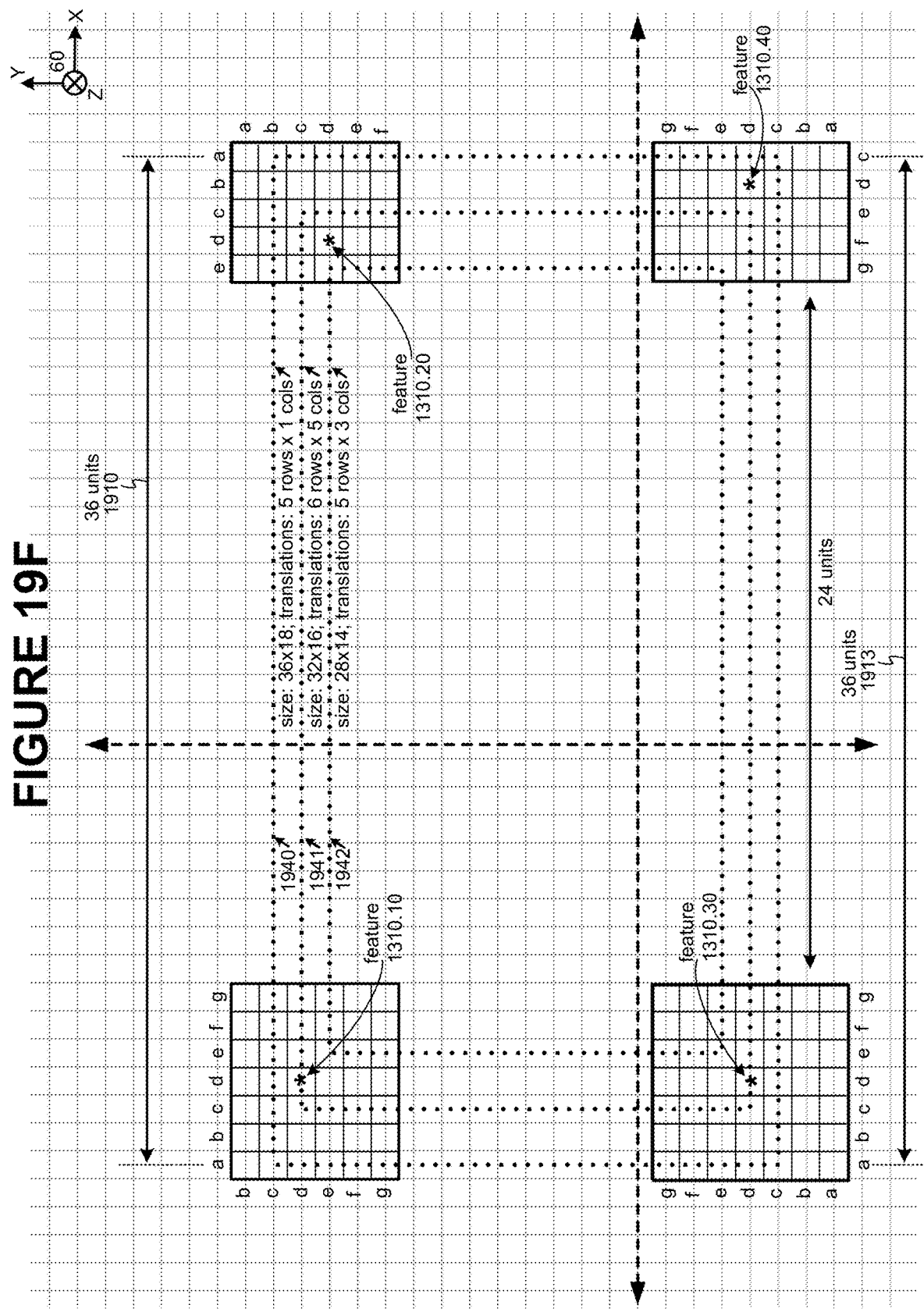

FIGS. 19F and 19G depict an enumeration, of the candidate rectangular solutions, given the extra constraints of the misalignments. FIGS. 19F-19G count only 99 rectangles for consideration (50 for FIG. 19F, and 49 for FIG. 19G), compared to the 153 enumerated in FIGS. 15A-15B—a reduction of 35% (i.e., (54/153)×100).

Among the 99 candidates, for the correct reflective rectangular configuration of CV camera 1, one is considered in each of FIGS. 20A-20C:

FIG. 20A:
Rectangle 1941 is selected, with size 32×16 (enumerated in FIG. 19F).
Of the 30 possible translations for 1941, one is selected where feature view 1310.10 moves from IE (d, d) to (d, c).
Regression metrics apply to 1941 as follows:
LAD:
Feature view 1310.10: (d, d) to (d, c)=1.0
Feature view 1310.20: (d, d) to (c, c)=1.4
Feature view 1310.30: (d, d) to (d, c)=1.0
Feature view 1310.40: (d, d) to (d, e)=1.0
Total: 4.4
MMAD: maximum distance=1.4

FIG. 20B:
Rectangle 1941 is selected, with size 32×16 (enumerated in FIG. 19F).
Of the 30 possible translations for 1941, one is selected where feature view 1310.10 stays at IE (d, d).
Regression metrics apply to 1941 as follows:
LAD:
Feature view 1310.10: (d, d) to (d, d)=0.0
Feature view 1310.20: (d, d) to (c, b)=2.24
Feature view 1310.30: (d, d) to (d, d)=0.0
Feature view 1310.40: (d, b) to (d, d)=0.0
Total: 2.24
MMAD: maximum distance=2.24

FIG. 20C:
Rectangle 1951 is selected, with size 30×15 (enumerated in FIG. 19G).
Of the 30 possible translations for 1951, one is selected where feature view 1310.10 moves from IE (d, d) to (e, e).
Regression metrics apply to 1951 as follows:
LAD:
Feature view 1310.10: (d, d) to (e, e)=1.4
Feature view 1310.20: (d, d) to (d, c)=1.0
Feature view 1310.30: (d, d) to (d, e)=1.0
Feature view 1310.40: (d, d) to (d, e)=1.0
Total: 4.4
MMAD: maximum distance=1.4

Figure 20D:
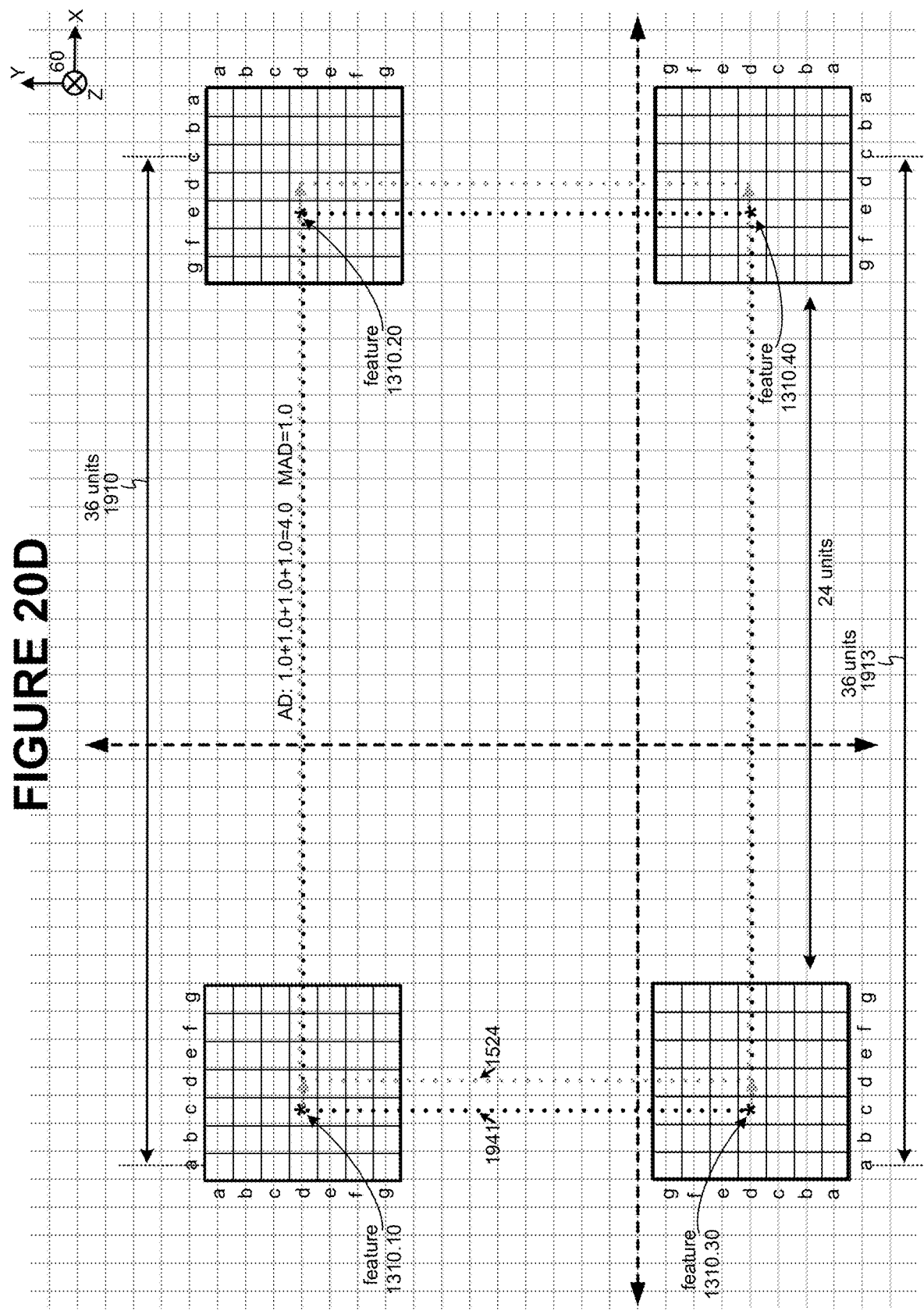
FIGS. 20D-20F each compare, respectively, the rectangle chosen in each of FIGS. 20A-20C to the correct configuration of FIG. 13F.
Figure 20E:
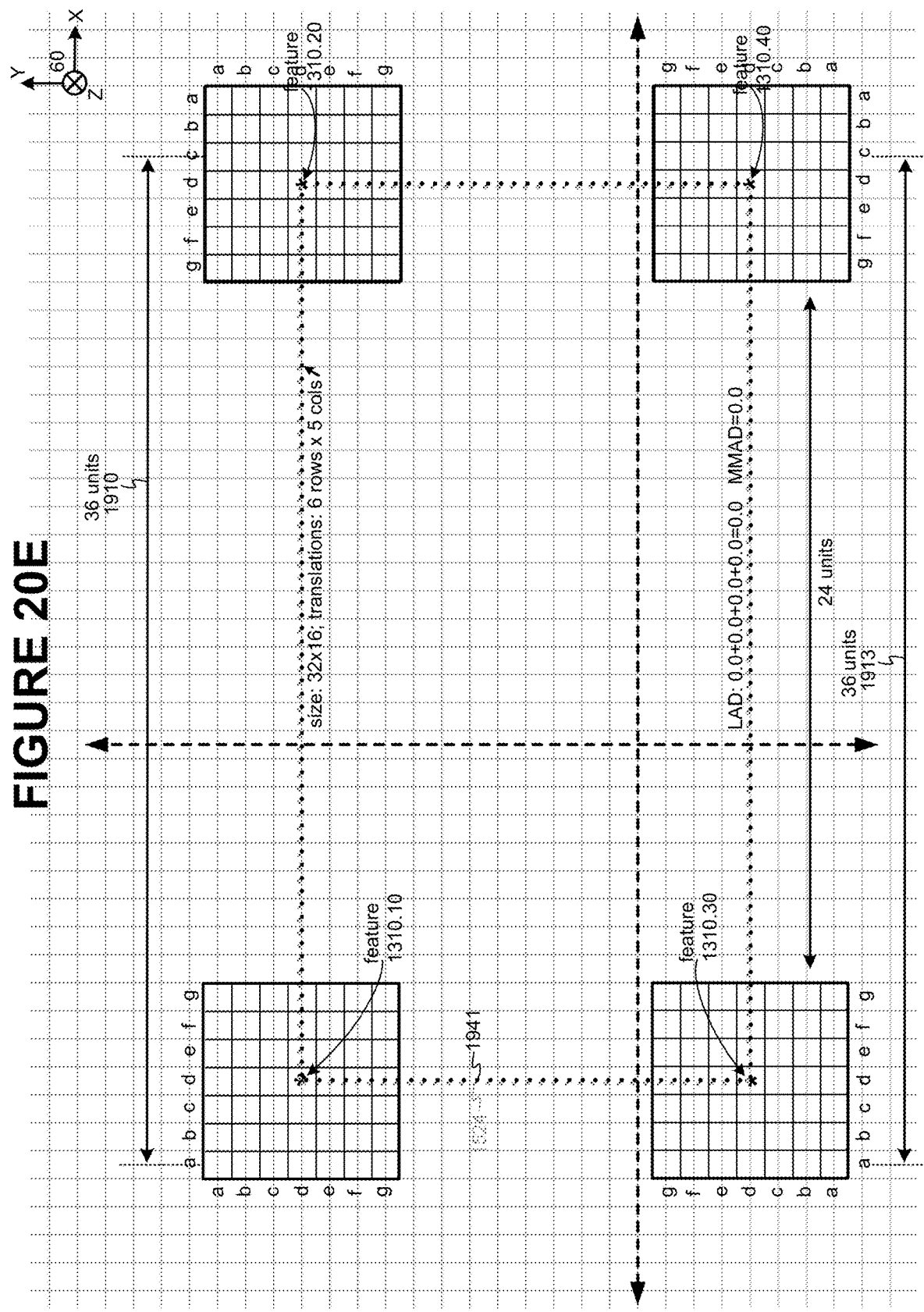
Figure 20F:
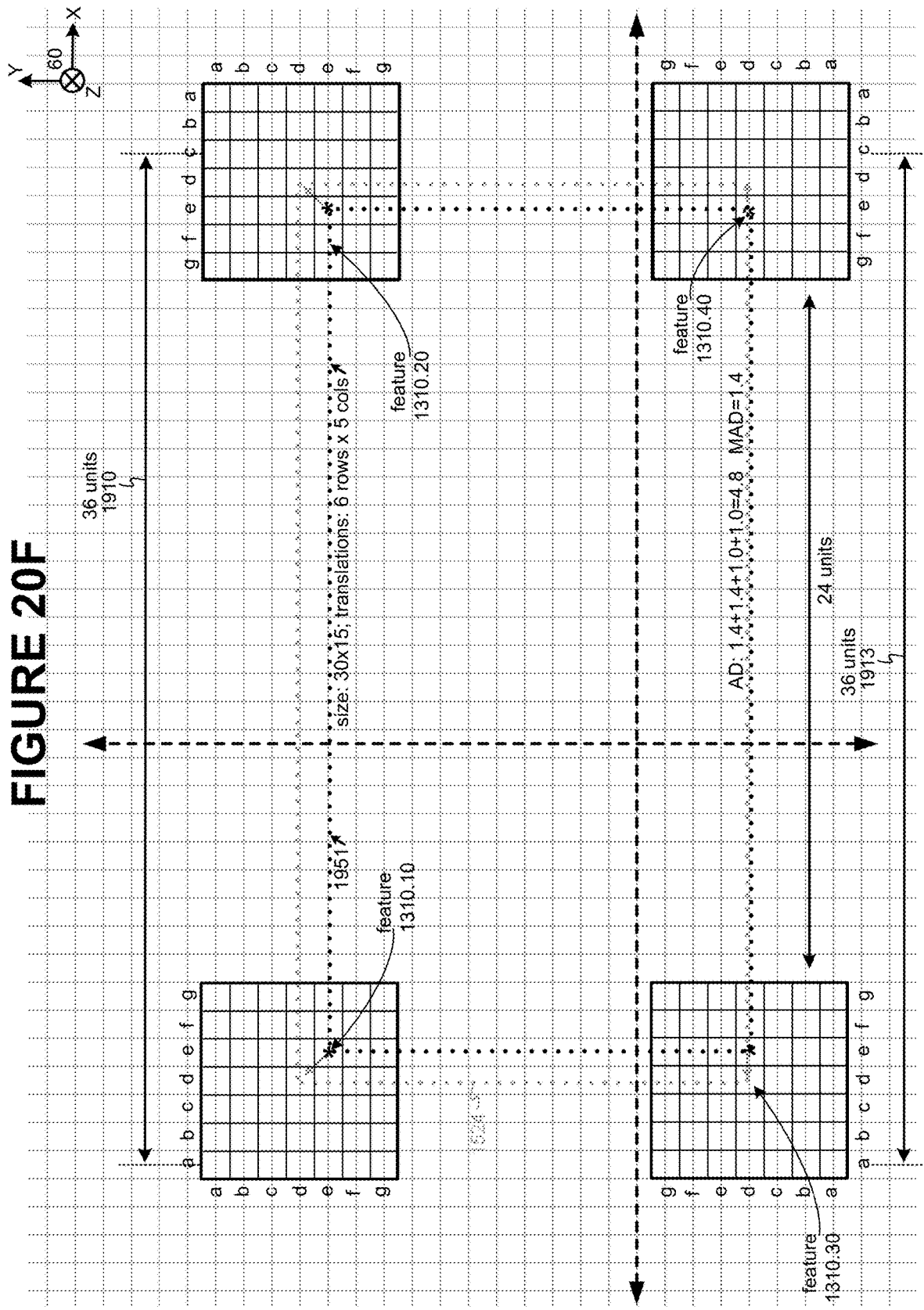

FIGS. 20D-20F each compare, respectively, the rectangle chosen in each of FIGS. 20A-20C to the correct configuration of FIG. 13F.

Application of the metrics AD and MAD results in the following:

FIG. 20D:
AD:
Feature view 1310.10: (d, c) to (d, d)=1.0
Feature view 1310.20: (d, e) to (d, d)=1.0
Feature view 1310.30: (d, c) to (d, d)=1.0
Feature view 1310.40: (d, e) to (d, d)=1.0
Total: 4.0
MAD: maximum distance=1.0

FIG. 20E:
AD:
Feature view 1310.10: (d, d) to (d, d)=0.0
Feature view 1310.20: (d, d) to (d, d)=0.0
Feature view 1310.30: (d, d) to (d, d)=0.0
Feature view 1310.40: (d, d) to (d, d)=0.0
Total: 0.0
MAD: maximum distance=0.0

FIG. 20F:
AD:
Feature view 1310.10: (e, e) to (d, d)=1.4
Feature view 1310.20: (e, e) to (d, d)=1.4
Feature view 1310.30: (d, e) to (d, d)=1.0
Feature view 1310.40: (d, e) to (d, d)=1.0
Total: 4.8
MAD: maximum distance=1.4

2.4.3 Heuristics

As an alternative, or addition, to a two-phase cycle of generate/evaluate, when seeking to determine a correct (or close to correct) rectangular configuration, this section presents a heuristic approach. Heuristics can be regarded as an approach where the two phases are intermixed. The heuristics presented here can be useful even for CV cameras with small error windows (e.g., an error window size of about 10), because even exhaustive optimizations are not guaranteed to produce the correct result. However, when dealing with large search spaces, the heuristics presented here become more important.

2.4.3.1 Two Aligned Pairs

FIG. 21A depicts the same one-RRE example addressed above (and in connection with FIG. 19A), except a potential solution is found by heuristics rather than regression.

In particular, the most likely explanation, for the configuration of FIG. 21A, is that feature view 1310.20 has moved from (d, d) to (e, f). Because, for example, it is unlikely that, instead, feature-views 1310.10, 1310.30, and 1310.40 all moved in precisely the manner required, such that it only appears that only feature view 1310.20 has changed its position. For example, the odds of this happening, for a type 2.0 configuration of error windows, and w=7 (i.e., the error window has sides, measured in IE's, of length 7), is about 1/1000. (This, along with other values, are calculated below, in section 5.2 "Likeliness of 3 RRE's forming Rectangle.") The unlikeliness is based upon two main assumptions:

The feature-views began in a very specific state: arranged exactly as a rectangle of a particular type.

If a feature-view has shifted location, it has done so randomly, with respect to both magnitude and direction (except magnitude can be constrained within an error window).

More generally, identifying the situation of FIG. 21A can be described as having the following two main steps:

1. Identify the pairs of feature-views that are aligned, exactly, with the X or Y axis. The pairs that are counted are those that can be created by proceeding around the perimeter of the quadrilateral polygon formed by the four feature views.
2. If two, and only two, pairs of axis-aligned feature views are identified, and they join at a corner, the next step is to see whether, together, they define a rectangle of the correct type.

For step 1, FIG. 21B depicts the process graphically, by showing how each feature view can extend a line segment in the X axis and Y axis directions. For example, feature view 1310.10 extends a line segment 2111 along the X axis, and a line segment 2110 along the Y axis. Similarly, feature view 1310.20 extends a line segment 2121 along the X axis, and a line segment 2120 along the Y axis.

As can be seen, line segment 2111 of feature view 1310.10 does not align with line segment 2121 of feature view 1310.20. In contrast, line segment 2110 of feature view 1310.10 does align with line segment 2130 that extends along the Y axis from feature view 1310.30. Therefore, feature view 1310.10 and 1310.30 form a first pair of axis-aligned feature views (i.e., they define a line parallel to the Y axis).

Also, line segment 2131, of feature view 1310.30, aligns with line segment 2141 of feature view 1310.40. Thus, a second pair of aligned feature views is identified.

The last pair to be considered are line segments 2120 and 2140 (of, respectively, feature views 1310.10 and 1310.40), which are not aligned.

For step 2, counting-up the pairs of axis-aligned feature-views, we know there is a total of only two such pairs: (1310.10, 1310.30), and (1310.30, 1310.40). Further, they join at a corner (i.e., at feature 1310.30), and define a rectangle of the correct type: the distance between feature views 1310.30 and 1310.40 is twice the distance between feature views 1310.10 and 1310.30.

FIG. 21C depicts the completion of what is believed to be the correct rectangular configuration, by extending line segments 2111 and 2140 until they intersect in error window 1302. The location of feature view 1310.20, within error window 1302, is ignored.

2.4.3.2 One Aligned Pair

Figure 22A:
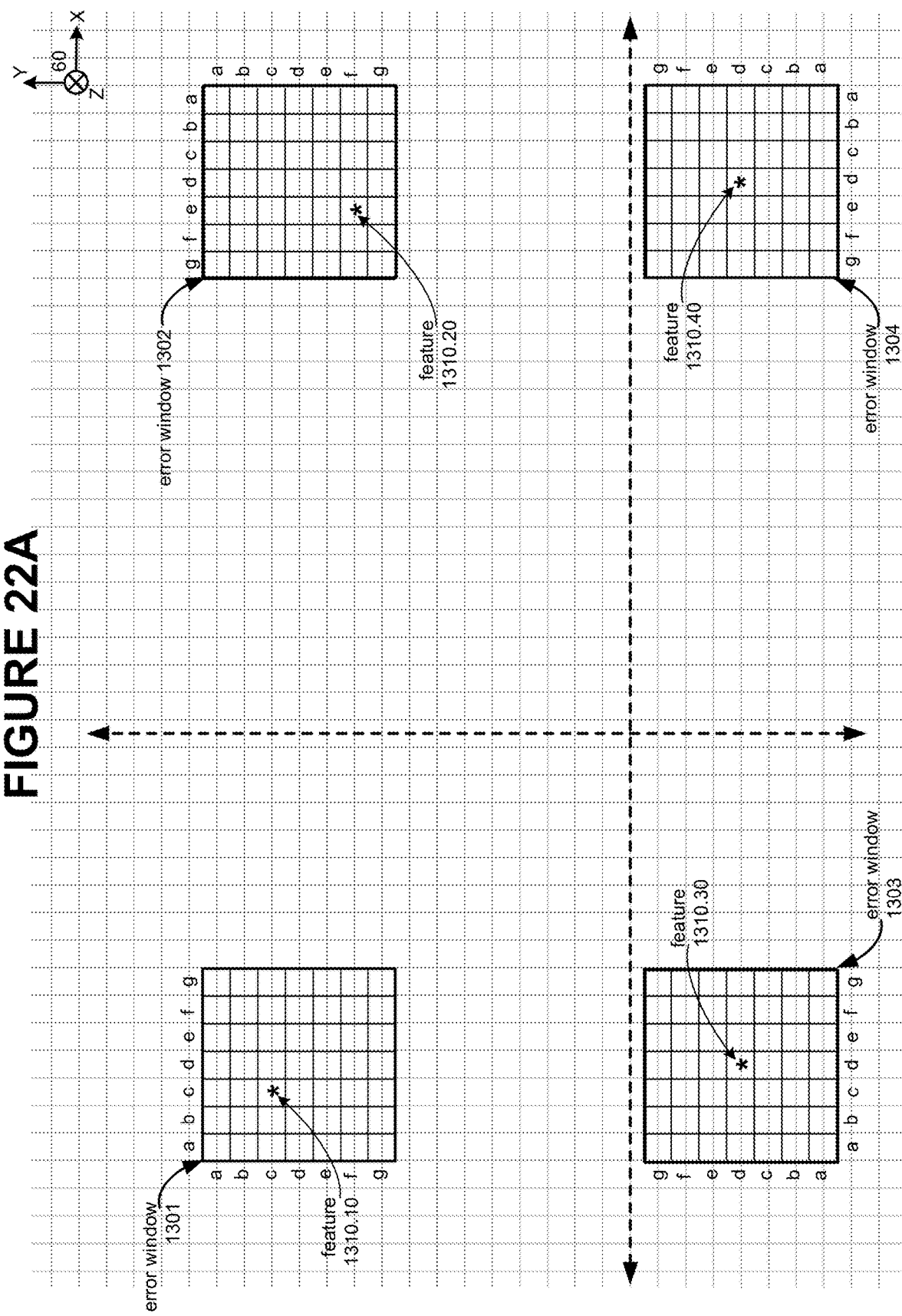
FIG. 22A depicts a configuration that appears to be most likely explained by the occurrence of two RRE's that are consecutive, when preceding pairwise around the perimeter.

FIG. 22A depicts a configuration that appears to be most likely explained by the occurrence of the following two RRE's:

feature view 1310.10 has moved from (d, d) to (c, c), and feature view 1310.20 has moved from (d, d) to (f, e).

This is because, as is illustrated in FIG. 22B, among the four pairs of feature-views, only the pair (1310.30, 1310.40) is axis-aligned (i.e., it is parallel to the Y axis). For each of feature-views 1310.10 and 1310.20, they are aligned with no other feature-view. Since we know the configuration of FIG. 22A started with each feature-view being aligned with two other feature-views, it seems most likely to assume that feature-views 1310.10 and 1310.20 have each moved randomly, and have thus lost their alignment with the vertices to which they directly connect. On the other hand, feature-views 1310.30 and 1310.40 have remained in alignment with each other, a result that is not likely if either or both of them underwent a random shift in position.

More generally, identifying the situation of FIG. 22A can be described as having the following two main steps:

1. Identify the pairs of feature-views that are aligned, exactly, with the X or Y axis. The pairs that are counted are those that can be created by proceeding around the perimeter of the quadrilateral polygon formed by the four feature views.
2. If one, and only one, pair of axis-aligned feature views is identified, use this line segment to reconstruct a rectangle of the correct type.

Step 1, with respect to FIG. 22B, has already been described above.

With regard to step 2, knowing the distance between feature-views 1310.30 and 1310.40, and knowing that a type 2 rectangular configuration required, is sufficient to construct a reflective rectangular configuration.

As can be seen in FIG. 22C, the distance between 1310.30 and 1310.40 is 32 units, meaning that the short sides of the configuration must each be 16 units. Therefore, line segments 2230 and 2240 are each extended by 16 units, in a positive direction parallel to the Y axis. Between the points where 2230 and 2240 each reach 16 units, a 32 units line segment labeled 2201, parallel to the X axis, is added.

2.4.3.3 One Diagonal Pair

In addition to identifying a pair of feature views aligned with the X axis or Y axis, another heuristic is to identify a pair of diagonal feature-views that define a rectangle of the correct type.

Figure 23A:
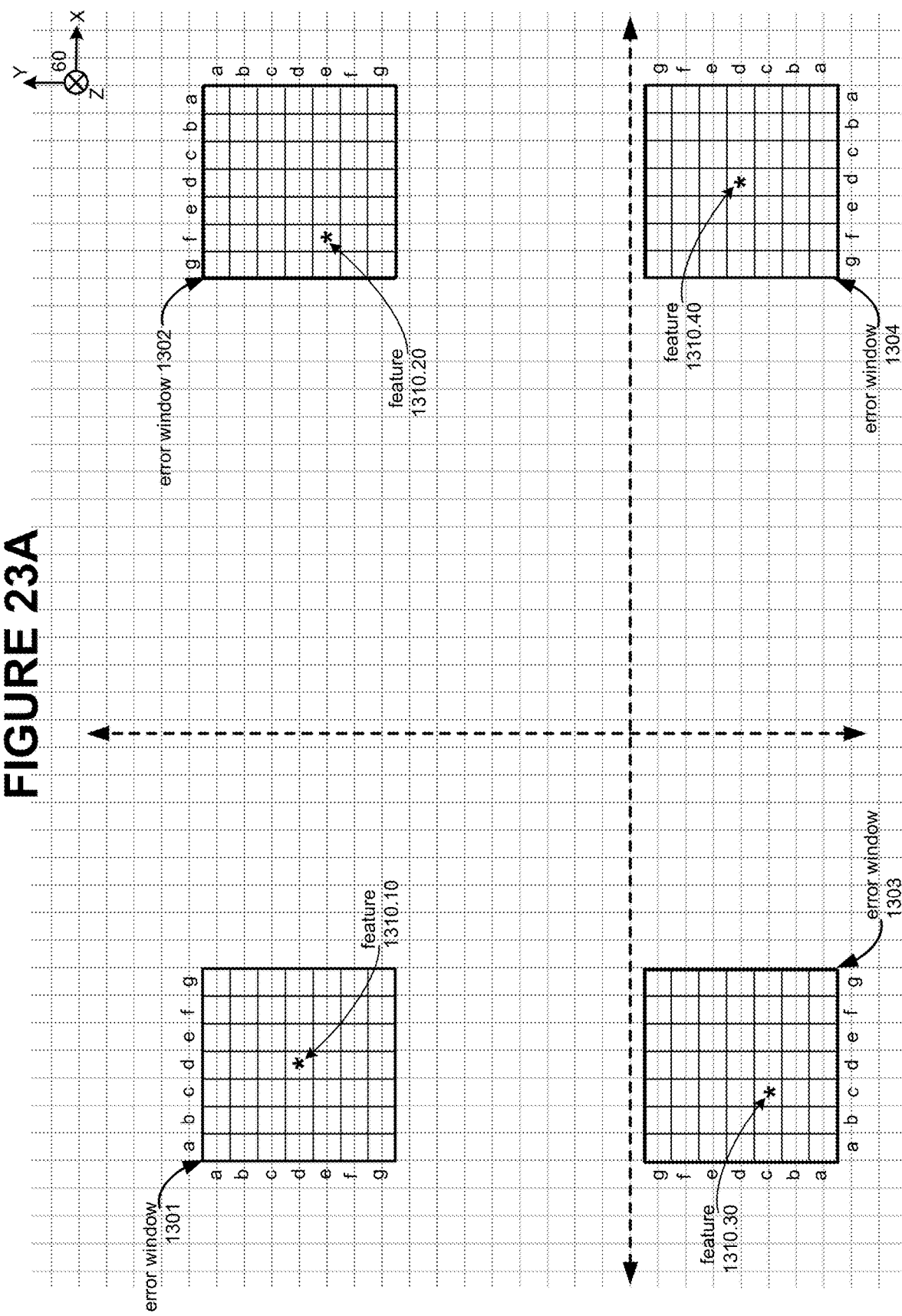
FIG. 23A depicts a configuration that appears to be most likely explained by the occurrence of two RRE's that are diagonally across from each other.

For example, FIG. 23A shows a configuration where, when proceeding around the perimeter of the polygon formed by the four feature-views, there is not even one pair of feature-views aligned with either the X or Y axes. The discovery, of no aligned pairs, is shown in FIG. 23B.

However, when considering diagonal pairs, it can be discovered that there is a pair of feature-views that define a type 2.0 rectangle. FIG. 23C considers diagonal pair (1310.10, 1310.40), while FIG. 23D considers diagonal pair (1310.20, 1310.30).

As can be seen in FIG. 23C, line segments 2310 and 2311 are extended from feature view 1310.10, while line segments 2340 and 2341 are extended from feature view 1310.40. The result is a type 2.0 rectangular configuration with the dimensions of 32 and 16 units for, respectively, long side 2350 and short side 2351.

In FIG. 23D, line segments 2320 and 2321 are extended from feature view 1310.20, while line segments 2330 and 2331 are extended from feature view 1310.30. In this case, the result is not a type 2.0 rectangular configuration, since the dimensions are 31 units and 16 units for, respectively, long side 2352 and short side 2353.

More generally, the steps of FIGS. 23A-23C can be described as follows:

1. Identify the pairs of feature-views that are aligned, exactly, with the X or Y axis. The pairs that are counted are those that can be created by proceeding around the perimeter of the quadrilateral polygon formed by the four feature views.
2. If no pairs of axis-aligned feature views are identified, test each diagonal pair, for whether it defines a rectangle of the correct type.
3. If one, and only one, diagonal pair defines a rectangle of the correct type, use the rectangular configuration this diagonal pair defines.

2.4.4 Large Search Spaces

While exhaustive consideration of candidate configurations is possible with small error-window sizes (e.g., w≤10), certain conditions, such as the following, can change that feasibility:
  It may not be possible to constrain the RRE's, possible with a particular construction of the ICA's in use, to a small window.
  As smaller IE's are used on imaging chips (e.g., to obtain higher resolution), even a same size error window, measured in meters, becomes larger, when measured in IE's.

To obtain a better understanding of how tractability changes, with increasing window size, it would be useful to have a general formula. For the case of a CV camera where its ICA's a configured as a square, a closed-form formula is derived below, in section 5.1 ("Number of Square Configurations"). The formula is:

$$\frac{2w^3 + w}{3}$$

Where w is the dimension (measured in IE's) of each side of a square error-window.

As can be seen, the number of candidate configurations increases with the cube of the error window size (measured in IE's). While an error window size of about 10 seems quite tractable, by the time w=100, the above formula shows that the number of potential configurations becomes quite large:

$$= \frac{2w^3 + w}{3}$$
$$= \frac{2(100^3) + 100}{3} = \frac{2(1,000,000) + 100}{3} = \frac{2,000,100}{3} = 666,700$$

Particularly when dealing with a large search space, the exploration of candidate configurations can be greatly assisted by a good starting point.

The statistical technique of this subsection is intended to be utilized when the following two conditions apply:
  a more-specific heuristic is not applicable; and
  a good starting point is needed, for the search of the candidate configurations.

Figure 24A:
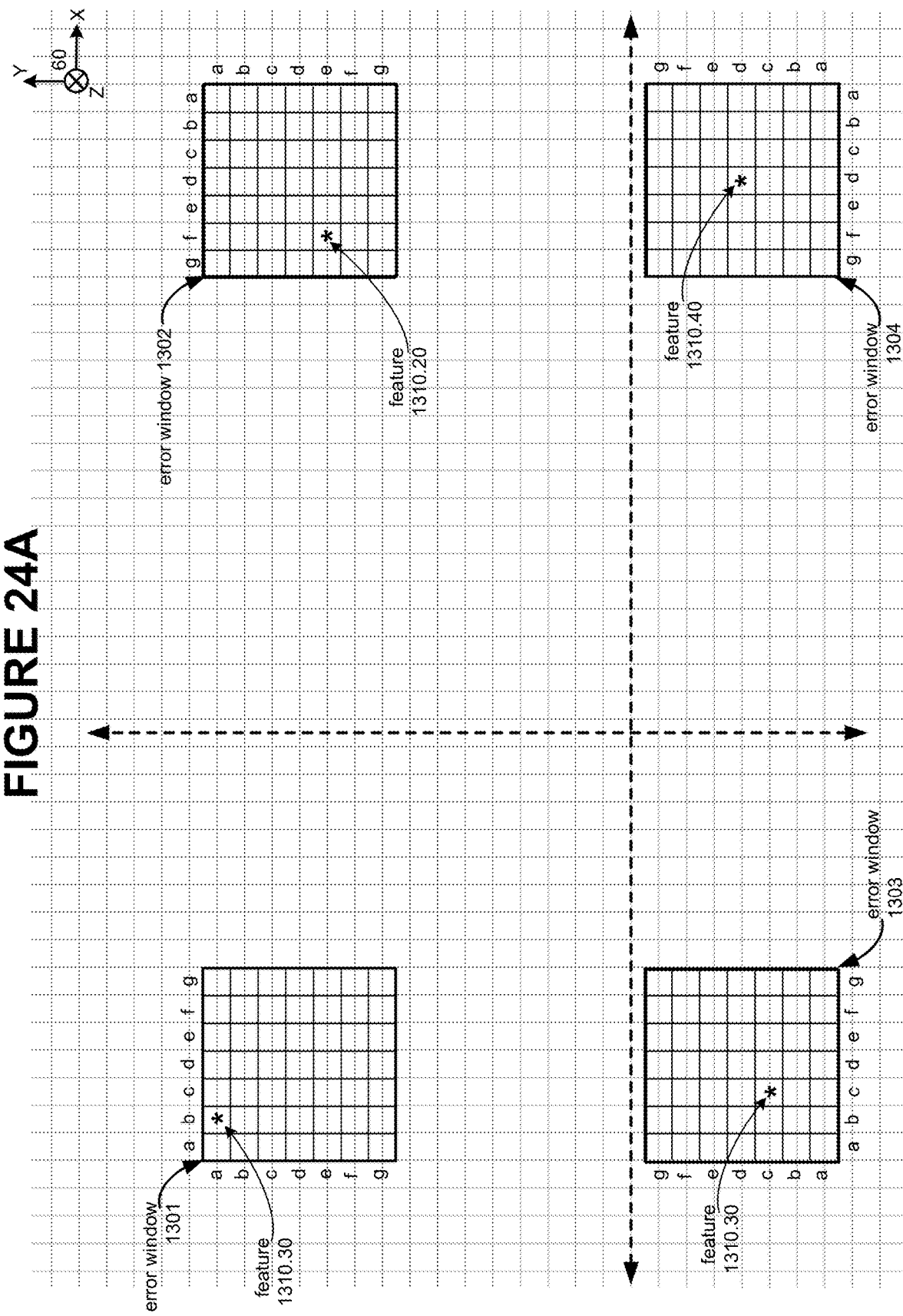
FIG. 24A presents a configuration where no heuristic appears to apply.
Figure 24C:
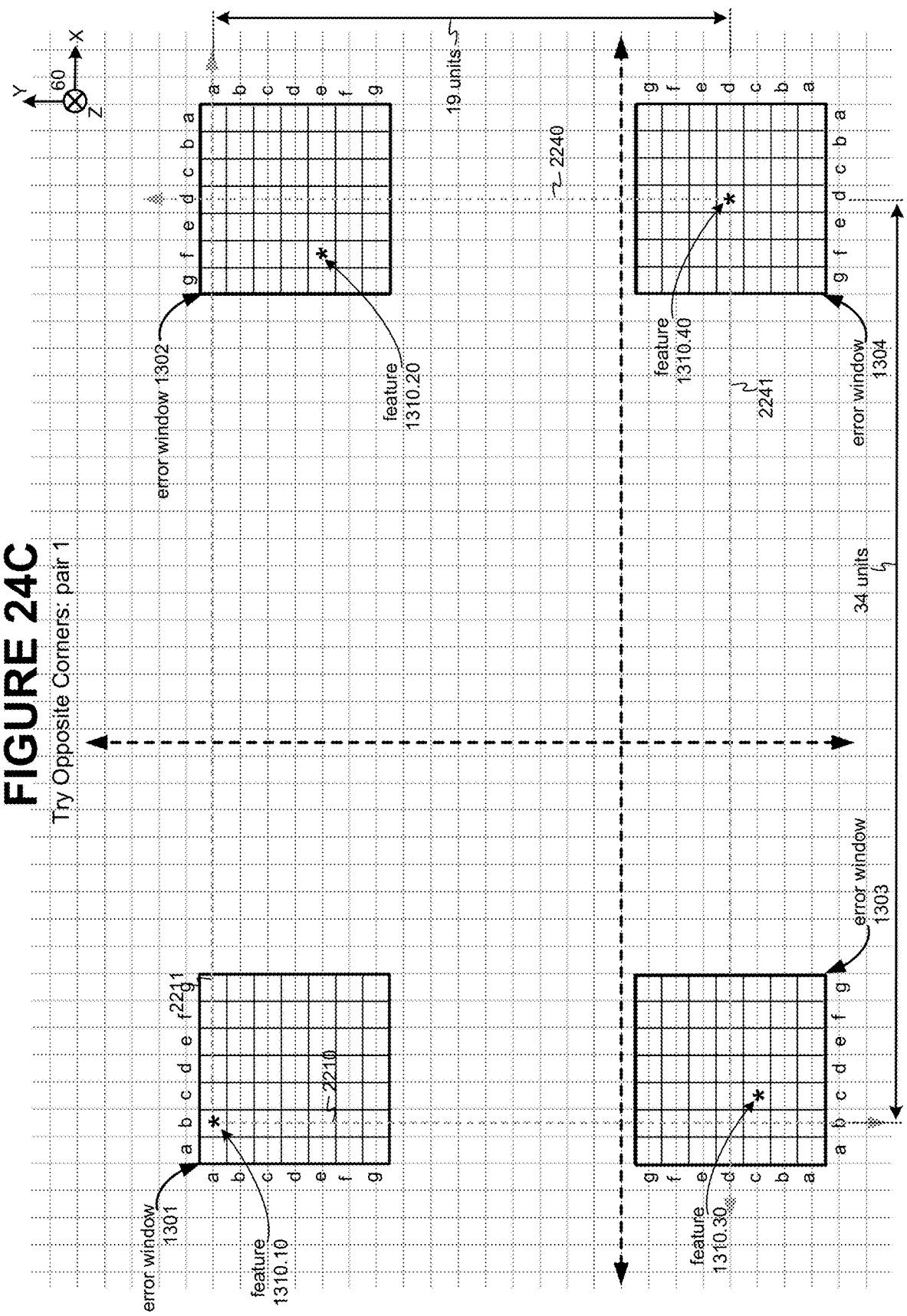
Figure 24E:
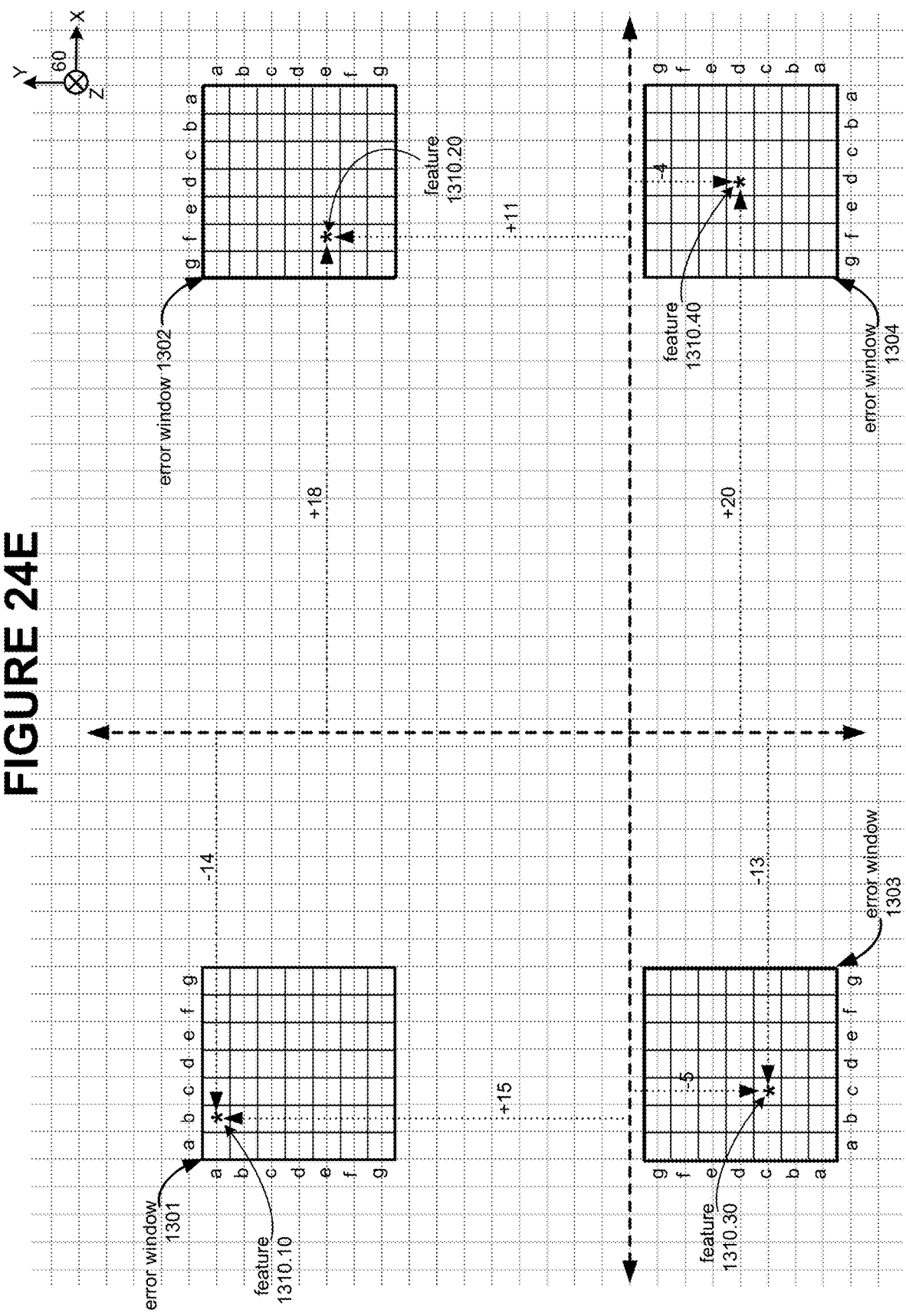
FIG. 24E depicts the exact coordinates for each feature view, and from which averages can be determined.

For example, FIG. 24A presents a configuration where none of the above-listed heuristics apply:
  FIG. 24B shows that there is no pair of feature-views that aligns with either the X axis or Y axis.
  FIG. 24C addresses the diagonal-pair feature-views 1310.10 and 1310.40. As can be seen, they define a rectangle of 34 units by 19 units, for the long and short sides, which is not type 2.0.
  FIG. 24D addresses the diagonal-pair feature views 1310.20 and 1310.30. As can be seen, they define a rectangle of 31 units by 16 units, for the long and short sides, which is not type 2.0.
  FIG. 24E depicts the exact coordinates for each feature view. From this, a good starting point, for the size of the correct rectangular configuration, can be determined as follows.

In terms of the X axis dimension, two "measurements" have been taken:
  The disparity between feature-view 1310 and feature-view 1320, which is 32 units.
  The disparity between feature-view 1330 and feature-view 1340, which is 33 units.
  A good initial guess, for the X axis dimension, can be found by taking the average of these disparities. The result is 32.5, that can either be rounded up to 33, or down to 32. For purposes of example herein, 0.5 values will be rounded up, to the nearest whole number.

In terms of the Y axis dimension, two "measurements" have also been taken:
  The disparity between feature-view 1310.10 and feature-view 1310.30, which is 20 units.
  The disparity between feature-view 1310.20 and feature-view 1310.40, which is 15 units.
  A good initial guess, for the Y axis dimension, can be found by taking the average of these disparities, which is 17.5. For purposes of example herein, this will be rounded up to 18.

Thus, a good initial guess for the size of the rectangular configuration is a rectangle of 33 units by 18 units. Since this is not of type 2.0, the first two guesses for a correct configuration size can be:
  The next smaller type 2.0, which is 32 units by 16 units.
  The next larger type 2.0, which is 36 units by 18 units.

In addition to using averages for guessing an initial size, it can also be useful to determine averages for purposes of the initial translation of a rectangular configuration. These averages can be determined and used as follows:
  For a potential left-side placement, parallel to the Y axis, the two left-side X-axis measurements (in the example of FIG. 24E, −13 and −14) can be averaged. In the example of FIG. 24E, the result is −13.5, which for purposes of example herein, is rounded up to −13. As can be seen in FIG. 24F, there is a line 2410, at $X_L$=−13. $X_L$ defines a leftmost boundary at which an initially-guessed rectangular configuration could be placed.
  For a potential right-side placement, parallel to the Y axis, the two right-side X axis measurements (in the example of FIG. 24E, +18 and +20) can be averaged. In the example of FIG. 24E, the result is +19. As can be seen in FIG. 24F, there is a line 2411, at $X_R$=+19. $X_R$ defines a rightmost boundary at which an initially-guessed rectangular configuration could be placed.
  For a potential upper-side (topmost) placement, parallel to the X axis, the two, upper, Y-axis measurements (in the example of FIG. 24E, +11 and +15) can be averaged. In the example of FIG. 24E, the result is +13. As can be seen in FIG. 24F, there is a line 2412, at $Y_T$=+13. $Y_T$ defines a topmost boundary at which an initially-guessed rectangular configuration could be placed.
  For a potential bottom-most placement, parallel to the X axis, the two, lower, Y-axis measurements (in the example of FIG. 24E, of −4 and −5) can be averaged. In the example of FIG. 24E, the result is −4.5, which for purposes of example herein, is rounded up to −4. As can be seen in FIG. 24F, there is a line 2413, at $Y_B$=−4. $Y_B$ defines a lower-most boundary at which an initially-guessed rectangular configuration could be placed.

Figure 24G:
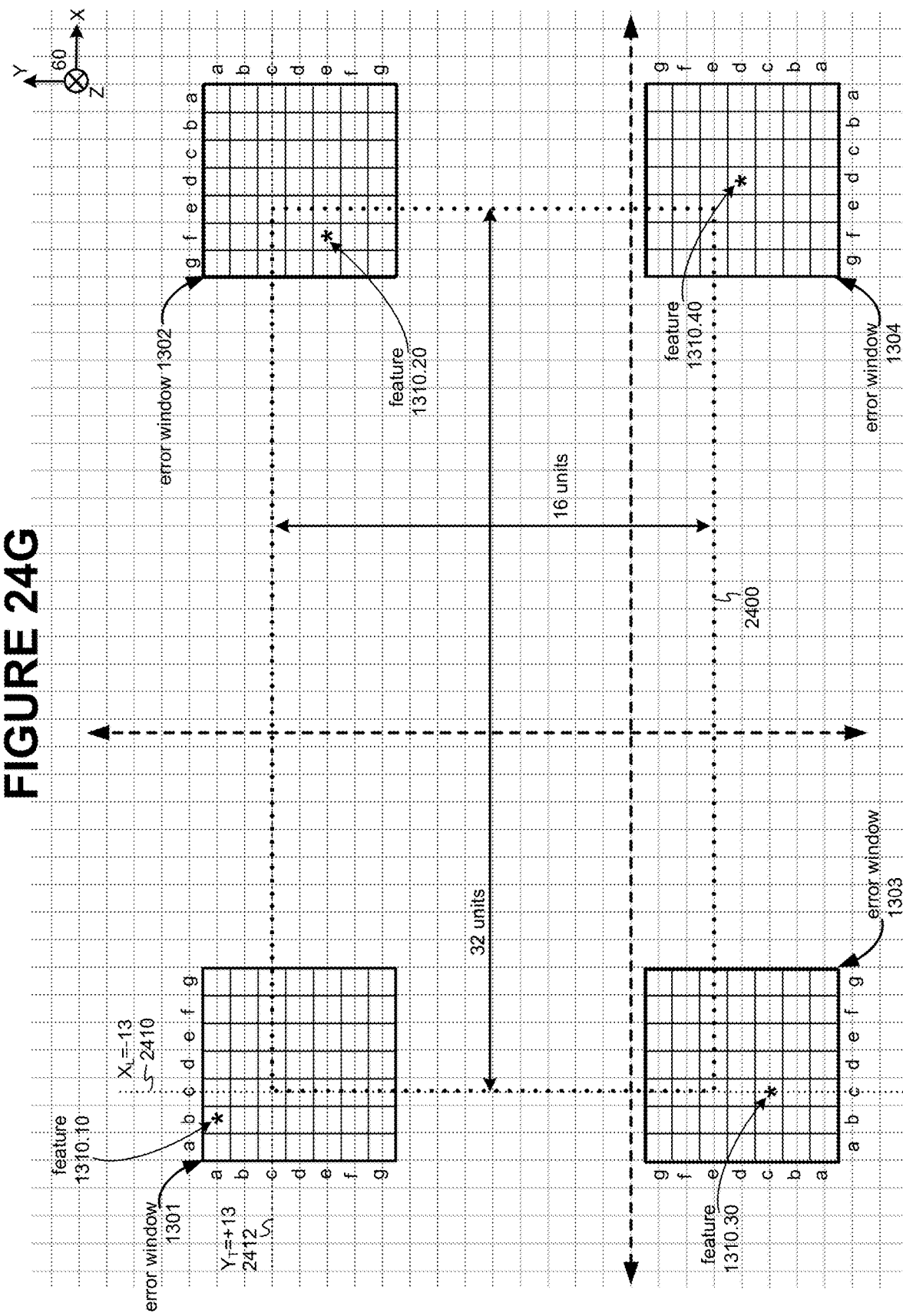
FIG. 24G depicts an example combination of the results of FIGS. 24E and 24F.

FIG. 24G depicts an example combination of the results of FIGS. 24E and 24F. Specifically, FIG. 24G shows an initial rectangular configuration 2400, that is sized at 32 units by 16 units. Second, FIG. 24G shows configuration 2400 being initially translated to the corner defined by $Y_T$=+13 (line 2412) and $X_L$=−13 (line 2410).

2.5 Comparison to Single Stereo-Pair

Given the above description of a CV camera, according to the principles of the present invention, its advantages can be better appreciated by comparison to the capabilities of a conventional single stereo-pair.

Figure 16A:
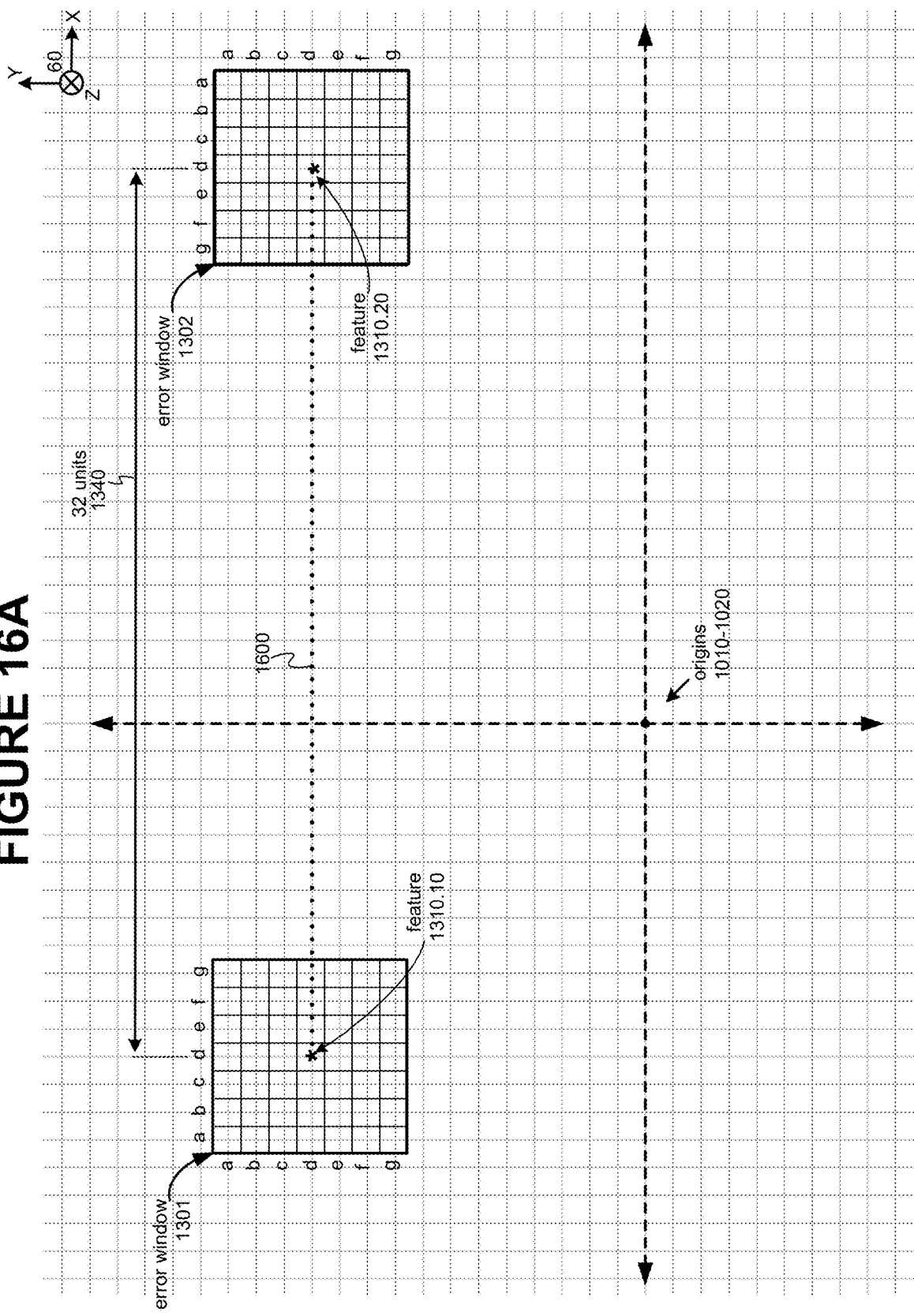
FIG. 16A is the same as FIG. 13F discussed above, except ICA's 103 and 104 are removed, leaving only a single stereo pair of ICA's 101 and 102.

FIG. 16A is the same as FIG. 13F discussed above, except the error windows of ICA's 103 and 104 (error windows 1303 and 1304) are removed, leaving only the error windows for a single stereo pair: ICA's 101 and 102 (error windows 1301 and 1302). Feature-views 1310.10 and 1310.20 can only define a straight-line configuration that either is, or is not, parallel to the X axis. As with rectangular configurations, only straight lines, parallel to an axis, can be valid. For the case of a single stereo pair, of course, configurations can only be parallel to the X axis.

FIG. 16A shows features 1310.10 and 1310.20 connected by correct configuration 1600.

Assuming one or both ICA's can undergo an RRE, the total number of straight line configurations that can be formed is:

49×49=2,401

Leaving out correct configuration 1600, this means there are a total of 2400 configurations, to which the two feature-views can transition.

As discussed above, being able to detect misalignment is an extremely important feature for most practical robotic systems. Any of the 2400 configurations that is parallel to the X axis, however, cannot be distinguished from the correct configuration. Counting the number of undetectably-incorrect configurations can be accomplished as follows.

Figure 16B:
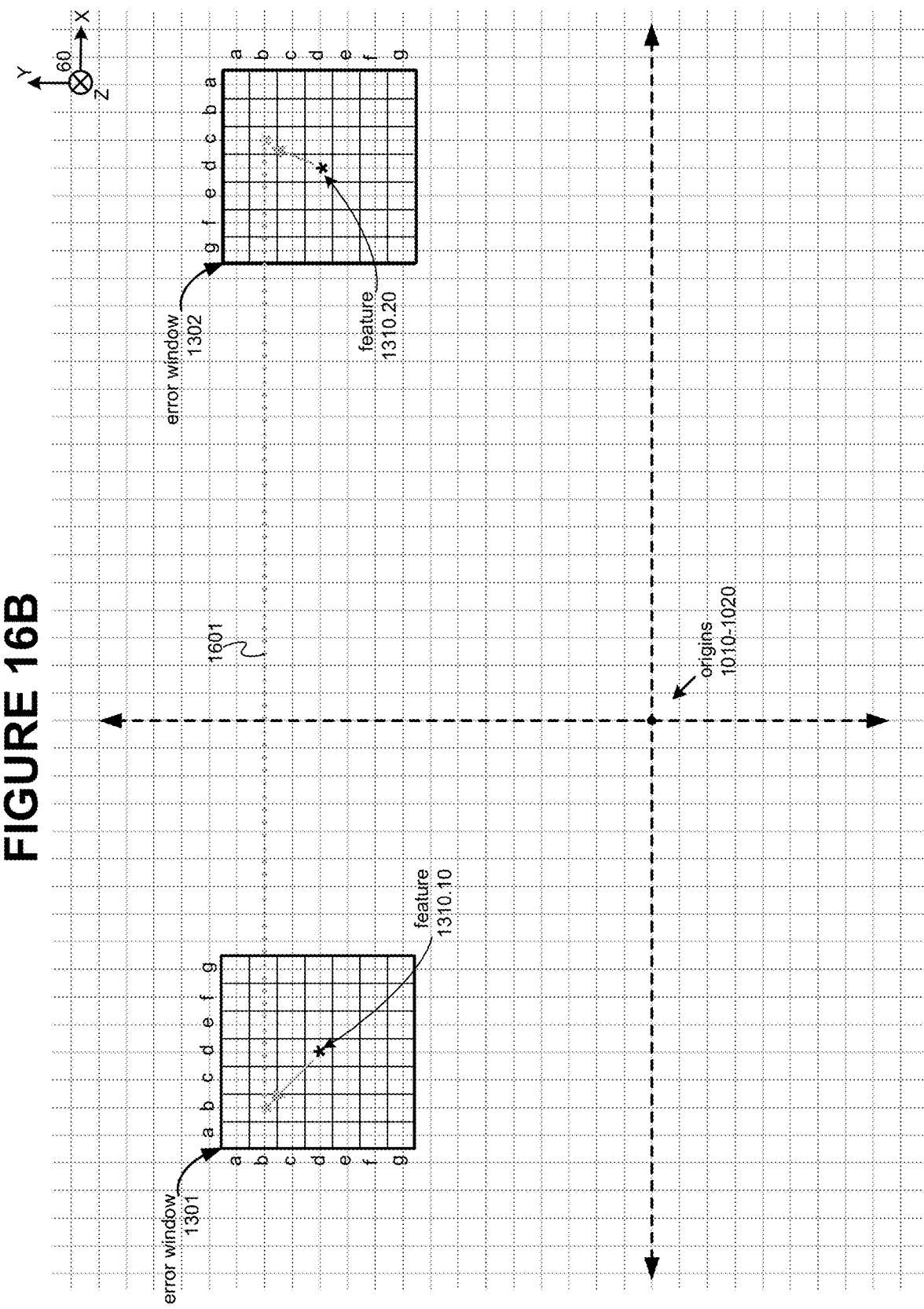
FIG. 16B depicts a type of two RRE's that cannot be detected by a single stereo pair.

FIG. 16B depicts a situation where feature 1310.10 moves from (d, d) to (b, b), and feature 1310.20 moves from (d, d) to (b, c). The changed locations of feature-views 1310.10 and 1310.20 form configuration 1601. Because 1601 is parallel to the X axis, it will not be detected as a change from the correct configuration.

The change of FIG. 16B is not detected because both feature-views moved to a same row "b." In general, it does not matter what column each feature-view moves to, so long as both remain within a same row. Thus, for each row of error windows 1301 and 1302, the number of undetectable configurations is 7×7 or 49. Since there are a total of 7 rows, the total number of configurations parallel to the X axis is 7×49 or 343. Leaving out correct configuration 1600, there are a total of 342 undetectable configurations, to which the two feature-views can transition.

Therefore, the odds of one or two RRE's causing an undetectable change, to the correct configuration, is 342/2400, or approximately 14%. Compared to odds of 0.003%, for a rectangular type 2.0 configuration, the rectangular configuration is 4667 times more likely to detect misalignment (i.e., 14/0.003=4667).

Even if an error is detected (which, over the long run, happens about 86% of the time), the chances of a single stereo pair performing a correct regression are very low. Having differing rows, of feature views 1310.10 and 1310.20, only provides two data points by which to guess a correct Y-axis location. Regarding the X axis, each of feature views 1310.10 and 1310.20 might need to be readjusted to any one of its seven columns, for a total of 7×7 or 49 possible column combinations. Since there is no information, by which to favor one column combination over another, the best strategy is to select one of the 49 combinations according to a fixed arbitrary rule. For example, one can simply keep the feature-views in the same column at which they are found, when a misalignment is detected according to the Y axis. The odds of picking a correct combination of columns is 1/49 or about 2%.

The advantages of a rectangular configuration can be clearly seen with the example of FIG. 19A. For FIG. 19A, in order to construct a single stereo pair example, we will consider only the two upper error windows 1301 and 1302. Since feature-view 1310.20 moves to a different row (it moves to row "e") from that of feature-view 1310.10, this will be detected as a misalignment that needs to be corrected. Taking an average of rows "d" and "e," and rounding up, results in a row selection of "d." Regarding a selection of column, we will follow the above-described rule of always keeping each feature view at its current column. In this example, feature view 1310.10 stays in column "d," and feature-views 1310.20 stays in column "f."

Thus, for the example of FIG. 19A, a rectangular configuration finds the correct configuration, while a single stereo pair would move feature view 1310.20 from its correct location of (d, d) to (d, f). This introduces errors for both the depth detected, and spatial location.

In contrast, for a type 2.0 rectangular configuration, as discussed above (see section 2.4.2.2, "One RRE Example"), the exactly correct configuration is determined.

2.6 Summary

FIG. 26 presents an overview, of the automatic self-alignment apparatus, data flow, and procedure:

Box 2600 simplifies the physical structure of the CV camera unit to being a frame, into which are embedded, in a rectangular configuration (that includes a square, or any other proportionality) of imager chips.

Box 2610 simplifies the video capture electronics to being any suitable combination of components, that is capable of capturing four pairs of images:

Two horizontal pairs, from imagers 1 and 2, and imagers 3 and 4.

Two vertical pairs, from imagers 1 and 3, and imagers 2 and 4.

Box 2620, that summarizes the auto-alignment procedure:

The rectangular configuration means that the two horizontal pairs, if calibrated correctly, should measure a same depth to an object, and the two vertical pairs should also (if calibrated correctly) measure a same depth to that object.

The rectangular configuration also means that if a same small feature (small enough for accurate calibration, such as a sharp corner) is identified in all four ICA's, then that feature should appear at a same vertical axis location in each horizontal pair, and at a same horizontal axis location in each vertical pair. If the calibration-suitable feature does not appear at a same location, for the horizontal pairs, the vertical pairs, or both, there is an alignment problem.

The alignment problems are fixed by suitable alteration of the principal points, of one or more of the ICA's. A least alteration of the locations of the principal points, that still achieves a correction of alignment issues, is regarded as optimal.

As an additional condition, an alteration of the locations of the principal points must still yield two horizontal pairs and two vertical pairs that all measure a same depth to the calibration-suitable feature.

Box 2620 can encompass any suitable computational hardware, whether in integrated circuit form or otherwise. Computational hardware is typically based upon the use of transistors, although other types of components may be included. A programmable memory is intended to include devices that use any kind of physics-based effects or properties, in order to store information in an at least non-transitory way, and for an amount of time commensurate with the application. Unless specifically indicated otherwise, the terms computational hardware, and programmable memory, system, and sub-system, do not include persons, or the mental steps a person may undertake. Further, box 2620 can be implemented by hardware, or by any suitable combination of hardware and software, depending upon such factors as desired speed of operation, and cost constraints.

Figure 27A:
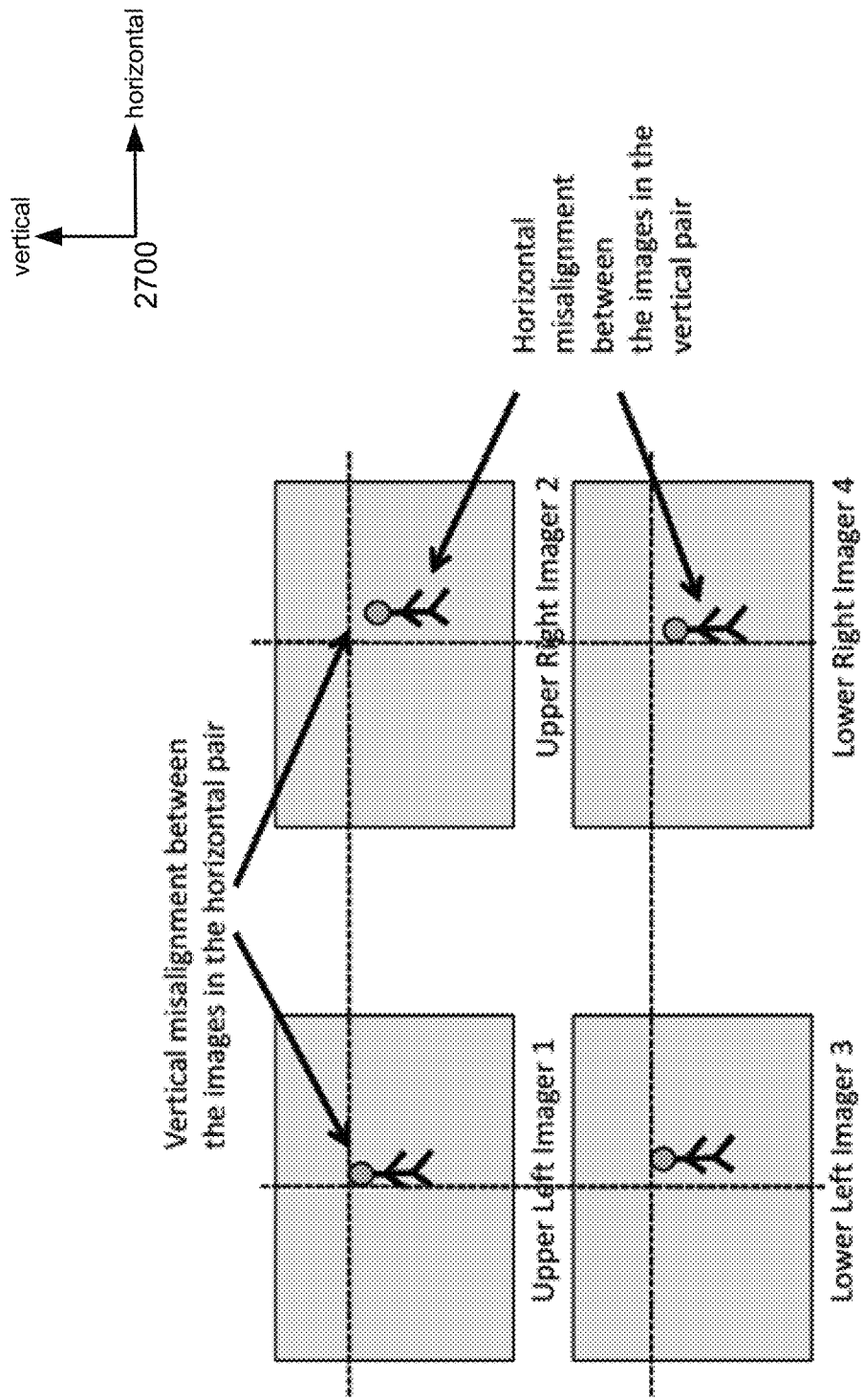
FIGS. 27A and 27B present, respectively, views that show "before" and "after" a self-alignment procedure has been applied.
Figure 27B:
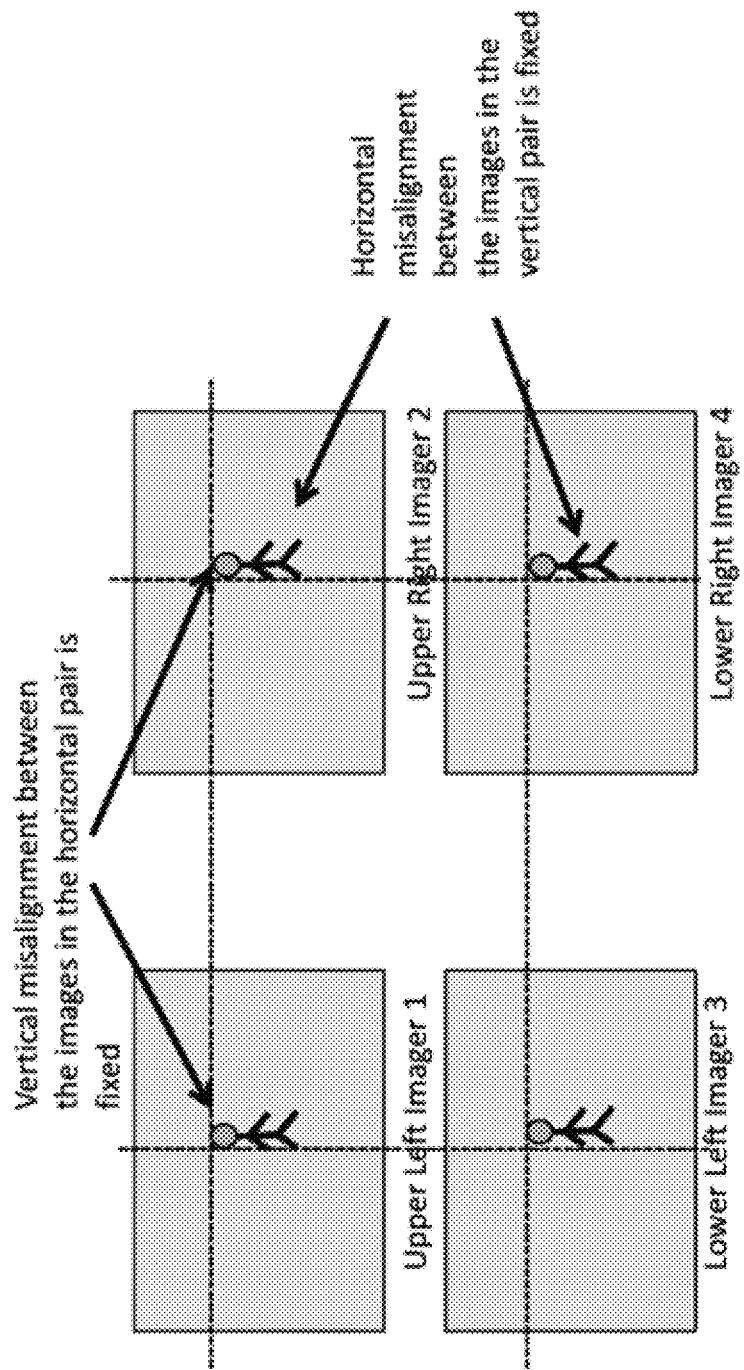

FIGS. 27A and 27B present, respectively, views that show "before" and "after" a self-alignment procedure has been applied. Specifically, the "before" situation of FIG. 27A is as follows (see axes 2700, of FIG. 27A, defining vertical and horizontal):

vertical misalignment of the two pairs of horizontally-spaced image chips:
  Between image chips 1 and 2: head of stick figure is lower in image from imager 2 compared with image from imager 1.
  Between image chips 3 and 4: head of stick figure is lower in image from imager 4 compared with image from imager 3.
horizontal misalignment of the two pairs of vertically-spaced image chips:
  Between image chips 1 and 3: head of stick figure in lower image, from imager 3, is located to the right of head of stick figure in image from imager 1.
  Between image chips 2 and 4: head of stick figure in upper image, from imager 2, is located to the right of head of stick figure in image from imager 4.
In contrast, in FIG. 27B:
No vertical misalignment of the two pairs of horizontally-spaced image chips:
  Between image chips 1 and 2: head of stick figure at same vertical location in images from both imagers.
  Between image chips 3 and 4: head of stick figure at same vertical location in images from both imagers.
No horizontal misalignment of the two pairs of vertically-spaced image chips:
  Between image chips 1 and 3: head of stick figure at same horizontal location in images from both imagers.
  Between image chips 2 and 4: head of stick figure at same horizontal location in images from both imagers.

What is not shown, between FIGS. 27A and 27B, is the extent to which the principal point has been adjusted, with respect to each of image chips 1, 2, 3, and 4, in order to achieve the alignment of FIG. 27B.

In order to discuss this, it will be useful to introduce some background notation, as well as a more specific example.

Let us refer to the initially calibrated principal points, for image chips 1, 2, 3, and 4, as, respectively, $(Xc1, Yc1)$, $(Xc2, Yc2)$, $(Xc3, Yc3)$, and $(Xc4, Yc4)$.

To take a specific example, consider a situation where each imager chip is 801 pixels wide (x-axis) and 601 pixels high (y-axis). Assuming perfect alignment, between the lens assembly and imager chip of an ICA, the principal point would be focused on the imaging element at location $x=401$ and $y=301$. But due to such factors as lens imperfections, and variations in assembly, the principal point is likely to be focused on an imaging element that is slightly different. For example, the principal point for image chip 1 might be focused on the imaging element at $x=401$ and $y=298$. In that case, using the above notation, the calibrated principal point, for image chip 1, would be $(Xc1=401, Yc1=298)$.

Due to a variety of factors, such as any combination of vibration, shock, or temperature fluctuation, the principal point of each ICA can move from its calibrated values. For a well-designed camera and lens, this movement is usually limited to a number of pixels that is a small percentage of the total pixels in either direction. For example, for the above example of an 801×601 imager, a movement of 3 pixels represents just a 0.4% movement along the 801 pixel dimension and a 0.5% movement along the 601 pixel dimension. Even a movement of tens of pixels represents a small percentage, that can be accommodated by the auto-alignment invention. For example, a movement of 30 pixels still only represents, with respect to an 801×601 imager, movements of, respectively, 4% and 5%. For an imager with super high resolution, such as having a width of 5000 image elements, a variation accommodated by the present invention can reach a few hundred pixels (e.g., 4% of 5000 is 200 pixels).

For a calibration-suitable feature "f," it's location in an image chip "i" can be expressed as $(Xfi, Yfi)$. The location of this common feature, across all four image chips of a rectangular configuration, can be expressed as: $(Xf1, Yf1)$, $(Xf2, Yf2)$, $(Xf3, Yf3)$, and $(Xf4, Yf4)$.

Measuring the horizontal disparity of feature "f," across image chips 1 and 2 for purposes of depth determination, represents the difference in the horizontal (or "X") location of the feature between the two image-element arrays: $Xf1-Xf2$. This horizontal disparity can be relied upon, so long as we know that "f," because it is a common small feature, must be treated as aligned vertically (i.e., $Yf1=Yf2$). Measuring disparity across image chips 3 and 4 must work the same way, except chip 3 substitutes for chip 1 and chip 4 substitutes for chip 2.

Measuring the vertical disparity of feature "f," across image chips 1 and 3 for purposes of depth determination, represents the difference in the vertical (or "Y") location of the feature between the two image-element arrays: $Yf1-Yf3$. This vertical disparity can be relied upon, so long as we know that "f," because it is a common small feature, must be treated as aligned horizontally (i.e., $Xf1=Xf3$). Measuring disparity across image chips 2 and 4 must work the same way, except chip 2 substitutes for chip 1 and chip 4 substitutes for chip 3.

Auto-alignment consists of selecting new locations, for principal points $(Xc1, Yc1)$, $(Xc2, Yc2)$, $(Xc3, Yc3)$, and $(Xc4, Yc4)$, such that any mis-alignment, for a calibration-suitable feature, is corrected. These new locations for the principal points, for image chips 1, 2, 3, and 4, can be expressed, respectively, as follows: $(Xn1, Yn1)$, $(Xn2, Yn2)$, $(Xn3, Yn3)$, and $(Xn4, Yn4)$.

Given this background, FIGS. 28A-28B present an example pseudo-coded procedure, by which self-alignment in accordance with the present invention can be accomplished. A step-by-step commentary, on the pseudo-code, follows:

1. Vertical misalignment, if any, between image chips 1 and 2 is tested for, with respect to a common calibration-suitable feature.
2. Vertical misalignment, if any, between image chips 3 and 4 is tested for, with respect to a common calibration-suitable feature.

3. Horizontal misalignment, if any, between image chips 1 and 3 is tested for, with respect to a common calibration-suitable feature.
4. Horizontal misalignment, if any, between image chips 2 and 4 is tested for, with respect to a common calibration-suitable feature.
5. Under one version of this procedure, an average of the horizontal disparities, of the two horizontal pairs (for a four-camera rectangular CV camera unit), is determined.
6. Under one version of this procedure, an average of the vertical disparities, of the two vertical pairs (for a four-camera rectangular CV camera unit), is determined.
7. Using standard stereo vision techniques, horizontal and vertical disparities can each be converted into a depth to the detected feature "f."
8. If vertical misalignment, horizontal misalignment, or both, are detected, a search is performed for an alteration, of one or more of the principal points, that results in elimination of the misalignments. The goal is that the net Euclidean distance, by which the principal points need to be moved, is minimized.
9. A set of adjustments, to principal point locations, cannot change the fact that the horizontal camera pairs must still measure a same depth to a feature "f" as the vertical camera pairs. With respect to this step, an average of the distances measured by the horizontal camera pairs (as described in step 5 of the pseudo-code) can be compared with an average of the distances measured by the vertical camera pairs (as described in step 6 of the pseudo-code). Alternatively, the distance measured by one of the adjusted horizontal pairs can be compared with the distance measured by one of the adjusted vertical pairs.
10. Candidate sets, of adjustments to principal point locations, can be generated by any suitable optimization technique. This can include simple non-heuristically guided approaches, approaches that utilize heuristics, and the utilization of stochastic techniques.

3 Foveal and Peripheral Vision Emulation

An important use, of being able to simultaneously operate at least two stereo-vision pairs, is to operate a first stereo-vision pair with a first field of view that is broader than, and contains, a second field of view of a second stereo-vision pair.

In this case, the first and second stereo-vision pairs can be regarded as emulating, respectively, human peripheral and foveal vision.

For example, the second field of view can be approximately centered within the first field of view. In terms of a ratio of the areas, between the first and second fields of view, an example is 2:1 (i.e., the first field of view encompasses approximately 2× the area of the second field of view). In this case, assume the first pair of ICA's, that captures the first field of view, uses the same imager chip as the second pair of ICA's, that captures the second field of view. In this case, a same number of imaging elements is used to capture the first and second fields of view, with the result that the density, of imaging elements per unit area captured, is 2× higher for the second field of view compared with the first field of view.

Figure 25:
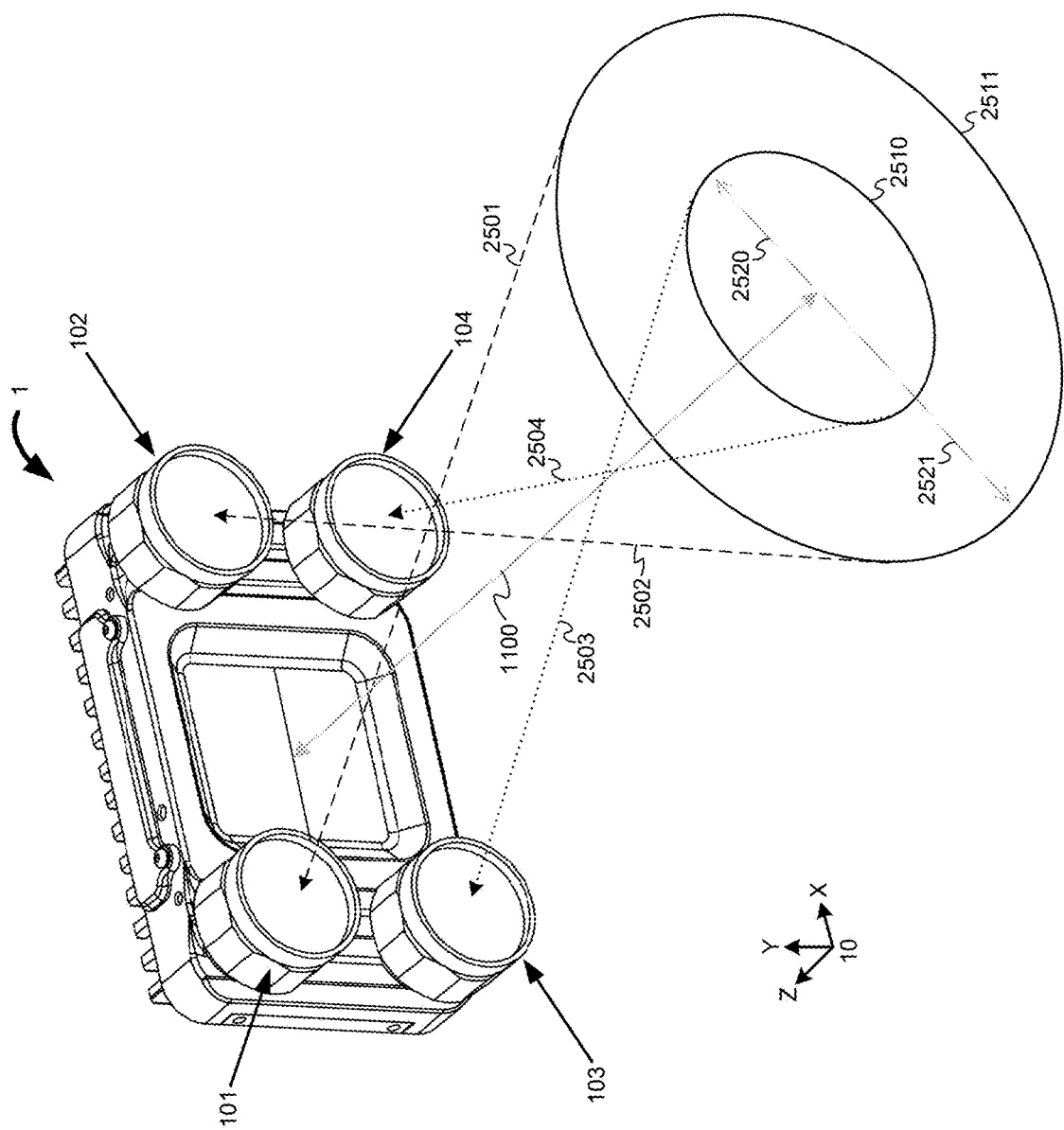
FIG. 25 depicts a rectangular configuration of ICA's used to form only two stereo pairs, each pair aligned with (or parallel to) the X axis, but located at a different point along the Y axis.

Another example arrangement, for CV camera 1, is depicted in FIG. 25. As can be seen, upper ICA pair (101, 102) is arranged to capture a first field of view (FOV) 2511. The left and right limits, of FOV 2511, are defined by, respectively, rays 2502 and 2501. This first FOV has diameter 2521. Similarly, lower ICA pair (103, 104) is arranged to capture a second field of view (FOV) 2510. The left and right limits, of FOV 2510, are defined by, respectively, rays 2504 and 2503. This second FOV has diameter 2520. The two FOV's have the following additional properties:
  Diameter 2521 of FOV 2511 is 2× diameter 2520 of FOV 2510.
  FOV 2510 is centered within FOV 2511.
  The ratio of the areas, between FOV's 2511 and 2510 is 4:1 (since the area of a circle varies with the square of the radius).

Besides 2:1 and 4:1, other suitable ratios of the areas, between the first and second fields of view, can include the following: 8:1, 16:1, 32:1, etc. In general, it can be expected that the ratio of the areas, between the first and second fields of view, can be somewhere within the range of 2:1 to 100:1.

The first (or peripheral) field of view, because it collects light from a larger area of the external scene, can be better at collecting image information in lower-light environments (e.g., at night), compared with the second (or foveal) field of view.

The light collecting advantage of the peripheral field of view can be further enhanced by using a monochromatic matrix of imaging elements for its imager chip, compared with a color-sensitive matrix of imaging elements for the imager chip of the foveal field of view. (Conversely, to compensate for its lower light-gathering capacity, the foveal field of view can be equipped with a monochromatic imager chip, while the peripheral field of view has a color-sensitive matrix of photo-electric elements.)

Also, because the peripheral field of view collects light from a larger area, it can be better (compared to the foveal field of view) at detecting, and tracking, the motion of objects in the external scene. Conversely, because the foveal field of view collects light from a smaller area it can be better (compared to the peripheral field of view) at capturing detail in the external scene.

The motion detecting, and tracking, capability of the peripheral field of view can be further enhanced by collection of image-pairs at a higher rate (also known as a higher "frame rate"), compared to the foveal field of view. The greater amount of data generated, as a result of a higher frame rate, can be at least partially compensated by using a monochromatic matrix of imaging elements for the peripheral field of view, compared with a color-sensitive matrix of imaging elements for the foveal field of view.

4 Versatility

Simultaneous operation of at least two stereo-vision pairs can be useful even if their fields of view are not arranged to emulate peripheral and foveal vision.

For example, even if the first and second stereo-vision pairs have essentially identical fields of view, they can be used to achieve a net CV camera unit with extremely high dynamic range.

For example, the first stereo-vision pair can be adjusted to handle, relative to the second stereo-vision pair, low light situations. This can be achieved, for example, by having the first stereo-vision pair operate with a much longer exposure time, per frame of video data collected, than the second stereo-vision pair.

In other words, for each frame of stereo-vision data collected, the first stereo-vision pair provides a much longer time period in which photons are collected. Therefore, conversely, the second stereo-vision pair is better at handling (at least relative to the first stereo-vision pair) high light situations.

This type of light-intensity specialization, between the first and second stereo-vision pairs, can be useful in many outdoor situations. With a mobile CV system, certain parts of a scene may be in shadow, while other parts are simultaneously in bright sunlight.

In general, a great deal of versatility can be achieved, by varying the frame rate, exposure time, or both, of two or more simultaneously operating stereo-vision pairs.

Further, the first and second stereo pairs can be focused to better handle different ranges of depth. For example, the focus of the first stereo pair can be optimized to collect image data at an extremely close range of depths, such as 0 to 1 meters. At the same time, the focus of the second stereo pair can be optimized to collect image data at a further range of depths, such as 1 to 2 meters. In this way, depth perception over the range of 0 to 2 meters becomes much more accurate, than could be possible with just a single stereo pair.

5 Additional Information

5.1 Number of Square Configurations

Given a square error-window of dimension w (in terms of IE's), that limits the selection of a vertex for each of ICA's 101-104, this section presents a closed form formula, for counting the total number of rectangular configurations that form a type 1.0 rectangle (i.e., form a square). This is an important number to calculate (and a number that we would like to have as small as possible) for at least two reasons:

Detectability of RRE's: if one or more RRE's transforms the set of actual point-feature locations into another set of point-features that still forms a rectangle of the correct type, the set of RRE's causing the change is undetectable.

Ability to correct, if misalignment is detected: if it is known that one or more RRE's has occurred, it is known that correcting the alignment represents searching the set of possible reflective rectangular configurations, to find the one that appears to have the best fit to the measured data from the ICA's.

Given a symmetric error window (such as the square window focused upon herein), the number of type 1.0 rectangles is likely to represent a worst-case scenario, in terms of the number of reflective rectangular configurations that need to be considered.

As had already been discussed above, FIGS. 15C and 15D enumerate the total set of type 1.0 rectangles that can be formed, with a 7×7 grid as the range of potential error (for each ICA measurement of a shared point-feature). The total number of such rectangles is 231.

Figure 15E:
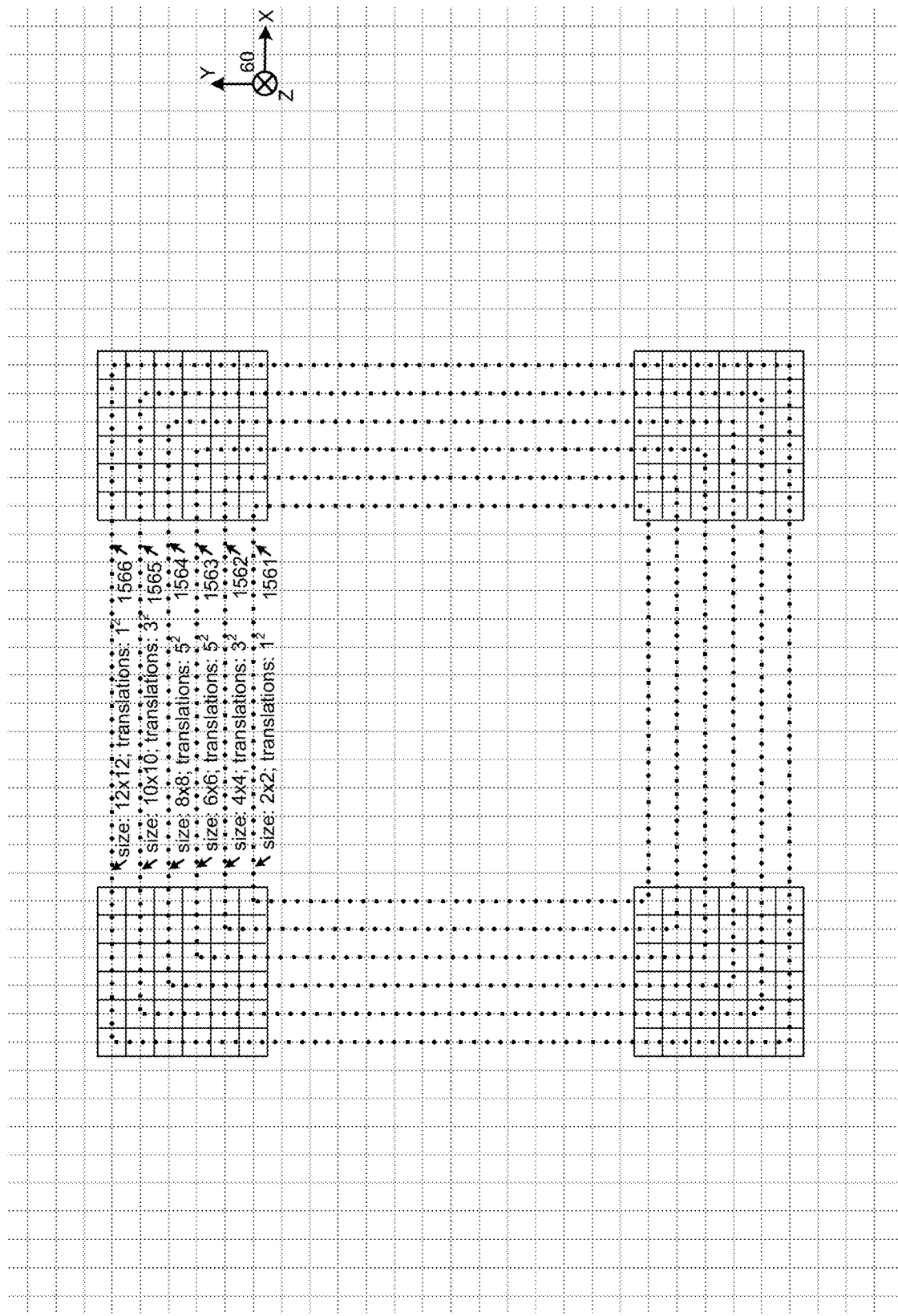

In order to produce a closed form formula, it is useful to consider one more example, where the w of the error window is even. FIGS. 15E and 15F consider an error-window grid of 6×6 IE's.

FIG. 15E is very similar to FIG. 15C, in that it also counts the number of square configurations (in the case of FIG. 15E, labeled 1561-1566), where each configuration uses an even number of IE's (along each of the X and Y dimensions). The six such even numbers for FIG. 15E are:

2, 4, 6, 8, 10, 12

These possibilities sum, as follows, to 70 possibilities:
=$1^2+3^2+5^2+5^2+3^2+1^2$
=1+9+25+25+9+1
=70

FIG. 15F is similar to FIG. 15D, in counting the number of square configurations (labeled 1551-1555) where each uses an odd number of IE's. The five such odd numbers in FIG. 15F are:

3, 5, 7, 9, 11

These possibilities sum, as follows, to 76 possibilities:
=$2^2+4^2+6^2+4^2+2^2$
=4+16+36+16+4
=76

Summing the number of possibilities, for both even and odd sizes, yields a total of 146 square configurations.

Generalizing from the above two examples, when given an error window size w, the general method is as follows:

compute the sum of the following series: $1^2+2^2+3^2+\ldots(w-1)^2$ double the value of the series: $2\times[1^2+2^2+3^2+\ldots(w-1)^2]$ determine $w^2$ number of possibilities is: $(2\times[1^2+2^2+3^2+\ldots(w-1)^2])+w^2$ This can be put into a closed-form equation as follows:

Closed form, for sum of squares of first n integers is well known:

$$\sum_{k=1}^{n} k^2 = \frac{2n^3 + 3n^2 + n}{6}$$

Substituting w−1 and w, yields following closed form:

$$2 \times \left( \frac{2(w-1)^3 + 3(w-1)^2 + (w-1)}{6} \right) + w^2$$

Multiplying out:

$$= 2 \times \left( \frac{2(w^3 - 3w^2 + 3w - 1) + 3(w^2 - 2w + 1) + (w - 1)}{6} \right) + w^2$$

$$= 2 \times \left( \frac{(2w^3 - 6w^2 + 6w - 2) + (3w^2 - 6w + 3) + (w - 1)}{6} \right) + w^2$$

Adding up:

$$= 2 \times \left( \frac{2w^3 - 3w^2 + w}{6} \right) + w^2$$

Multiplying out:

$$= \left( \frac{4w^3 - 6w^2 + 2w}{6} \right) + w^2$$

Simplifying:

$$= \left( \frac{2w^3 - 3w^2 + w}{3} \right) + w^2$$

Combining fractions:

$$=\left(\frac{2w^3 - 3w^2 + w + 3w^2}{3}\right)$$

Final simplified form:

$$\frac{2w^3 + w}{3}$$

Testing:

For $w = 6$ $$\frac{2(6^3) + 6}{3} = \frac{2(216) + 6}{3} = \frac{438}{3} = 146$$

For $w = 7$ $$\frac{2(7^3) + 7}{3} = \frac{2(343) + 7}{3} = \frac{693}{3} = 231$$

5.2 Likeliness of 3 RRE's Forming Rectangle

As has been discussed above, with respect to FIG. 21A, it can either represent a single RRE for feature 1310.20, or it can represent three RRE's, for each of 1310.10, 1310.30, and 1310.40, resulting in the formation of another type 2.0 rectangle. The odds of three RRE's forming a type 2.0 rectangle can be determined as follows.

First, the number of possible configurations for three feature-views is:

49×49×49=117,649

Excluding the correct configuration, there are a total of 117,648 configurations that can be transitioned to. Of these configurations, only the same number of 153, as determined above (section 2.3.2.2, "Type 2.0"), will be of type 2.0. Once again, excluding the correct configuration, this leaves 152 type 2.0 rectangles that can be transitioned to.

Thus, the odds of three feature-views transitioning to another type 2.0 rectangle is 152/117,648, which is approximately 0.13% or, approximately, 1/1000.

It is useful to express this situation more generally, and in terms of the common denominator of error window size, or "w." The number of possible configurations, among 3 error windows, increases by $w^6$. In contrast, as shown above in section 5.1, the number of possible rectangular configurations increases, with increasing w, by $w^3$ (more, precisely, for the case of a type 1.0 configuration of error windows, by $2/3 \times w^3$). Thus, viewed most conservatively, the ratio, of valid rectangular configurations to total number of configurations, can be expected to be $w^3/w^6$, or $1/w^3$, or, for w=7, 1/343.

6 Glossary of Selected Terms

Error-window configuration: a reflective rectangular configuration that has been augmented, at each of its vertices, with an error window.
ICA: an Image Capture Assembly, comprising a combination of an imager chip and its lens assembly.
IE: Imaging Element. A single photo-sensitive element, of an imaging array or microelectronic "chip."
Imager chip: an integrated circuit provided with a matrix of electrically-readable photo-sensitive elements. Each such photo-sensitive element can be called an Imaging Element or "IE." A common technology for imager chips has been CCD.
Lens assembly: an assembly of one or more lenses, with a mechanical structure for holding the lenses.
RRE: a "Random Realignment Event" where, for a lens assembly, one or more of its optical components undergoes a chaotic or random shift, changing its focal point.
Rectangle type: A ratio formed with rectangle's longer side a numerator, and the shorter side as denominator. A square can also be referred to as a rectangle of type 1.0. The ratio can range anywhere from 1.0 to positive infinity.
Reflective rectangular configuration: an integrated view, of the axes produced by the ICA's of a CV camera, where the origins of the axes are made to coincide. A single-point feature is depicted as a rectangular configuration, reflective of the rectangular configuration of the ICA's that produced it.
Translation: changing the location of a polygon, without changing its shape.
Vertex or Vertices: when used herein to refer to a rectangle, it refers to a corner or corners.

While the invention has been described in conjunction with specific embodiments, it is evident that many alternatives, modifications and variations will be apparent in light of the foregoing description. Accordingly, the invention is intended to embrace all such alternatives, modifications and variations as fall within the spirit and scope of the appended claims and equivalents.

What is claimed is:

1. A method for a first computer vision camera unit, comprising:
    calibrating first, second, third, and fourth image capture assemblies, each image capture assembly having a lens assembly embedded in a first frame, wherein each embedding locates a lens assembly at a different vertex of a rectangular configuration of a first type;
    identifying, with the first, second, third, and fourth image capture assemblies, a same calibration target of a known depth and spatial location, relative to the first computer vision camera unit;
    identifying, with first, second, third, and fourth imager chips, of, respectively, the first, second, third, and fourth image capture assemblies, the same calibration target;
    identifying the calibration target at first, second, third, and fourth locations of, respectively, the first, second, third, and fourth imager chips, wherein each location is relative to, respectively, first, second, third, and fourth origins;
    adjusting the first, second, third, and fourth origins until the first, second, third, and fourth locations are each at a different vertex of a rectangular configuration of the first type;
    identifying a same first feature, of unknown depth and spatial location, with each of the first, second, third, and fourth imager chips;
    identifying, with the first, second, third, and fourth imager chips, the first feature as being at, respectively, fifth, sixth, seventh, and eighth locations, relative to, respectively, first, second, third, and fourth origins;
    determining, performed at least in part with a configuration of computing hardware and programmable memory, if, with respect to a first axis, there is a first misalignment between the fifth and sixth locations;
    determining, performed at least in part with a configuration of computing hardware and programmable memory, if, with respect to the first axis, there is second misalignment between the seventh and eighth locations;

determining, performed at least in part with a configuration of computing hardware and programmable memory, if, with respect to a second axis, there is third misalignment between the fifth and seventh locations;

determining, performed at least in part with a configuration of computing hardware and programmable memory, if, with respect to the second axis, there is a fourth misalignment between the sixth and eighth locations; and generating, performed at least in part with a configuration of computing hardware and programmable memory, a loss of calibration signal, if at least one of the first, second, third, or fourth misalignments is detected.

2. The method of claim 1, wherein one or more of the embedded lens assemblies is subject to, relative to its corresponding imager chip, a random shift of its focal point.

3. The method of claim 1, wherein at least a front plate of the first frame is machined from a uniform block of material.

4. The method of claim 1, wherein the first, second, third, and fourth imager chips are mounted on a same printed circuit board with sub-micron accuracy, and the printed circuit board provides high speed connections, between each imager chip and hardware, also located on the printed circuit board, for processing images produced by the imager chips.

5. The method of claim 1, further comprising:
generating, performed at least in part with a configuration of computing hardware and programmable memory, a loss of calibration signal when no misalignment is detected, but the fifth, sixth, seventh, and eighth locations define a rectangular configuration that is not of the first type.

6. The method of claim 1, further comprising:
generating, in response to the loss of calibration signal, a first rectangular configuration, that has no misalignments, is of the first type, and is comprised of ninth, tenth, eleventh, and twelfth locations;

determining a first score, according to a first metric, by comparing the fifth, sixth, seventh, and eighth locations to, respectively, the ninth, tenth, eleventh, and twelfth locations;

repeating the steps of generating rectangular configurations and determining their scores, in accordance with a first strategy for exploring a first space of potential solutions;

selecting, from the first space, a rectangular configuration that, according to a first metric, appears to be at least a good fit to the fifth, sixth, seventh, and eighth locations.

7. The method of claim 6, wherein the first metric is least absolute distance.

8. The method of claim 6, wherein the first strategy is an exhaustive exploration the first space.

9. The method of claim 8, wherein the exploration is limited by a first error window, applied to each of the fifth, sixth, seventh, and eighth locations.

10. The method of claim 6, further comprising:
determining a first average disparity, from a first disparity between the fifth and sixth locations, and a second disparity between the seventh and eighth locations;

generating the first rectangular configuration with a first dimension equal to the first average disparity.

11. The method of claim 6, further comprising:
determining a first average location, from the fifth and seventh locations; and locating a first side of the first rectangular configuration at the first average location.

12. The method of claim 1, further comprising:
determining there is a misalignment between the fifth and six locations;

determining there is a misalignment between the sixth and eighth locations;

determining there is no misalignment between the seventh and eighth locations;

determining there is no misalignment between the fifth and seventh locations;

identifying a ninth location, completing a first rectangular configuration defined by the fifth, seventh, and eighth locations;

determining the first rectangular configuration is of the first type;

selecting the first rectangular configuration as the best fit to the fifth, sixth, seventh, and locations.

* * * * *